US012330163B2

(12) United States Patent
Groeli et al.

(10) Patent No.: US 12,330,163 B2
(45) Date of Patent: Jun. 17, 2025

(54) SCISSORS ACTUATOR CONFIGURED TO TRANSLATE A SUPPORT PLATFORM IN EITHER OF OPPOSED LATERAL DIRECTIONS

(71) Applicant: Gen-Probe Incorporated, San Diego, CA (US)

(72) Inventors: Julian Groeli, San Diego, CA (US); Jin Chen, Carlsbad, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 18/401,140

(22) Filed: Dec. 29, 2023

(65) Prior Publication Data

US 2024/0173720 A1     May 30, 2024

Related U.S. Application Data

(63) Continuation of application No. 18/055,385, filed on Nov. 14, 2022, now abandoned, which is a
(Continued)

(51) Int. Cl.
   *B66F 9/07*           (2006.01)
   *B01L 9/00*           (2006.01)

(52) U.S. Cl.
   CPC ............... *B01L 9/56* (2019.08); *B66F 9/072* (2013.01)

(58) Field of Classification Search
   CPC .................................... B01L 9/56; B66F 9/072
   See application file for complete search history.

(56) References Cited

U.S. PATENT DOCUMENTS

| 3,104,059 | A | 9/1963 | Gordon |
| 3,221,781 | A | 12/1965 | Forsström |

(Continued)

FOREIGN PATENT DOCUMENTS

| CN | 103119451 A | 5/2013 |
| CN | 205819256 U | 12/2016 |

(Continued)

OTHER PUBLICATIONS

CIPO Examination Report, Canadian Application No. 3,130,792, Feb. 1, 2023.
(Continued)

*Primary Examiner* — Saul Rodriguez
*Assistant Examiner* — Ashley K Romano
(74) *Attorney, Agent, or Firm* — Richard Wydeven; Rothwell, Figg, Ernst & Manbeck, P.C.; Charles B. Cappellari

(57) ABSTRACT

A scissors actuator is configured to translate a support platform in either of opposed lateral directions with respect to a base frame and includes a first arm, a second arm, wherein the first and second arms are rotatably connected at intermediate positions between their respective first and second ends, the first arm is pivotably attached at its first end to the base frame, and the second arm is pivotably attached at its second end to the support platform. A first slide is disposed within a first linear track formed in the support platform and includes a bearing protruding from a side of the first slide for rolling contact with a side of the first linear track formed in the support platform. The first arm is pivotably and translatably attached at its second end to the support platform by the first slide. A second slide is disposed within a second linear track formed in the base frame and includes a bearing protruding from a side of the second slide for rolling contact with a side of the second linear track (Continued)

formed in the base frame. The second arm is pivotably and translatably attached at its first end to the base frame by the second slide.

5 Claims, 26 Drawing Sheets

Related U.S. Application Data continuation of application No. 16/811,772, filed on Mar. 6, 2020, now Pat. No. 11,511,283.

(60) Provisional application No. 62/815,184, filed on Mar. 7, 2019.

(56) References Cited

U.S. PATENT DOCUMENTS

| | | | |
|---|---|---|---|
| 3,377,747 A | 4/1968 | Donkin | |
| 3,713,771 A | 1/1973 | Taylor et al. | |
| 3,730,102 A * | 5/1973 | Pipes | B66F 9/072 |
| | | | 104/48 |
| 4,300,867 A * | 11/1981 | Frees | B66F 9/195 |
| | | | 414/661 |
| 4,365,921 A | 12/1982 | Brouwer et al. | |
| 4,454,939 A | 6/1984 | Kampf et al. | |
| 4,877,134 A | 10/1989 | Klein | |
| 5,027,698 A | 7/1991 | Chirnomas | |
| 5,232,081 A | 8/1993 | Kanamori | |
| 5,366,073 A | 11/1994 | Turrentine | |
| 5,381,314 A | 1/1995 | Rudy, Jr. et al. | |
| 5,651,941 A | 7/1997 | Stark et al. | |
| 5,700,429 A | 12/1997 | Bühler et al. | |
| 5,885,530 A | 3/1999 | Babson et al. | |
| 5,948,360 A | 9/1999 | Rao et al. | |
| 6,012,552 A * | 1/2000 | Del Rio | B66F 9/02 |
| | | | 187/401 |
| 6,146,882 A | 11/2000 | Uematsu et al. | |
| 6,358,472 B1 | 3/2002 | DeYoung et al. | |
| 6,489,169 B1 | 12/2002 | Cohen et al. | |
| 6,591,160 B2 | 7/2003 | Hine et al. | |
| 6,838,051 B2 | 1/2005 | Marquiss et al. | |
| 7,013,197 B2 | 3/2006 | Melching et al. | |
| 7,185,288 B2 | 2/2007 | McKeever | |
| 7,214,023 B2 | 5/2007 | Sato et al. | |
| 7,678,337 B2 | 3/2010 | Sage et al. | |
| 7,775,756 B2 | 8/2010 | Koike et al. | |
| 7,842,237 B1 | 11/2010 | Shibuya et al. | |
| 7,850,914 B2 | 12/2010 | Veiner et al. | |
| 8,216,511 B2 | 7/2012 | Noguchi et al. | |
| 8,329,102 B2 | 12/2012 | Koike | |
| 8,356,525 B2 | 1/2013 | Hamada et al. | |
| 8,556,564 B2 | 10/2013 | Miller | |
| 8,580,195 B2 | 11/2013 | Frey et al. | |
| 8,658,096 B2 | 2/2014 | Kaiga | |
| 8,698,644 B2 | 4/2014 | Okubo | |
| 9,008,828 B2 | 4/2015 | Worsley | |
| 9,110,457 B2 | 8/2015 | Friedman et al. | |
| 9,156,630 B2 | 10/2015 | Behnk et al. | |
| 9,171,279 B2 | 10/2015 | Hagen et al. | |
| 9,371,182 B2 | 6/2016 | Hecht et al. | |
| 9,371,217 B1 * | 6/2016 | DePumpo | B66F 9/075 |
| 9,519,000 B2 | 12/2016 | Wilson et al. | |
| 10,092,929 B2 | 10/2018 | Bonora et al. | |
| 10,807,849 B2 | 10/2020 | Weiss et al. | |
| 10,941,026 B2 * | 3/2021 | Wirth | B66F 9/063 |
| 11,358,845 B1 * | 6/2022 | Mohan | H04B 3/32 |
| 2001/0007640 A1 | 7/2001 | Edwards et al. | |
| 2004/0216957 A1 * | 11/2004 | Hansl | B66F 9/07 |
| | | | 187/289 |
| 2005/0042068 A1 | 2/2005 | Ehmen | |
| 2005/0265901 A1 | 12/2005 | Sinclair et al. | |
| 2006/0047363 A1 | 3/2006 | Farrelly et al. | |
| 2006/0204997 A1 | 9/2006 | Macioszek et al. | |
| 2007/0095587 A1 | 5/2007 | DuCharme | |
| 2007/0243600 A1 | 10/2007 | Lair et al. | |
| 2010/0250073 A1 * | 9/2010 | McCabe | B66F 9/24 |
| | | | 701/50 |
| 2011/0101018 A1 | 5/2011 | Shafir | |
| 2014/0133943 A1 | 5/2014 | Razumov | |
| 2014/0298795 A1 | 10/2014 | Pourzand et al. | |
| 2015/0063965 A1 * | 3/2015 | Frizzell | B66F 7/08 |
| | | | 414/816 |
| 2016/0115003 A1 * | 4/2016 | Biondich | B66C 19/00 |
| | | | 254/102 |
| 2016/0121947 A1 * | 5/2016 | Lyle | E02F 9/08 |
| | | | 180/54.1 |
| 2017/0036898 A1 * | 2/2017 | Goncalves | B66F 17/003 |
| 2017/0285052 A1 | 10/2017 | Tatsutani et al. | |
| 2017/0285053 A1 | 10/2017 | Ohmae et al. | |
| 2017/0370955 A1 | 12/2017 | Neeper et al. | |
| 2018/0155129 A1 | 6/2018 | Lagziel et al. | |
| 2018/0312381 A1 * | 11/2018 | Weinmeister | B66F 7/28 |
| 2019/0135601 A1 * | 5/2019 | Guerry | B65G 65/00 |
| 2019/0270958 A1 | 9/2019 | Broyer et al. | |
| 2019/0302794 A1 | 10/2019 | Kean et al. | |
| 2019/0308858 A1 | 10/2019 | Standard et al. | |
| 2019/0315611 A1 | 10/2019 | Calomino | |
| 2020/0039747 A1 | 2/2020 | Ahmann et al. | |
| 2020/0071076 A1 | 3/2020 | Fosnight et al. | |
| 2020/0307911 A1 | 10/2020 | Austrheim | |
| 2020/0320256 A1 | 10/2020 | Ueda | |
| 2020/0339350 A1 * | 10/2020 | Dooley | B66F 7/0625 |
| 2020/0391986 A1 | 12/2020 | Picha | |
| 2020/0399106 A1 | 12/2020 | Weiss et al. | |
| 2021/0016967 A1 | 1/2021 | Wu et al. | |
| 2021/0053780 A1 | 2/2021 | Eidsmore | |
| 2021/0114854 A1 * | 4/2021 | Roethling | B66F 17/006 |
| 2021/0206570 A1 | 7/2021 | Austrheim | |
| 2021/0214160 A1 | 7/2021 | Frissenbichler | |
| 2021/0259415 A1 * | 8/2021 | Hohnhorst | B65G 1/0407 |
| 2021/0374659 A1 | 12/2021 | Ganapathi et al. | |
| 2021/0389752 A1 * | 12/2021 | Kulaçoglu | B66F 9/063 |
| 2022/0402735 A1 * | 12/2022 | Kritzer | B66F 9/065 |

FOREIGN PATENT DOCUMENTS

| | | |
|---|---|---|
| CN | 108140168 A | 6/2018 |
| CN | 109073669 A | 12/2018 |
| EP | 2952905 A1 | 12/2015 |
| EP | 2148208 B1 | 4/2016 |
| JP | S56-76605 U | 6/1981 |
| JP | 2004-077395 A | 3/2004 |
| JP | 2010-139371 A | 6/2010 |
| JP | 2014-130025 A | 7/2014 |
| JP | 2016-513975 A | 5/2016 |
| WO | 2012/012779 A2 | 1/2012 |
| WO | 2013/034937 A1 | 3/2013 |
| WO | 2013/183122 A1 | 12/2013 |
| WO | 2014/042011 A1 | 3/2014 |
| WO | 2016/148166 A1 | 9/2016 |
| WO | 2018/013344 A1 | 1/2018 |
| WO | 2018/018065 A1 | 2/2018 |
| WO | 2018/091818 A1 | 5/2018 |
| WO | 2018/136859 A1 | 7/2018 |

OTHER PUBLICATIONS

PCT Search Report and Written Opinion, International Application No. PCT/US2020/021488, Sep. 22, 2020.
PCT Preliminary Report on Patentability (IPER), International Application No. PCT/US2020/021488, Sep. 16, 2021.
USPTO Non-Final Office Action, U.S. Appl. No. 18/055,385, filed Mar. 25, 2024.
EPO Communication pursuant to Article 94(3) EPC, European Application No. 20716298.3, Jan. 25, 2024.
Australian Examination Report for AU 2020232014 dated Dec. 5, 2024, 4 pages.
JPO Official Action, Japanese Patent Application No. 2021-552865, Dec. 4, 2023, 11 pages.

(56) References Cited

OTHER PUBLICATIONS

USPTO Notice of Allowance, U.S. Appl. No. 18/055,385, filed Jul. 29, 2024, 8 pages.
USPTO Non-Final Office Action, U.S. Appl. No. 18/401,088, filed Sep. 24, 2024, 8 pages.
USPTO Notice of Allowance, U.S. Appl. No. 16/811,772, filed Jul. 27, 2022, 8 pages.
USPTO Non-Final Office Action, U.S. Appl. No. 16/811,772, filed Mar. 15, 2022, 9 pages.
CIPO Examination Report, Canadian Application No. 3,130,792, Nov. 4, 2024.
Office Action issued for Chinese Patent Application No. 202080017090.9 on Mar. 15, 2025, 16 pages.

* cited by examiner

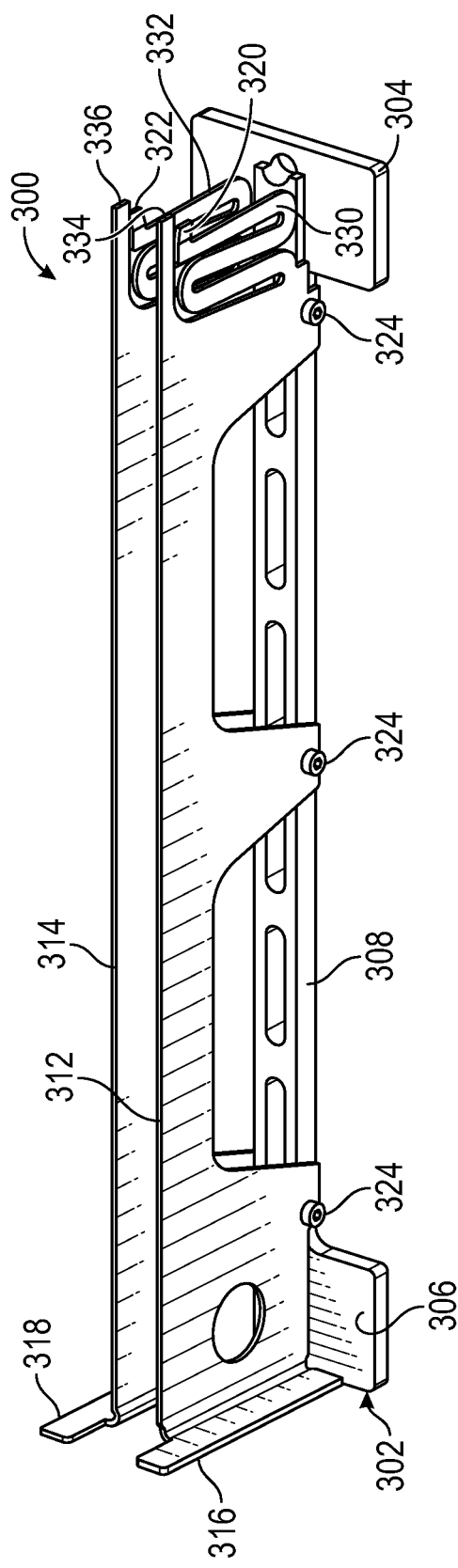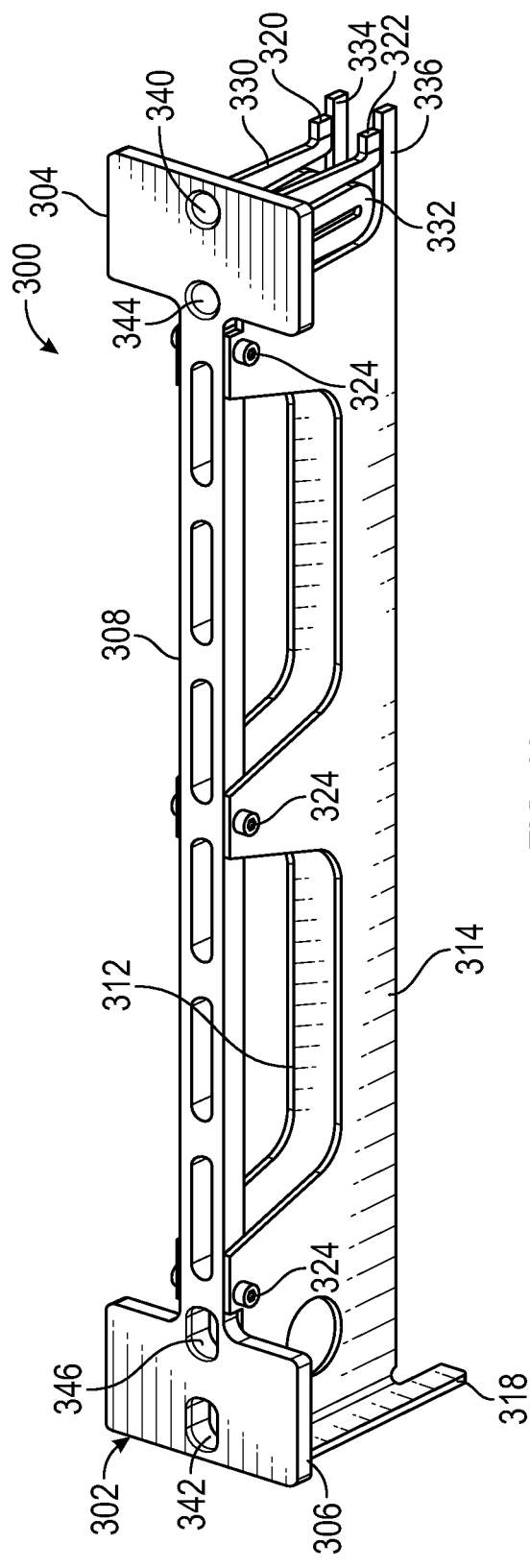

SCISSORS ACTUATOR CONFIGURED TO TRANSLATE A SUPPORT PLATFORM IN EITHER OF OPPOSED LATERAL DIRECTIONS

CROSS REFERENCE OF RELATED APPLICATION

This application is a continuation of U.S. application Ser. No. 18/055,385, filed Nov. 14, 2022, now abandoned, which is a continuation of U.S. application Ser. No. 16/811,772, filed Mar. 6, 2020, now U.S. Pat. No. 11,511,283, which claims the benefit of U.S. Provisional Application No. 62/815,184, filed Mar. 7, 2019, the contents of each of which applications are hereby incorporated by reference herein.

FIELD OF THE DISCLOSURE

This disclosure relates to systems and methods for transporting and holding a supply of consumables to be provided to a processing instrument within which the consumables will be moved or otherwise manipulated.

BACKGROUND

Instruments for performing multiple parallel and/or sequential discrete processes often require various consumables used in the performance of each discrete process. Such consumables may be used one time for each individual process—or for different steps of the process—and then discarded. Accordingly, a sufficient supply of such consumables must be provided to the instrument to enable the processes to be performed. For example, an analyzer for performing biological, chemical, biochemical, or other multi-step analytical processes on sample materials may perform numerous discrete procedures over a period of time. For example, the Panther® and Panther Fusion® systems available from Hologic, Inc. (Marlborough, MA) can process up to 320 samples in 8 hours and up to 750 samples in 15.2 hours. Multiple, different samples may be processed in parallel and/or sequentially, and multiple processes—e.g., tests—may be performed on each sample processed. A separate reaction vessel—such as a test tube—is typically required for each process performed on each sample that is tested by the analyzer, and, in some instances, a separate reaction vessel—such as a test tube—may be required for different steps of the process.

It is often desirable to maximize the throughput of the processing instrument by performing as many processes as are possible over a given period of time, and, to that end, it is likewise desirable that the instrument be operated continuously, or nearly continuously, with minimal interruptions. Accordingly, to avoid interruptions in instrument operation due to the need to periodically reload consumables, such as reaction vessels on an automated molecular analyzer, it is desirable to have an ample supply of consumables on the instrument. Moreover, the consumables must be provided in such a manner that they are accessible to the instrument for use in processing samples, i.e., the consumables are not merely stored on the instrument in large quantities, requiring operator intervention to feed the consumables to the instrument in smaller batches. Throughput can be further improved if additional consumables may be loaded onto the instrument while the instrument is operating and without interrupting processing by the instrument.

SUMMARY

A system and method as disclosed herein enable a user to load a sufficient number of consumables—such as reaction vessels—onto an instrument to support prolonged operation of the instrument, e.g., 4, 6, 8, 10, 12 hours or more, without requiring further interaction from the operator. Thus, the system and method as disclosed herein represent an improvement over existing systems that require an operator to periodically return to the instrument to load additional consumables. Moreover, the system and method disclosed herein enable all consumables of an extended supply of consumables to be accessed by the instrument for processing, and further, where even more prolonged operation of the instrument is desired, the system and method as disclosed herein enable the user to load additional consumables onto the instrument without interrupting instrument operation.

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in an apparatus for transporting groups of consumables between a plurality of vertically spaced holding shelves. The apparatus comprises a support chassis disposed at a laterally-spaced position with respect to the plurality of holding shelves, a transport elevator coupled to the support chassis for moving the support chassis in a vertical direction between the plurality of holding shelves, a lift platform, and a scissors actuator connecting the lift platform to the support chassis and configured to translate the lift platform laterally with respect to the support chassis between a first position laterally aligned with the support chassis at the laterally-spaced position with respect to the plurality of holding shelves and a second position laterally displaced from the support chassis and laterally aligned with one of the holding shelves.

According to other aspects, the apparatus further comprises a carrier configured to be carried on the lift platform and to be placed on any of the plurality of holding shelves.

According to other aspects, the carrier comprises a base, a pair of support rails for slidably supporting the consumables thereon, and a resilient tab located at an end of each support rail and configured to releasably retain the consumables on the support rails.

According to other aspects, each resilient tab is disposed at the end of a serpentine spring that is attached to or contiguous with a portion of the respective support rail.

According to other aspects, the transport elevator comprises two drive belts, each drive belt being attached to a portion of the support chassis, a drive pulley for each drive belt, a motor coupled to the drive pulleys, and an idler pulley for each drive belt.

According to other aspects, the apparatus further comprises an elevator home sensor configured to detect a locator flag extending from the support chassis.

According to other aspects, the scissors actuator comprises a first arm having first and second ends and a second arm having first and second ends. The first and second arms are rotatably connected to each other at intermediate positions between their respective first and second ends, the first arm is pivotably attached at its first end to the support chassis and is pivotably and translatably attached at its second end to the lift platform, and the second arm is pivotably and translatably attached at its first end to the support chassis and is pivotably attached at its second end to the lift platform.

According to other aspects, the first and second arms are rotatably connected to each other by a slewing ring having an inner ring and an outer ring, where the inner and outer rings are rotatable with respect to each other, and where the first arm is attached to the inner ring at its respective intermediate position, and the second arm is attached to the outer ring at its respective intermediate position.

According to other aspects, the second end of the first arm is pivotably and translatably attached to the lift platform by a slide that is slidably disposed within a linear slot formed in the lift platform, where the slide is rotatably attached to the second end of the first arm.

According to other aspects, the apparatus further comprises a roller bearing disposed within the slide that rolls against a side of the slot during lateral translation of the lift platform.

According to other aspects, the scissors actuator further comprises a motor coupled to the first end of the first arm to effect powered pivoting movement of the first arm.

According to other aspects, the scissors actuator is configured to translate the lift platform in either of two opposed lateral directions with respect to the support chassis.

According to other aspects, the apparatus further comprises a carrier detection sensor associated with each holding shelf and configured to detect the presence of a carrier on the associated holding shelf.

Aspects of the disclosure are embodied in an apparatus comprising a plurality of vertically spaced holding shelves, a transporter for transporting groups of consumables between the plurality of holding shelves, and a transport elevator coupled to the support chassis for moving the support chassis in a vertical direction between the plurality of holding shelves. The transporter comprises a support chassis disposed at a laterally-spaced position with respect to the plurality of holding shelves, a lift platform, and a scissors actuator connecting the lift platform to the support chassis and configured to translate the lift platform laterally with respect to the support chassis between a first position laterally aligned with the support chassis at the laterally-spaced position with respect to the plurality of holding shelves and a second position laterally displaced from the support chassis and laterally aligned with one of the holding shelves.

According to other aspects, the apparatus further comprises a carrier configured to hold the consumables, to be carried on the lift platform, and to be placed in any of the plurality of holding shelves.

According to other aspects, each holding shelf includes a carrier detection sensor configured to detect the presence of a carrier on the corresponding holding shelf.

According to other aspects, the carrier comprises a base, a pair of support rails for slidably supporting the consumables thereon, and a resilient tab located at an end of each support rail and configured to releasably retain the consumables on the support rails.

According to other aspects, each resilient tab is disposed at the end of a serpentine spring that is attached to or a part of the respective support rail.

According to other aspects, the carrier includes at least one opening formed in the bottom thereof, and each holding shelf includes at least one carrier locator pin protruding from the holding shelf for engaging the opening formed in the carrier.

According to other aspects, the transport elevator comprises two drive belts, each drive belt being attached to a portion of the support chassis, a drive pulley for each drive belt, a motor coupled to the drive pulley, and an idler pulley for each drive belt.

According to other aspects, one of the holding shelves comprises a carrier support configured to be moveable in a lateral direction between a first position accessible by the transporter and a second position accessible by a user to load a plurality of consumables into the carrier support.

According to other aspects, the apparatus further comprises a carrier configured to be carried on the lift platform and to be placed in any of the plurality of holding shelves, where one of the holding shelves comprises a carrier support configured to be moveable in a lateral direction between a first position accessible by the transporter and a second position accessible by a user to load a plurality of consumables into the carrier support. The carrier support comprises a carrier locking mechanism configured to lock the carrier within the carrier support when the carrier support is moved to the second position and to release the carrier when the carrier support is moved to the first position to permit the transporter to remove the carrier from the carrier support.

According to other aspects, the carrier locking mechanism comprises a pivoting latch configured to pivot between a first position not engaged with a portion of the carrier and a second position engaged with a portion of the carrier, and a slide latch configured to translate linearly between a first position not engaged with a portion of the carrier and a second position engaged with a portion of the carrier.

According to other aspects, the apparatus further comprises a torsional spring coupled to the pivoting latch to bias the pivoting latch to its respective second position engaged with a portion of the carrier, and a linear spring coupled to the slide latch to bias the slide latch to its respective second position engaged with a portion of the carrier.

According to other aspects, the pivoting latch includes an upper end that engages a portion of a carrier on the carrier support when the carrier support is in the second position and the pivoting latch is in the second position and a lower end that contacts a hard stop when the carrier support is moved from the second position thereof to the first position thereof, thus causing the pivoting latch to rotate from the second position to the first position, thereby releasing the carrier supported on the carrier support. The slide latch engages a portion of a carrier on the carrier support when the carrier support is in the second position and the slide latch is in the second position, and the slide latch contacts a hard stop that pushes slide latch into the first position when the carrier support is moved from the second position thereof to the first position thereof, thereby releasing the carrier supported on the carrier support.

According to other aspects, the carrier is longer than the lift platform so that first and second ends of the carrier extend beyond first and second ends of the lift platform, and each holding shelf comprises first and second shelf portions spaced apart by at least the length of the lift platform. The transporter is configured and controlled to transport a carrier supported on the lift platform from the lift platform to one of the plurality of holding shelves by moving the support chassis with the transport elevator to a vertical position at which the lift platform is above the holding shelf, moving the lift platform laterally with the scissors actuator into a position at which the first and second ends of the carrier are aligned with the first and second shelf portions of the holding shelf, and lowering the support chassis with the transport elevator to move the lift platform between the first and second shelf portions until the first and second ends of the carrier are supported on the first and second shelf portions.

According to other aspects, each of the consumables comprises a multi-receptacle unit including a plurality of receptacles connected to each other in a side-by-side arrangement, and the apparatus further comprises a carrier configured to be carried on the lift platform and to be placed in any of the plurality of holding shelves. The carrier comprises a base, a pair of parallel support rails for slidably supporting the multi-receptacle units thereon with at least one of the receptacles of each multi-receptacle unit disposed between the support rails, and a resilient tab located at an end of each support rail and configured to releasably retain the multi-receptacle units on the support rails. One of the holding shelves comprises an input module configured to hold the carrier therein, the input module comprising a pusher configured to push one or more multi-receptacle units supported on the carrier toward an end of the carrier.

According to other aspects, the input module is disposed on one side of the support chassis, and one or more of the remaining holding shelves are disposed on an opposed side of the support chassis, where the scissors actuator is configured to translate the lift platform in either of two opposed lateral directions with respect to the support chassis.

According to other aspects, each of the consumables comprises a multi-receptacle unit including a plurality of receptacles connected to each other in a side-by-side arrangement, and the apparatus further comprises a carrier configured to be carried on the lift platform and to be placed in any of the plurality of holding shelves. The carrier comprises a base, a pair of parallel support rails for slidably supporting the multi-receptacle units thereon with at least one of the receptacles of each multi-receptacle unit disposed between the support rails, and a stop flange located at an end of each support rail.

According to other aspects, at least one of the holding shelves comprises a packing mechanism configured to move with respect to the carrier held in the holding shelf and to push the multi-receptacle units carried on the carrier until an end-most one of the multi-receptacle units is pushed off the support rails.

According to other aspects, the apparatus further comprises a packing mechanism position sensor configured to detect a stop position of the packing mechanism at which the end-most one of the multi-receptacle units is pushed off the support rails and to determine the number of multi-receptacle units carried on the carrier based on the detected stop position.

According to other aspects, the apparatus further comprises position sensor mechanisms for detecting a vertical position of the support chassis and a lateral position of the lift platform, and a controller for controlling the transport elevator and the scissors actuator and in communication with the positon sensor mechanisms. The controller is configured to record a position of each holding shelf by moving the lift platform with respect to each holding shelf until the lift platform contacts a positioning tab of the holding shelf and recording the vertical position of the support chassis and the lateral position of the lift platform detected by the position sensor mechanisms at which the lift platform contacts the positioning tab.

Aspects of the disclosure are embodied in a carrier support for holding a carrier, where the carrier is configured to hold a plurality of receptacles, and where the carrier support is configured to be moveable between a first position and a second position. The carrier support comprises a carrier locking mechanism configured to lock the carrier with respect to the carrier support when the carrier support is moved to the second position and to release the carrier when the carrier support is moved to the first position to permit the carrier to be moved with respect to the carrier support when the carrier support is in the first position. The carrier locking mechanism comprises a pivoting latch configured to pivot between a first position not engaged with a portion of the carrier and a second position engaged with a portion of the carrier, and a slide latch configured to translate linearly between a first position not engaged with a portion of the carrier and a second position engaged with a portion of the carrier.

According to other aspects, the carrier further comprises a torsional spring coupled to the pivoting latch to bias the pivoting latch to its respective second position engaged with a portion of the carrier, and a linear spring coupled to the slide latch to bias the slide latch to its respective second position engaged with a portion of the carrier.

According to other aspects, the pivoting latch includes an upper end that engages a portion of a carrier on the carrier support when the carrier support is in the second position and the pivoting latch is in the second position and a lower end that contacts a hard stop when the carrier support is moved from the second position thereof to the first position thereof, thus causing the pivoting latch to rotate from the second position to the first position, thereby releasing the carrier supported on the carrier support. The slide latch engages a portion of a carrier on the carrier support when the carrier support is in the second position and the slide latch is in the second position, and the slide latch contacts a hard stop that pushes the slide latch into the first position when the carrier support is moved from the second position thereof to the first position thereof, thereby releasing the carrier supported on the carrier support.

Aspects of the disclosure are embodied in an input module comprising a carrier shelf for receiving and supporting a carrier holding a plurality of receptacles, a retrieval dock adjacent the carrier shelf and configured to receive one receptacle from a carrier supported on the carrier shelf and present the receptacle for removal from the input module by a receptacle transport apparatus, and a pusher configured to push one or more receptacles held on the carrier supported on the carrier shelf to one end of the carrier and to push one receptacle at a time off the end of the carrier and onto the retrieval dock.

According to other aspects, the pusher comprises a pusher carriage coupled to a pusher track and configured to translate bi-directionally along the track, and a pusher arm projecting from the pusher carriage.

According to other aspects, the pusher arm comprises an upright portion extending upwardly from the pusher carriage, a lateral portion extending laterally from an end of the upright portion, and a contact portion extending downwardly from the lateral portion.

According to other aspects, a carrier supported on the carrier shelf includes a pair of parallel support rails for slidably supporting a plurality of receptacles thereon with at least a portion of each receptacle disposed between the support rails, and the contact portion is aligned with a gap between the support rails so that as the pusher translates along the pusher track, the contact portion moves between the support rails and contacts the portion of the receptacle that is disposed between the support rails.

According to other aspects, the receptacle comprises a plurality of cylindrical tubes connected to one another by a connecting rib structure defining a downwardly facing shoulder, where at least one of the cylindrical tubes is disposed between the support rails and a portion of the downwardly-facing shoulder is supported on top of the support rails.

According to other aspects, the pusher further comprises a pusher drive belt attached to the pusher carriage, and a pusher motor coupled to the pusher drive belt for effecting powered translation of pusher carriage along the pusher track.

According to other aspects, the input module further comprises a sensor configured to detect when one of the receptacles has been pushed onto the retrieval dock.

According to other aspects, the input module further comprises a guide plate adjacent the retrieval dock and configured to align the receptacle on the retrieval dock with a receptacle transport apparatus.

According to other aspects, the input module further comprises at least one carrier locator pin protruding from the carrier shelf for engaging an opening formed in a carrier supported by the carrier shelf and to restrict relative movement between the carrier shelf and the carrier supported thereby.

According to other aspects, the input module further comprises a position encoder for detecting a longitudinal position of the pusher, and a controller configured to receive longitudinal position data from the position encoder and to determine the number of receptacles supported by a carrier supported on the carrier shelf when the pusher is positioned in contact with an end-most receptacle of one or more receptacles held on the carrier.

According to other aspects, the input module further comprises a pusher home sensor configured to detect when the pusher has moved to a home position.

According to other aspects, a processing instrument comprises the input module as previously described and a receptacle transport apparatus configured to remove a receptacle from the retrieval dock of the input module and transport the receptacle within the processing instrument.

Aspects of the disclosure are embodied in a carrier for holding a plurality of multi-receptacle units, each multi-receptacle unit including a plurality of receptacles connected to each other in a side-by-side arrangement. The carrier comprises a pair of parallel support rails for slidably supporting the multi-receptacle units thereon with at least one of the receptacles of each multi-receptacle unit disposed between the support rails, and a resilient tab associated with each support rail and configured to releasably retain the multi-receptacle units on the support rails.

According to other aspects, each resilient tab is disposed at the end of a serpentine spring.

According to other aspects, each serpentine spring is an integral portion of each associated support rail.

According to other aspects, the support rails are made from spring steel.

According to other aspects, the carrier further comprises a carrier base comprising a first end, a second end, and a connecting portion extending between the first end and the second end, where the connecting portion is generally narrower than the first and second ends.

According to other aspects, the support rails are attached to opposed edges of the connecting portion.

According to other aspects, the carrier further comprises a carrier base with one or more locator holes formed in the bottom of the carrier base.

According to other aspects, the carrier further comprises one locator hole at a first end of the carrier base and a locator slot at a second end of the carrier base.

According to other aspects, the carrier further comprises two locator holes at a first end of the carrier base and two locator slots at a second end of the carrier base.

Aspects of the disclosure are embodied in a scissors actuator configured to translate a support platform in either of opposed lateral directions with respect to a base frame. The scissors actuator comprises a first arm having first and second ends, a second arm having first and second ends, where the first and second arms are rotatably connected to each other at intermediate positions between their respective first and second ends, where the first arm is pivotably attached at its first end to the base frame and the second arm and is pivotably attached at its second end to the support platform, a first slide disposed within a first linear track formed in the support platform and including a bearing protruding from a side of the first slide for rolling contact with a side of the first linear track formed in the support platform, where the first arm is pivotably and translatably attached at its second end to the support platform by the first slide, and a second slide disposed within a second linear track formed in the base frame and including a bearing protruding from a side of the second slide for rolling contact with a side of the second linear track formed in the base frame, where the second arm is pivotably and translatably attached at its first end to the base frame by the second slide.

According to other aspects, the first and second arms are rotatably connected to each other by a slewing ring having an inner ring and an outer ring, where the inner and outer rings are rotatable with respect to each other, and where the first arm is attached to the inner ring at its respective intermediate position, and the second arm is attached to the outer ring at its respective intermediate position.

According to other aspects, the scissors actuator further comprises a motor coupled to the first end of the first arm to effect powered pivoting movement of the first arm.

According to other aspects, the scissors actuator further comprises an encoder coupled to the motor or to the first arm.

According to other aspects, the scissors actuator is configured to translate the support platform in either of two opposed lateral directions with respect to the base frame.

Aspects of the disclosure are embodied in a method for automatically transferring a receptacle carrier between a holding shelf and a lift platform of a transporter. The method comprises the steps of a) with a transport elevator for effecting vertical movement of the transporter, positioning the transporter at an approximate vertical location of the holding shelf, b) after step a), effecting relative movement between the lift platform and a positioning structure associated with the holding self, c) during step b), detecting contact between the lift platform and the positioning structure, d) recording data relating to the position of the lift platform at which contact is detected in step c), and e) transferring a receptacle carrier between the holding shelf and the lift platform by controlling movement of the lift platform in accordance with the data recorded at step d).

According to other aspects, step b) comprises one or both of (1) effecting vertical movement of the lift platform with respect to the holding shelf with the transport elevator and (2) effecting lateral movement of the lift platform with a lateral actuator.

According to other aspects, step a) comprises positioning the transporter such that the vertical position of the lift platform is below an expected vertical location of the positioning structure, and step b) comprises b-1) moving the lift platform laterally with the lateral actuator until the lift platform is positioned below an expected location of the positioning structure, and b-2) after step b-1), raising the transporter and lift platform with the transport elevator until contact is detected in step c).

According to other aspects, step a) comprises positioning the transporter such that the vertical position of the lift platform is above an expected vertical location of the positioning structure, and step b) comprises b-1) moving the lift platform laterally with the lateral actuator until the lift platform is positioned above an expected location of the positioning structure, and b-2) after step b-1), lowering the transporter and lift platform with the transport elevator until contact is detected in step c).

According to other aspects, step a) comprises positioning the transporter such that the vertical position of the lift platform is the same as an expected vertical location of the positioning structure, and step b) comprises moving the lift platform laterally with the lateral actuator until contact is detected in step c).

According to other aspects, step e) comprises transferring a receptacle carrier from the lift platform to the holding shelf by supporting the receptacle carrier on the lift platform with opposed ends of the receptacle carrier extending beyond opposed ends of the lift platform, with the transport elevator, and using the data recorded at step d), positioning the transporter at a vertical position so that the lift platform is above the holding shelf, effecting lateral movement of the lift platform with a lateral actuator and using the data recorded at step d) so that the lift platform is disposed within an open area between a first shelf portion and a second shelf portion of the holding shelf and the opposed ends of the receptacle carrier are positioned above the first and second shelf portions, and with the transport elevator, lowering the lift platform until the opposed ends of the receptacle carrier are supported on the first and second shelf portions, and the receptacle carrier is not supported on the lift platform.

According to other aspects, step e) comprises transferring a receptacle carrier from the holding shelf to the lift platform by supporting opposed ends of the receptacle carrier on a first shelf portion and a second shelf portion of the holding shelf, with the transport elevator, and using the data recorded at step d), positioning the transporter at a vertical position so that the lift platform is below the holding shelf, effecting lateral movement of the lift platform with a lateral actuator and using the data recorded at step d) so that the lift platform is aligned with an open area between the first and second shelf portions, and with the transport elevator, raising the lift platform until the receptacle carrier is supported on the lift platform with the opposed ends of the receptacle carrier extending beyond opposed ends of the lift platform and the opposed ends of the receptacle carrier are lifted off the first and second shelf portions.

Aspects of the disclosure are embodied in a method for determining the number of receptacles supported by a carrier. The method comprises a) placing the carrier with one or more receptacles supported thereby on a carrier shelf, b) pushing the one or more receptacles to one end of the carrier with a packer positioned adjacent the carrier shelf, c) detecting a longitudinal position of the packer when the one or more receptacles have been pushed to the one end of the carrier, and d) determining the number of receptacles held on the carrier based on the longitudinal position of the packer.

According to other aspects, step a) comprises transferring the carrier from a lift platform to the carrier shelf by supporting the carrier on the lift platform with opposed ends of the carrier extending beyond opposed ends of the lift platform, with a transport elevator, positioning the lift platform above the carrier shelf, effecting lateral movement of the lift platform with a lateral actuator so that the lift platform is disposed within an open area between a first shelf portion and a second shelf portion of the carrier shelf and the opposed ends of the carrier are positioned above the first and second shelf portions, and with the transport elevator, lowering the lift platform until the opposed ends of the carrier are supported on the first and second shelf portions, and the carrier is not supported on the lift platform.

According to other aspects, the packer comprises a packer carriage coupled to a packer track and configured to translate bi-directionally along the track, a contact portion projecting from the packer carriage, a packer drive belt attached to the packer carriage, and a packer motor coupled to the packer drive belt for effecting powered translation of the packer carriage along the packer track.

According to other aspects, step c) comprises detecting output of the packer motor by a rotary encoder coupled to the packer motor or detecting output of the packer motor by motor steps.

Aspects of the disclosure are embodied in a method for packing a plurality of receptacles supported by a carrier. The method comprises a) placing the carrier with a plurality of receptacles supported thereby on a carrier shelf, b) contacting an end-most one of the receptacles with a packer positioned adjacent the carrier shelf, where the packer comprises a packer carriage coupled to a packer track and configured to translate bi-directionally along the track, and a contact portion projecting from the packer carriage, and c) pushing the plurality of receptacles to one end of the carrier with the packer to pack the receptacles in a stack.

According to other aspects, a carrier supported on the carrier shelf includes a pair of parallel support rails for slidably supporting a plurality of receptacles thereon with at least a portion of each receptacle disposed between the support rails, and where step c) comprises contacting an end-most one of the receptacles with the packer by aligning the contact portion with a gap between the support rails, so that as the packer carriage translates along the packer track, the contact portion moves between the support rails and contacts the portion of the end-most receptacle that is disposed between the support rails.

According to other aspects, the carrier includes a hard stop at an end of each support rail, where step c) comprises pushing the plurality of receptacles against the hard stops.

According to other aspects, the receptacle comprises a plurality of cylindrical tubes connected to one another by a connecting rib structure defining a downwardly facing shoulder, where at least one of the cylindrical tubes is disposed between the support rails and a portion of the downwardly-facing shoulder is supported on top of the support rails.

According to other aspects, the packer further comprises a horizontal portion that contacts a portion of the end-most receptacle extending above the support rails to keep the receptacles generally perpendicular to a longitudinal direction of the support rails.

According to other aspects, the packer further comprises a packer drive belt attached to the packer carriage, and a packer motor coupled to the packer drive belt for effecting powered translation of packer carriage along the packer track.

According to other aspects, the method further comprises detecting a longitudinal position of the packer during step c), and determining the number of receptacles held on the carrier based on the longitudinal position of the packer.

According to other aspects, the packer further comprises a packer drive belt attached to the packer carriage, and a packer motor coupled to the packer drive belt for effecting powered translation of packer carriage along the packer track, where detecting the longitudinal position of the packer during step c) comprises using a home sensor to detect an initial position of the packer along the packer track and an encoder coupled to the packer motor to detect a number of encoder counts associated with a motorized packer movement from the initial position.

Aspects of the disclosure are embodied in a method for presenting multi-receptacle units for retrieval by an automated receptacle distributor of a processing instrument, each multi-receptacle unit including a plurality of receptacles connected to each other in a side-by-side arrangement, The method comprises the steps of a) placing a carrier with one or more multi-receptacle units held thereon on a carrier shelf, where the carrier comprises a pair of parallel support rails for slidably supporting the multi-receptacle units thereon with at least one of the receptacles of each multi-receptacle unit disposed between the support rails, b) contacting an end-most one of the receptacles with a pusher positioned adjacent the carrier shelf, the pusher comprising a contact portion configured to move between the support rails and contact the receptacle disposed between the support rails, and c) pushing the plurality of multi-receptacle units along the support rails toward one end of the carrier with the pusher until an end-most one of the multi-receptacle units is pushed off the support rails and onto a retrieval dock adjacent to the carrier shelf.

According to other aspects, the method further comprises detecting when the one of the plurality of multi-receptacle units is pushed off the support rails and onto the retrieval dock, and stopping the pusher from further pushing the one or more multi-receptacle units toward the one end of the carrier.

According to other aspects, the method further comprises retrieving the one multi-receptacle unit from the retrieval dock with a receptacle transport mechanism of the processing instrument.

According to other aspects, the receptacle transport mechanism comprises an extendible and retractable hook and the multi-receptacle unit comprises a manipulating structure, where retrieving the one receptacle from the retrieval dock with a receptacle transport mechanism comprises extending the hook, engaging the manipulating structure with the extended hook, and retracting the hook to pull the multi-receptacle unit from the retrieval dock into a housing of the receptacle transport mechanism.

According to other aspects, the method further comprises during step c), detecting a longitudinal position of the pusher when the multi-receptacle unit is pushed off the support rails, and determining the number of multi-receptacle units held on the carrier based on the longitudinal position of the pusher.

According to other aspects, step a) comprises transferring the carrier from a lift platform to the carrier shelf by supporting the carrier on the lift platform with opposed ends of the carrier extending beyond opposed ends of the lift platform, with a transport elevator, positioning the lift platform above the carrier shelf, effecting lateral movement of the lift platform with a lateral actuator so that the lift platform is disposed within an open area between a first shelf portion and a second shelf portion of the carrier shelf and the opposed ends of the carrier are positioned above the first and second shelf portions, and with the transport elevator, lowering the lift platform until the opposed ends of the carrier are supported on the first and second shelf portions, and the carrier is not supported on the lift platform.

According to other aspects, the pusher further comprises a pusher carriage coupled to a pusher track and configured to translate bi-directionally along the track, a pusher arm comprising the contact portion and projecting from the pusher carriage, a pusher drive belt attached to the pusher carriage, and a pusher motor coupled to the pusher drive belt for effecting powered translation of pusher carriage along the pusher track.

According to other aspects, the method further comprises, prior to step c), retaining the one or more multi-receptacle units on the support rails with spring-biased retainer tabs that releasably engage the end-most one of the multi-receptacle units, where the spring-biased retainer tabs are configured to deflect laterally during step c) to permit the end-most one of the multi-receptacle units to be pushed off the support rails.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, where like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 7A is an end view—in the direction of arrow "7A" in FIG. 7—showing a packer of the receptacle packing mechanism in isolation within a linear track.

FIG. 10 is a top perspective view of a carrier for consumables to be transported and stored within the system.

FIG. 11 is a bottom perspective view of the carrier.

FIG. 14 is a bottom perspective view of the carrier with a plurality of multi-receptacle units supported there on.

DETAILED DESCRIPTION

Figure 1:
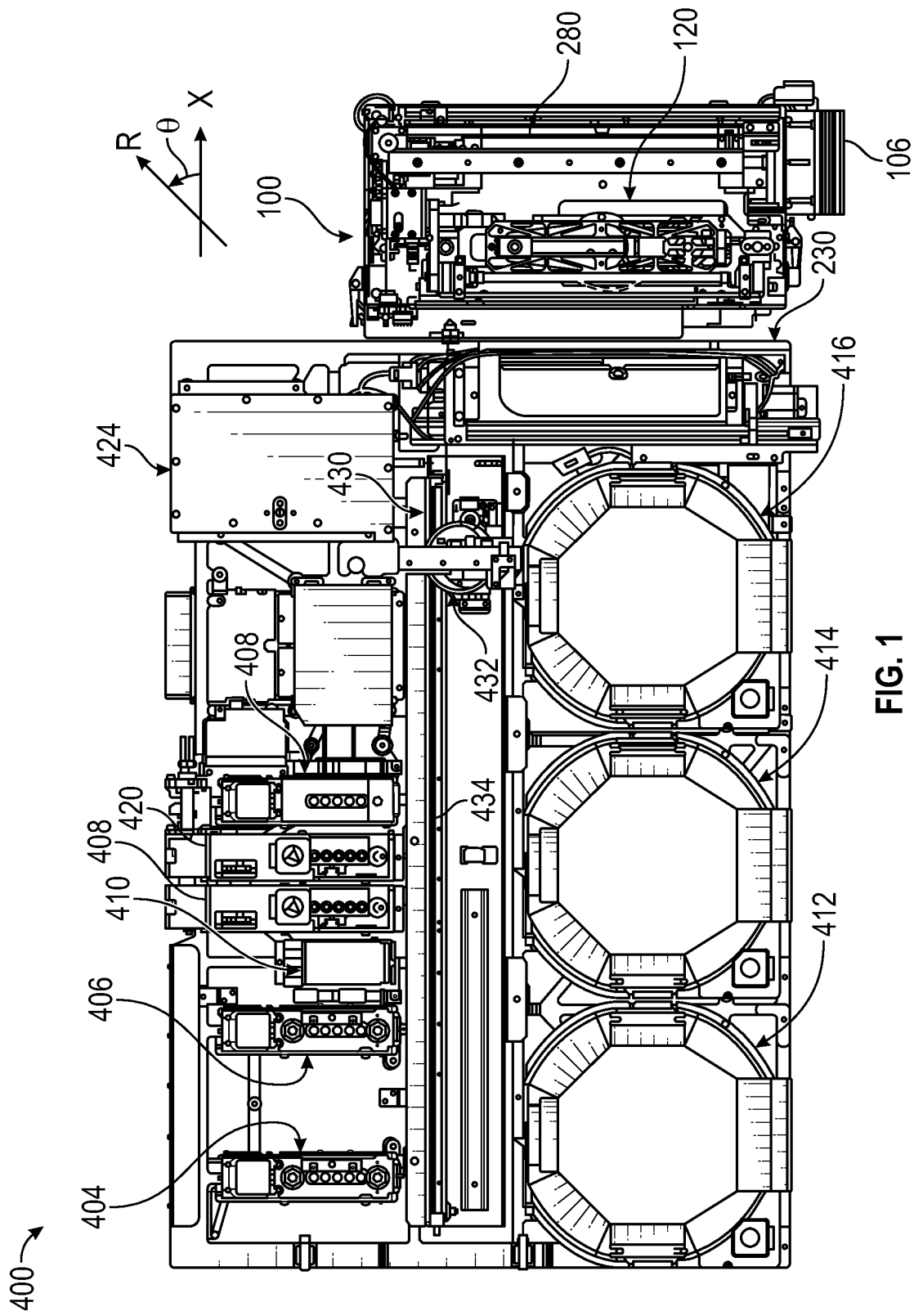
FIG. 1 is a plan view of a system for transporting and holding consumables comprising a transporter/storage module and an input module as disclosed herein combined with a processing instrument for performing a chemical, biological, or other multi-step analytical process.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numerical values (i.e., having the equivalent function or result) in the context of the present disclosure. For example, and not intended to be limiting, this term can be construed as including a deviation of ±10 percent of the given numeric value, provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantial" and "substantially" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described component, structure, element, event, circumstance, characteristic, property, etc. may or may not be included or occur and that the description includes instances where the component, structure, element, event, circumstance, characteristic, property, etc. is included or occurs and instances in which it is not included or does not occur.

A system and method for transporting and holding consumables in a processing instrument are described herein. The processing instrument may be an analyzer for performing a biological, chemical, biochemical, or other multi-step analytical process, and the consumables may comprise receptacles within which such processes are performed in the analyzer. As shown in FIG. 1, aspects of the system and method may include one or both of a transporter/storage module 100 for transporting and holding a supply of consumables to be provided to a processing instrument 400 and an input module 230 configured to receive consumables from the transporter/storage module 100 and to present the consumables for input into the processing instrument 400 by a distributor mechanism within processing instrument 400. Further details of an exemplary processing instrument 400 are described below.

Details of various aspects of the transporter/storage module 100 are shown in FIGS. 2-8.

Figure 2:
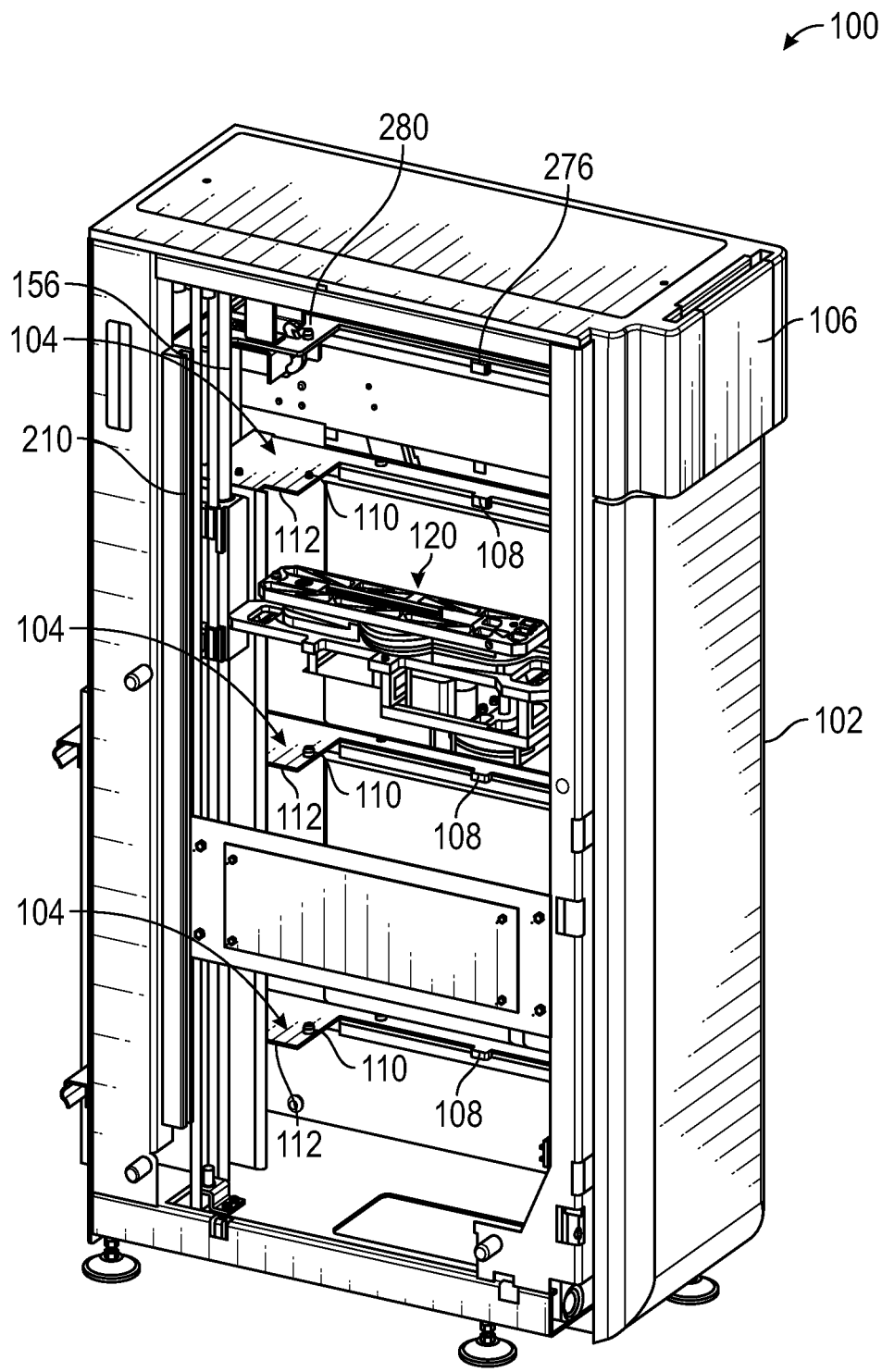
FIG. 2 is a perspective view of a transporter/storage module in accordance with an embodiment of the disclosure.
Figure 3:
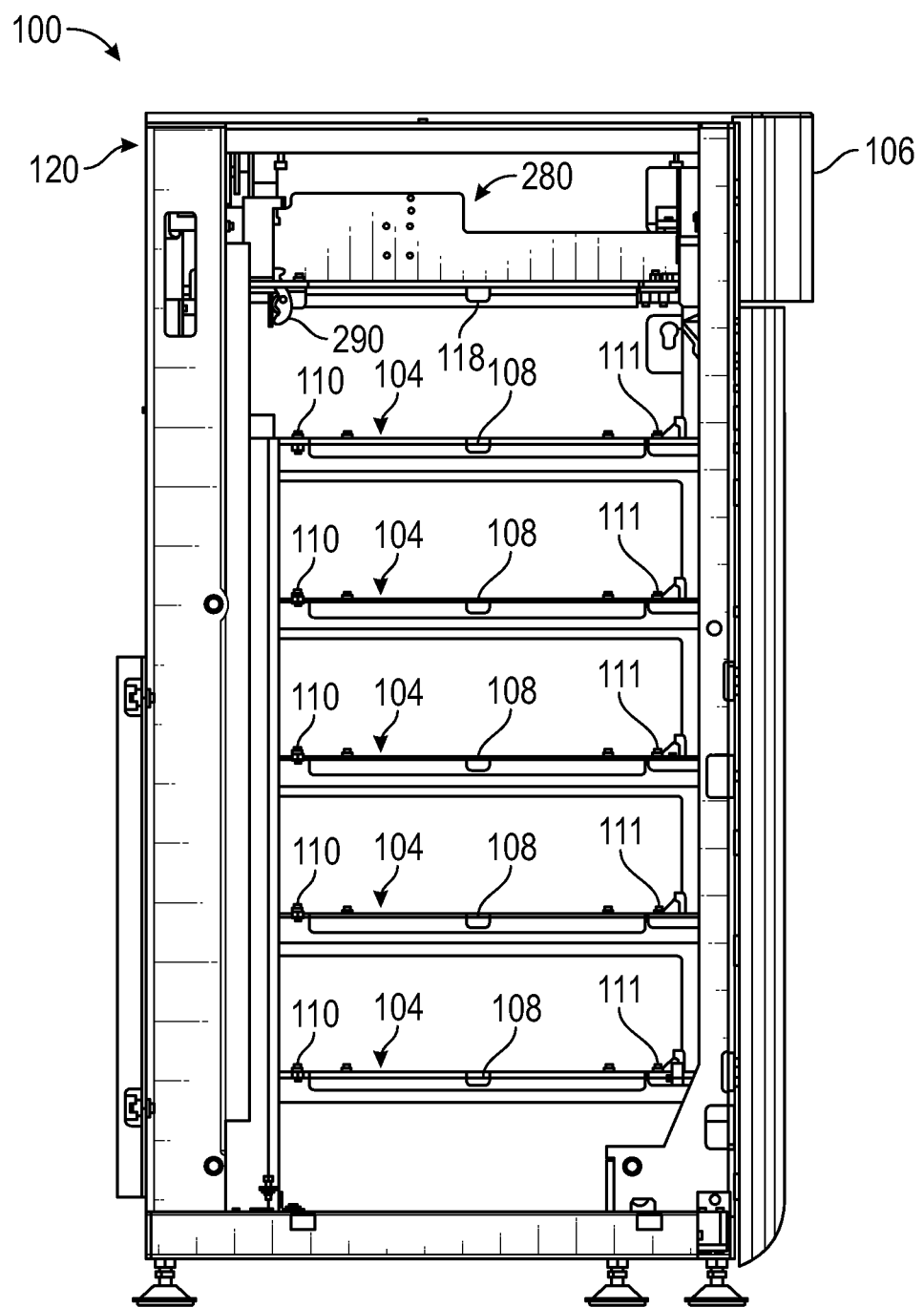
FIG. 3 is a side elevation view of the transporter/storage module.
Figure 6:
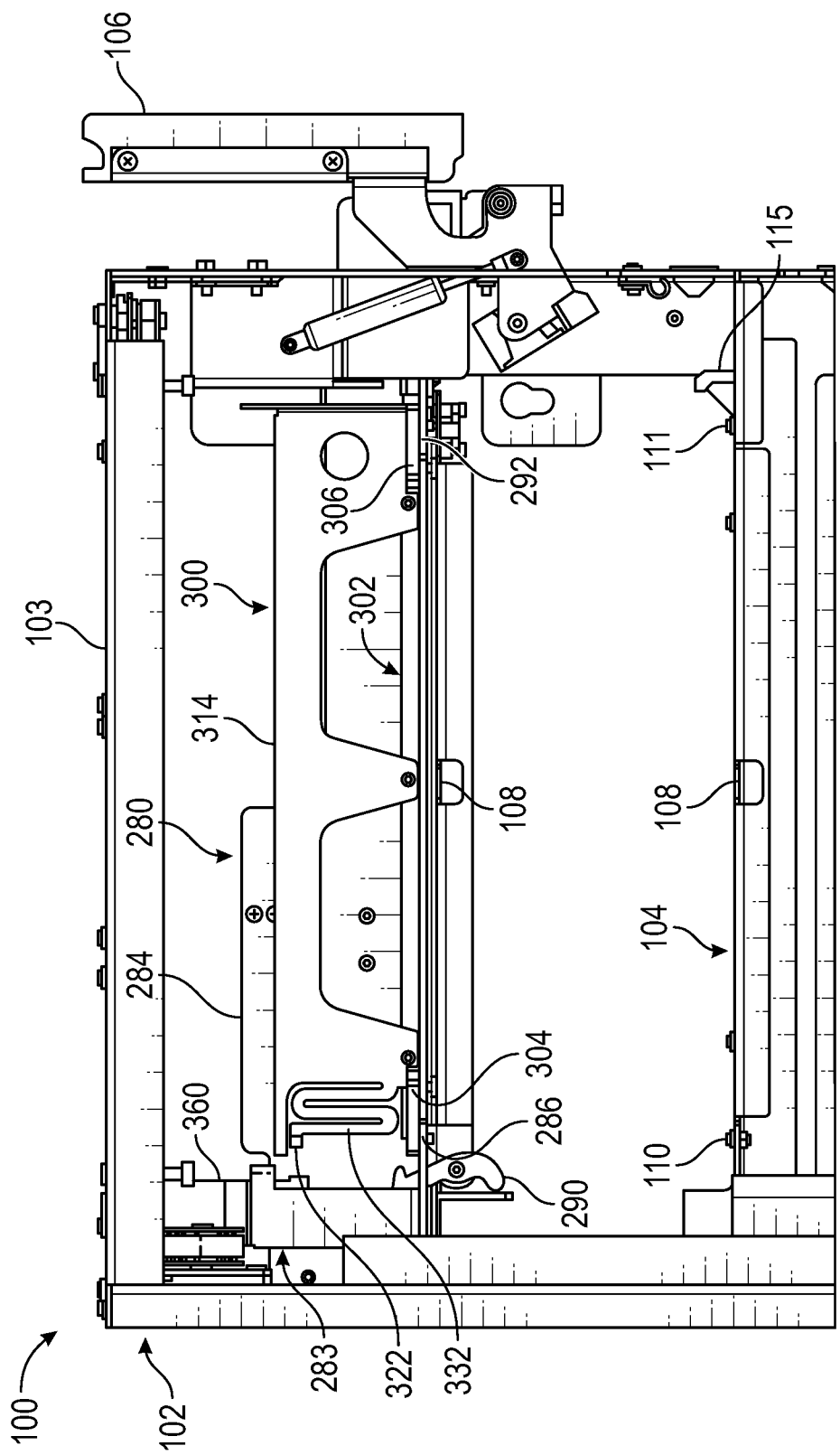
FIG. 6 is a partial side elevation view of the transporter/storage module with the access door in a closed position and the loading drawer inserted into the housing.

FIG. 2 is a perspective view of transporter/storage module 100 for transporting and holding a supply of consumables to be provided to a processing instrument, within which the consumables will be moved, processed, or otherwise manipulated. FIG. 3 is a side elevation view of the transporter/storage module, and FIG. 6 is a partial side view of the transporter/storage module. Transporter/storage module 100 includes a housing 102 and one or more vertically-spaced holding shelves 104. An access door 106 may be opened to permit a loading drawer 280 to be withdrawn from housing 102 so that a plurality of consumables may be placed thereon and then provided to transporter/storage module 100 by inserting loading drawer 280 into the housing 102. The consumables may be supported on carriers configured to be supported on loading drawer 280 or on one of the holding shelves 104.

A transporter 120 is configured to remove the consumables from loading drawer 280 or one of the holding shelves 104, for example, by removing a carrier on which the consumables are supported from the loading drawer 280 or holding shelf 104. Transporter 120 is further configured to move a group of consumables, e.g. a carrier supporting the consumables, or an empty carrier to loading drawer 280 or to one of the holding shelves 104. A vertical transport mechanism is coupled to the transporter 120 and is configured to move the transporter 120 in a vertical direction (up or down) between the loading drawer 280 and holding shelves 104. In one example, the vertical transport mechanism comprises a transport elevator 210 that moves transporter 120, and the consumables (and carrier) supported thereon, vertically within the housing 102.

Input module 230 is configured to receive consumables (for example consumables supported on a carrier) transported by transporter 120 from one of the holding shelves 104 into the input module 230. In an embodiment, the input module 230 may be incorporated into a housing of the processing instrument. From the input module 230, the consumables are selectively retrieved into the processing instrument 400 and are moved about or otherwise manipulated within the processing instrument. After all the consumables have been removed from the carrier within the input module 230, the transporter 120 will move the empty carrier from the input module 230 to the loading drawer 280 or one of the holding shelves 104. Further details of the input module 230 are described below.

Relative positions of the transporter/storage module 100, the transporter 120, the loading drawer 280 and holding shelves 104, and the input module 230 with respect to the processing instrument 400 are shown schematically with dashed lines in FIG. 1. These relative positions are exemplary and are not intended to be limiting.

As shown in FIG. 1, processing instrument 400 may include various modules configured to receive one or more receptacles (examples of which are described in more detail below) within each of which may be performed one or more steps of a biological, chemical, biochemical, or other multi-step analytical process. The modules of the processing instrument 400 constitute receptacle-receiving structures configured to receive and hold one or more receptacles.

Processing instrument 400 may further include load stations 404, 406, 408 configured to receive receptacles and within which one or more materials may be added to the receptacles, e.g., by an automated pipettor (not shown), including sample material and various reaction reagents.

Processing instrument 400 may further comprise one or more parking stations 410 for holding receptacles containing reaction mixtures prior to subsequent processing within another module of the processing instrument 400. Parking stations 410 may include magnets for attracting magnetically-responsive solid supports to the inner walls of receptacles, thereby pulling the solid supports out of suspension. An exemplary parking station is described in U.S. Pat. No. 8,276,762.

Processing instrument 400 may include one or more incubators 412, 414, 416 configured to receive a plurality of receptacles and to heat (and/or maintain) the contents of the receptacles at a temperature higher than ambient temperature. The illustrated embodiment includes three incubators 412, 414, 416, each of which may be configured to heat and/or maintain the contents of the receptacles at a different temperature. Exemplary incubators are described in U.S. Pat. Nos. 7,964,413 and 8,718,948.

Processing instrument 400 may include sample-processing devices, such as magnetic wash stations 418, 420, adapted to separate or isolate a target nucleic acid or other analyte (e.g., immobilized on a magnetically-responsive solid support) from the remaining contents of the receptacle. Exemplary magnetic wash stations are described in U.S. Pat. Nos. 6,605,213 and 9,011,771.

Processing instrument 400 may further include a detector 424 configured to receive a receptacle and to detect a signal (e.g., an optical signal, such as fluorescence or chemiluminescence) emitted by the contents of the receptacle. In one implementation, detector 424 may comprise a luminometer for detecting luminescent signals emitted by the contents of a receptacle and/or a fluorometer for detecting fluorescent emissions from the contents of the receptacle. Processing instrument 400 may also include one or more signal detecting devices, such as, for example, fluorometers (e.g., coupled to one or more of incubators 412, 414, 416) configured to detect (e.g., at periodic intervals) signals emitted by the contents of receptacles contained in the incubators while a process, such as nucleic acid amplification, is occurring within the reaction receptacles. Exemplary luminometers and fluorometers are described in U.S. Pat. Nos. 7,396,509 and 8,008,066.

The processing instrument 400 further includes a receptacle transport apparatus, which, in the illustrated embodiment, comprises a receptacle distributor 430. Each of the modules of the processing instrument 400 includes a receptacle transfer portal through which receptacles are inserted into or removed from the respective module. Each module may or may not include an openable door covering its receptacle portal. Receptacle distributor 430 is configured to move receptacles between the various modules and retrieve receptacles from the modules and deposit receptacles into the modules. More specifically, receptacle distributor 430 includes a receptacle distribution head 432 configured to move in an X direction along a transport track 434, rotate in a theta (θ) direction, and move receptacles in an R direction into and out of the receptacle distribution head 432 and one of the modules of processing instrument 400. The receptacle distributor 430 may further be configured to remove receptacles, one-at-a-time, from the input module 230 described herein.

In operation, receptacle distribution head 432 moves in the X direction along the transport track 434 to a transfer position with respect to one of the modules or the input module 230. The distribution head then rotates in the θ direction to place the distribution head in a receptacle transfer orientation with respect to the receptacle transfer portal of the module or the input module 230. A receptacle moving mechanism, e.g. a linearly-actuated hook, moves in an R direction with respect to the distribution head 432 to move a receptacle from the distribution head 432 into the module or to retrieve a receptacle from the module or input module 230 into the distribution head 432. In an embodiment, receptacle distributor 430 further includes means for effecting vertical (Z-axis, normal to the page of FIG. 1) position adjustment of the distribution head 432 to accommodate variations in vertical position of the receptacle transfer portals of the various modules. Receptacle distributor 430 may include structural elements and associated control logic for opening a door that is covering a receptacle transfer portal before inserting a receptacle into the module or removing the receptacle from the module.

An exemplary receptacle transport apparatus, exemplary receptacle transfer portal doors, and mechanisms for opening the doors are described in U.S. Pat. No. 8,731,712.

Exemplary processing instruments with which transporter/storage module 100 may be used include analyzers described in U.S. Pat. Nos. 8,731,712 and 9,732,374 and International Patent Application No. PCT/US2018/041472, as well as the Panther® and Panther Fusion® systems available from Hologic, Inc. (Marlborough, MA).

Figure 9:
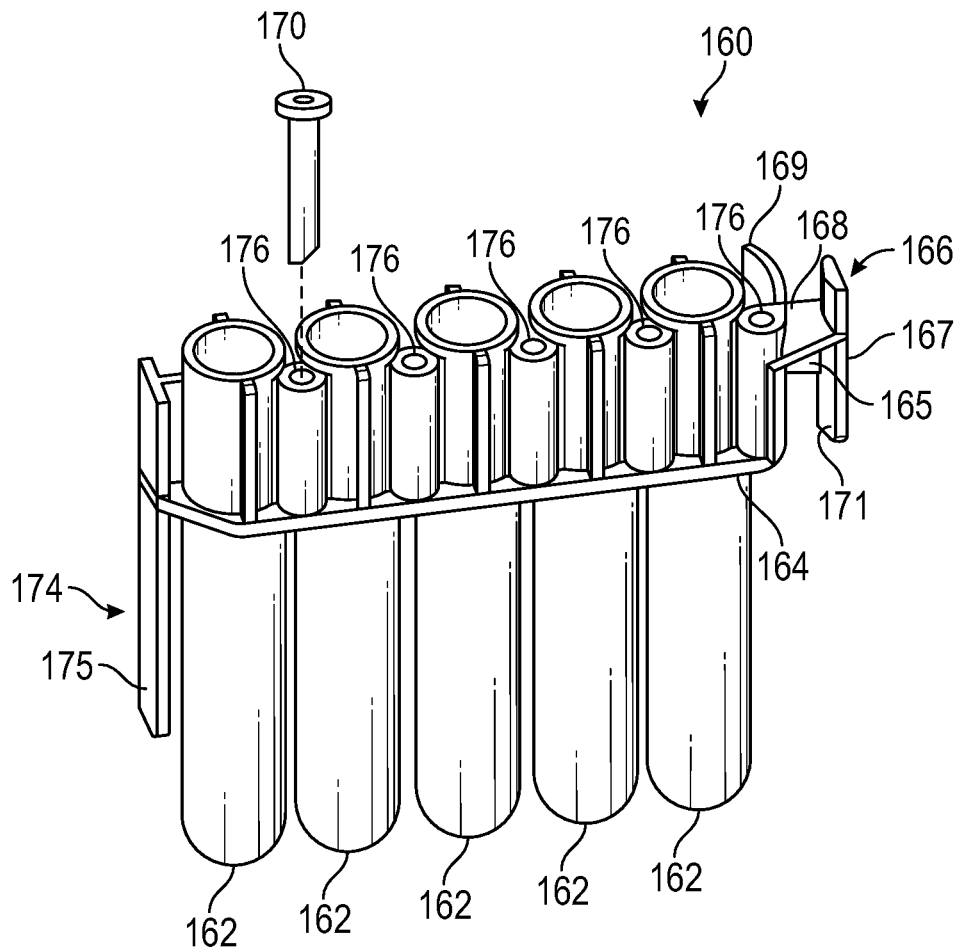
FIG. 9 is a perspective view of a multi-receptacle unit of a type to be transported and stored in an embodiment of the system.

Exemplary consumables that may be transported and stored within module 100 and provided to the processing instrument by input module 230 may include receptacles for holding volumes of substances, such as a multi-receptacle unit 160 shown in FIG. 9. As shown in FIG. 9, a multi-receptacle unit ("MRU") 160 comprises a plurality of individual receptacles 162 (five in the illustrated embodiment). In alternate embodiments, an MRU may include more or less than five receptacles 162. In the illustrated example, receptacles 162 are in the form of cylindrical tubes (e.g., test tubes) with open top ends and closed bottom ends and are connected to one another by a connecting rib structure 164 which defines a downwardly facing shoulder extending longitudinally along either side of MRU 160. In other examples, receptacles having configurations other than cylindrical tubes are contemplated. The receptacles may have the same or different sizes and/or shapes.

In an embodiment, an arcuate shield structure 169 is provided at one end of MRU 160. An MRU manipulating structure 166 extends from the shield structure 169. The manipulating structure is adapted to be engaged by a receptacle distributor of the processing instrument, such as receptacle distributor 430 of processing instrument 400 described above, for withdrawing MRU 160 from the input module 230 and for moving MRU 160 between different locations of the processing instrument 400. MRU manipulating structure 166 comprises a laterally extending plate 168 extending from shield structure 169 with a vertically extending piece 167 on the opposite end of the plate 168. A gusset wall 165 extends downwardly from lateral plate 168 between shield structure 169 and vertical piece 167.

Shield structure 169 and vertical piece 167 have mutually facing convex surfaces. MRU 160 may be engaged by a distributor (e.g., distributor 430), by moving an engaging member (e.g., a hook) laterally into the space between shield structure 169 and vertical piece 167. The convex surfaces of shield structure 169 and vertical piece 167 provide for wider points of entry for an engaging member moving laterally into the space.

A label-receiving structure 174 having a flat label-receiving surface 175 is provided on an end of MRU 160 opposite the shield structure 169 and MRU manipulating structure 166. MRU 160 may also include tiplet holding structures 176 adjacent the open mouth of each respective receptacle 162. Each tiplet holding structure 176 provides a cylindrical orifice within which is received a conduit, such as contact-limiting tiplet 170, that is adapted to be placed onto the end of an aspirating tube (not shown). An exemplary multi-receptacle unit is described in U.S. Pat. No. 6,086,827.

Carrier

A carrier for holding consumables to be transported and stored in module 100 is indicated by reference number 300 in FIG. 10, which is a top perspective view of the carrier 300, and in FIG. 11, which is a bottom perspective view of the carrier 300. In an example, carrier 300 may comprise a type of rack that includes a carrier base 302 that, in various embodiments, comprises a first end 304, a second end 306, and a connecting portion 308 extending between first end 304 and the second end 306 and being generally narrower than the first and second ends 304, 306.

A pair of parallel support rails 312, 314 extend substantially the entire length of carrier base 302 and are attached to carrier base 302 by, for example, fasteners or fastener elements 324 attaching support rails 312, 314 to opposed edges of the connecting portion 308 so that the spacing between support rails 312, 314 is defined by the width of the connecting portion 308. Support rails 312, 314 and carrier base 302 may be made of any suitable material having sufficient strength and rigidity. Ideally, carrier 300 is constructed of lightweight materials to enable rapid movement of the carrier. In one example, support rails 312, 314 are made from spring steel, and the carrier base 302 is made from aluminum. Fastener elements 324 may be welds or any suitable mechanical fasteners, such as, screws, rivets, or bolts, or a combination thereof.

As shown in FIG. 11, carrier base 302 includes a shelf locator hole 340 and a lift platform locator hole 344 formed in the bottom of the carrier base near the first end 304. The carrier base 302 further includes a lift platform locator slot 346 and a shelf locator slot 342 formed in the bottom of the carrier base adjacent the second end 306.

The support rails 312, 314 include hard stops 316, 318, respectively. In the illustrated example, hard stops 316, 318 comprise stop flanges extending transversely with respect to the support rails 312, 314, and each hard stop 316, 318 is supported at its bottom end by the second end 306 of the carrier base 302 to provide lateral stability to the corresponding support rail.

Each support rail 312, 314 includes a retainer tab 320, 322, respectively. Retainer tab 320 is disposed at the end of a serpentine spring 330, and retainer tab 322 is disposed at the end of a serpentine spring 332. The serpentine springs 330, 332 permit lateral flexing of the retainer tabs 320, 322, respectively. In an embodiment, the springs 330, 332 are contiguous with and cut from the support rails 312, 314 (e.g., by laser cutting), which, as noted above, may be formed from spring steel. In another embodiment (not shown), the retainer tabs 320, 322 may be disposed at the ends of serpentine springs that are distinct from, but attached to, the support rails 312, 314.

In the embodiment of the rail 300 shown in FIGS. 10 and 11, tabs 320 and 322 are located below ends 334, 336, of support rails 312, 314, respectively. In an alternate embodiment shown in FIG. 12, carrier 600 includes retainer tabs 620, 622 at the ends of serpentine springs 630, 632, respectively, and which are not positioned beneath, but are longitudinally aligned with the ends 634, 636, respectively, of support rails 612, 614. In other respects, carrier 600 may be substantially identical to carrier 300, with a carrier base 602, including a first end 604 similar to first end 304, and a connecting portion 608 similar to connection portion 308, to which support rails 612 and 614 are attached.

Figure 12:
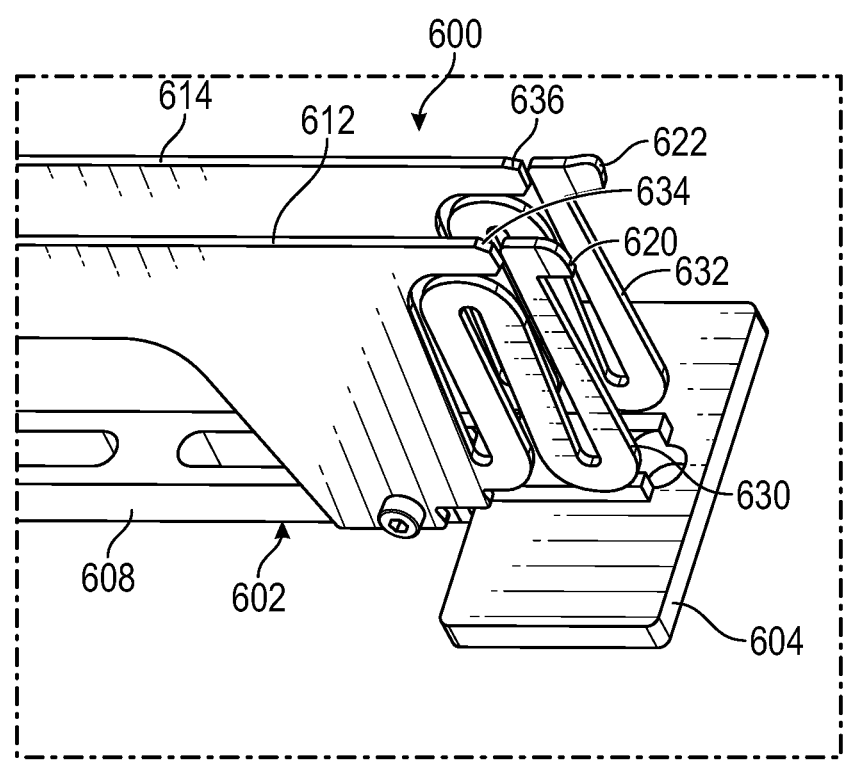
FIG. 12 is a partial perspective view of an alternate embodiment of the carrier.

Carrier 300 shown in FIGS. 10 and 11, and carrier 600 shown in FIG. 12, are particularly configured to hold a plurality of the MRUs 160 shown in FIG. 9, although other carrier configurations may be incorporated. Each MRU 160 is supported on the carrier 300 or 600 with the middle receptacle 162 disposed between the support rails 312, 314, or support rails 612, 614. The portions of the connecting rib structure 164 connecting the middle receptacle 162 to the adjacent receptacles on either side of it are supported on the top edges of the support rails 312, 314 or support rails 612, 614.

Figure 13:
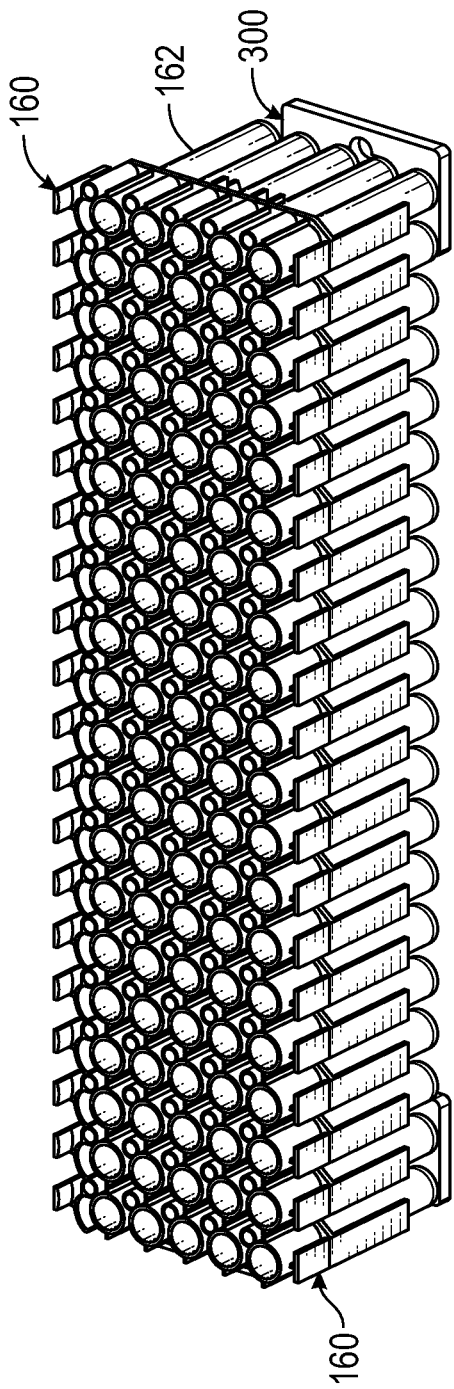
FIG. 13 is a top perspective view of the carrier with a plurality of multi-receptacle units supported thereon.
Figure 14:
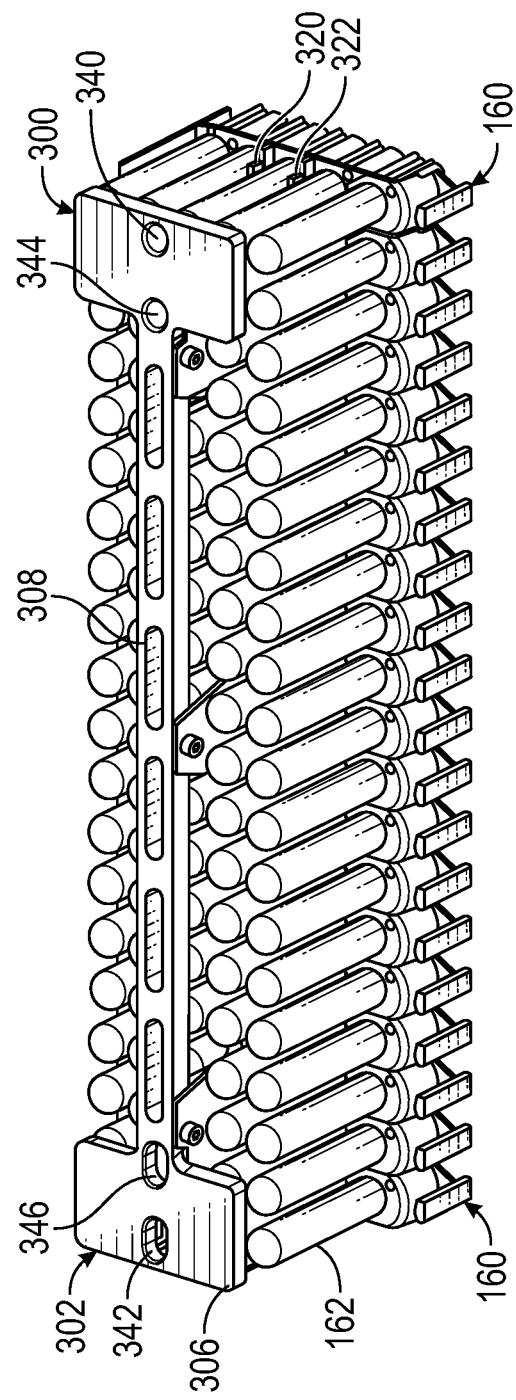

FIGS. 13 and 14 are top and bottom perspective views, respectively, of a carrier 300 holding a plurality of MRUs 160. When the carrier 300 is fully loaded with MRUs 160, as shown in FIGS. 13 and 14, the front-most (left end in the figures) MRU 160 presses against the hard stops 316, 318, which prevents the MRU from sliding off the left ends of the support rails 312, 314. The retainer tabs 320, 322 are each bent laterally outwardly so that the tabs contact the receptacles 162 on either side of the center receptacle disposed between the support rails 312, 314. Alternatively, the retainer tabs 320, 322 can be bent laterally inwardly so that the tabs contact the center receptacle 162 disposed between the support rails 312, 314.

The retainer tabs 320, 322 provide resistance against the end-most (right end in the figures) MRU 160 sliding off the right ends of the support rails 312, 314, e.g., to prevent the MRUs 160 from "walking" off the ends of the support rails 312, 314—when in a horizontal orientation—due to ambient vibrations. Because the retainer tabs 320, 322 are disposed at the ends of their respective serpentine springs 330, 332, each tab may flex inwardly for outwardly bent retainer tabs 320, 322 or may flex outwardly for inwardly bent retainer tabs 320, 322, so that a nominal force applied to the end-most MRU 160, e.g. by pushing the entire stack of MRUs to the right, will overcome the resistance generated by the retainer tabs 320, 322, so that the end-most MRU 160 can be forced off the right ends of the support rails 312, 314.

Figure 4:
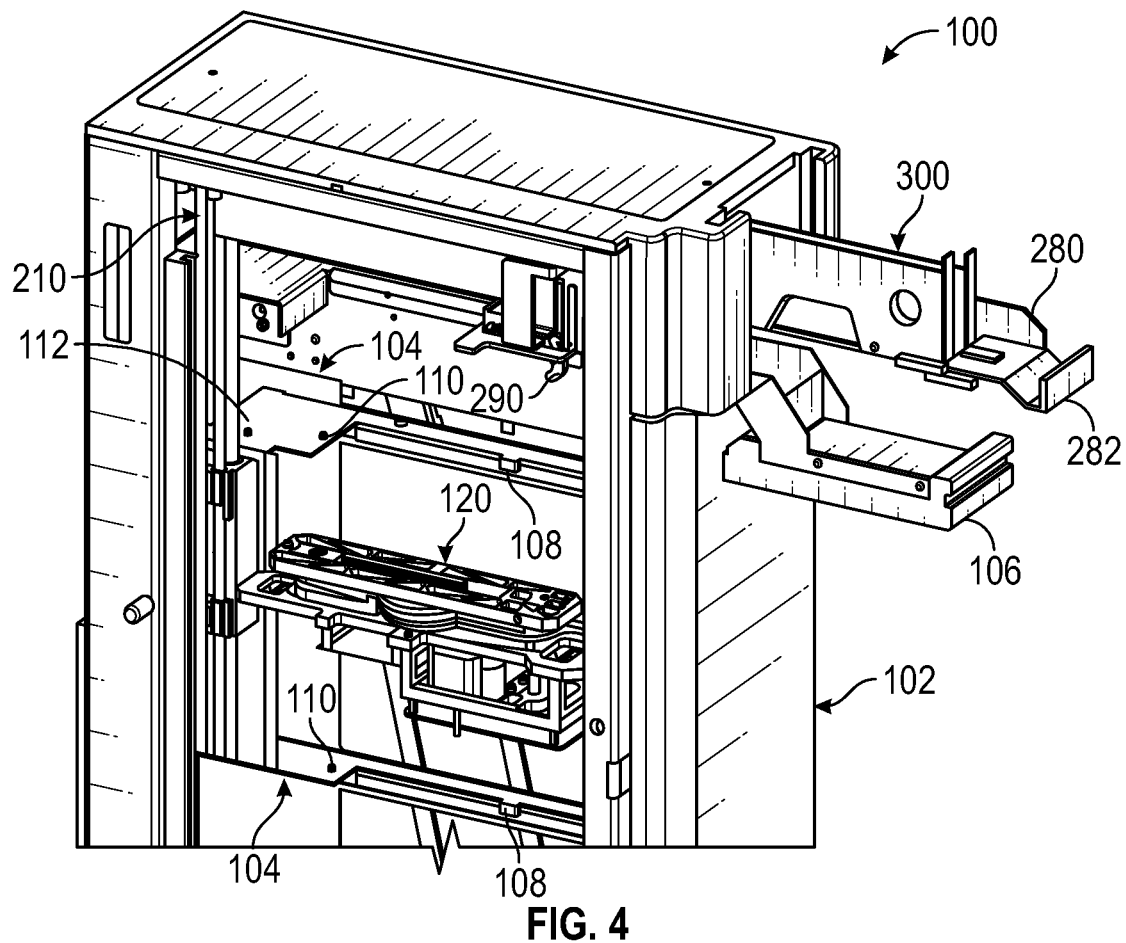
FIG. 4 is a partial perspective view of the transporter/storage module with an access door in an open position and a loading drawer partially withdrawn from a housing of the module.
Figure 4A:
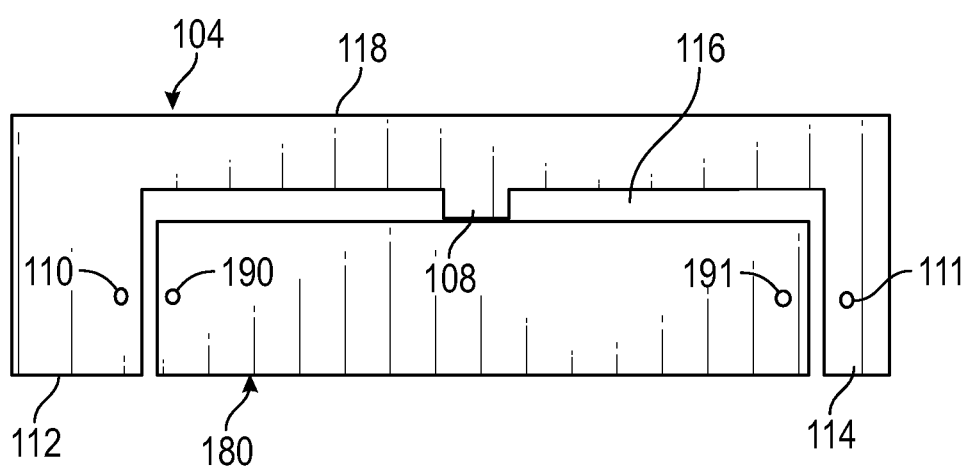
FIG. 4A is a top plan view of a holding shelf with a lift platform positioned within an open area of the holding shelf.

Features of a holding shelf 104 are shown in FIG. 4A, which is a top plan view of a holding shelf with a lift platform positioned within an open area of the holding shelf. Holding shelf 104 includes a first shelf portion 112 and a second shelf portion 114 with a connecting portion 118 extending between the first and second shelf portions 112, 114 and an open area 116 between the first and second shelf portions 112, 114. A holding shelf positioning tab 108 extends laterally from the connecting portion 118. A first locator pin 110 protrudes above the first shelf portion 112, and a second locator pin 111 protrudes above the second shelf portion 114.

When the carrier 300 is supported on the holding shelf 104, the first locator pin 110 is received in the shelf locator hole 340 and the second locator pin 111 is received in the shelf locator slot 342. The locator pins 110, 111 and the shelf locator hole 340 and shelf locator slot 342 formed in the carrier base 302 facilitate accurate positioning of the carrier 300 on the holding shelf 104 and prevent lateral sliding of the carrier 300 within the holding shelf. To accommodate machining and manufacturing tolerances, the carrier 300 is positioned within the holding shelf 104 by the locator hole 340 at one end of the carrier 300 and the locator slot 342 at the other end of the carrier 300, the elongated slot accommodating variations in the distance between the first and second locator pins 110, 111.

In an alternate embodiment, locator pins may be provided on the carrier and locator holes may be provided on the holding shelf. For example, carrier 300 may include downwardly-projecting locator pins at the positions of shelf locator hole 340 and shelf locator slot 342 that engage locator holes (e.g., one locator hole and one locator slot) formed in the holding shelf 104 at the positions of first and second locator pins 110, 111. In another embodiment, the carrier includes more or less than two locator holes/slots or locator pins that align with a corresponding number of locator pins or locator holes/slots, respectively, on the holding shelf.

The holding shelf 104 may include a sensor, such as carrier detection sensor 115 shown in FIG. 6, for detecting when a carrier 300 is positioned on the holding shelf 104. Details of an exemplary optical sensor are described below.

Loading Drawer

Various exemplary features of a loading drawer 280 are shown in FIGS. 5-8. Loading drawer 280, which may also function as a holding shelf for holding a carrier 300, 600, comprises a support for the carrier—and thus may also be referred to as a carrier support—that is movable in a lateral direction with respect to the housing 102 between a first position (shown in FIGS. 2, 3, 5, and 6) accessible by the transporter 120 and a second position accessible by a user to load a plurality of consumables into the drawer (shown in FIG. 4, which is a partial perspective view of the transporter/storage module 100 with the access door 106 in an open position and the loading drawer 280 partially withdrawn from the housing 102 of the module 100). Loading drawer 280 may be supported within the housing 102 on a linear track 281 (see FIG. 7), such as a linear bearing, enabling the loading drawer 280 to be moved between the first position (also referred to as the closed position) and second position (also referred to as the closed position). A sensor 299, which may comprise an optical sensor, within the housing 102 (see FIGS. 5 and 7) may be provided to detect when the loading drawer 280 is in the closed position inserted into the housing 102.

Figure 8:
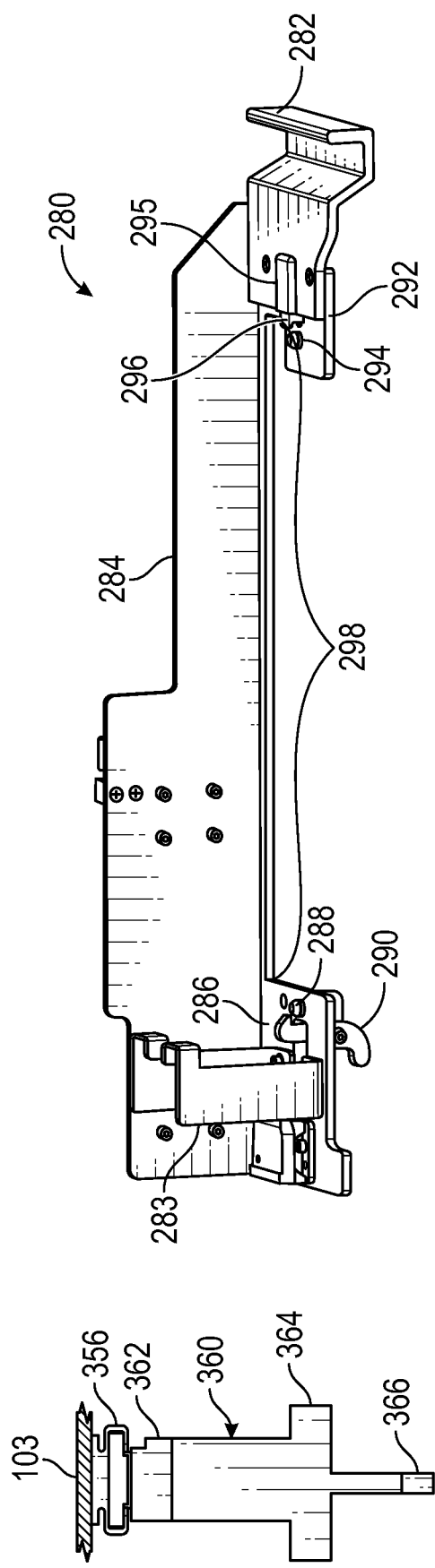
FIG. 8 is a perspective view of the loading drawer removed from the module housing.

Features of loading drawer 280 are shown in FIG. 8. Loading drawer 280 includes a sidewall 284 extending substantially the length of the drawer, a handle 282, a first shelf 286, and a second shelf 292 with an open space 298 between first shelf 286 and second shelf 292. A pair of stops 283 extend above the first shelf 286 and prevent any MRUs 160 from falling off an end of a carrier 300 (or 600) supported on the loading drawer 280, especially as the loading drawer 280 is moved from the open position to the closed position or when a user is loading MRUs 160 onto the carrier. A first locator pin 288 protrudes above first shelf 286, and a second locator pin 294 protrudes above second shelf 292. First shelf 286 includes a pivoting latch 290, and second shelf 292 includes a slide latch 296. Loading drawer 280 is supported within module housing 102 by one or more slides, tracks (such as linear track 281), rollers, or a combination thereof for sliding movement of loading shelf 280 into and out of an access port formed in module housing 102 at access door 106. A loading drawer positioning tab 276 extends laterally from housing 102 at a position adjacent the loading drawer 280.

Figure 7:
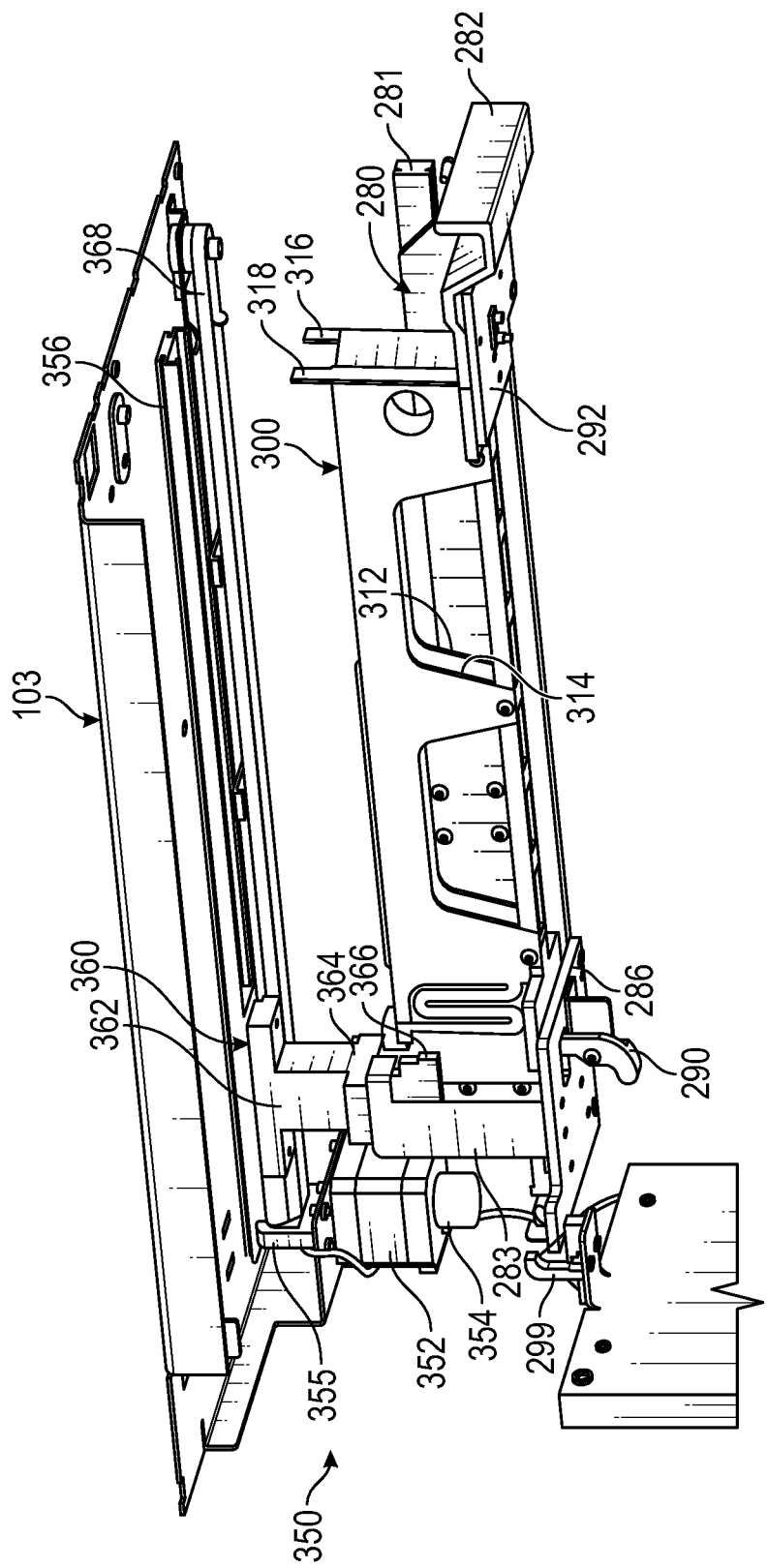
FIG. 7 is a partial perspective view of the loading drawer inserted into the housing with a carrier disposed in the loading drawer and showing a receptacle packing mechanism.

Loading drawer 280 is configured to support a carrier 300 (or 600) on first shelf 286 and second shelf 292. As shown in FIGS. 6 and 7, carrier 300 is supported on loading drawer 280 with first end 304 of carrier base 302 supported on first shelf 286 and second end 306 of carrier base 302 supported on second shelf 292. A sensor 297, which may comprise an optical sensor, within the housing 102 (see FIG. 5) may be provided to detect the presence of a carrier 300 (or 600) within the loading drawer 280.

When carrier 300 is supported in loading drawer 280, the first locator pin 288 of loading drawer 280 is received in shelf locator hole 340 and the second locator pin 294 of loading drawer 280 is received in shelf locator slot 342. The locator pins 288, 294 and the shelf locator hole 340 and shelf locator slot 342 formed in the carrier base 302 facilitate accurate positioning of the carrier 300 in the loading drawer 280 and prevent lateral sliding of the carrier 300 with respect to the loading drawer 280. To accommodate machining and manufacturing tolerances, the carrier 300 is positioned within the loading drawer 280 by shelf locator hole 340 at one end of the carrier 300 and shelf locator slot 342 at the other end of the carrier 300, the shelf locator slot 342 being elongated to accommodate variations in the distance between first and second locator pins 288, 294.

In an alternate embodiment, locator pins may be provided on the carrier and locator holes may be provided on the loading drawer. For example, carrier 300 may include downwardly-projecting locator pins at the positions of shelf locator hole 340 and shelf locator slot 342 that engage locator holes (e.g., one locator hole and one locator slot) formed in the loading drawer 280 at the positions of first and second locator pins 288, 294. In another embodiment, the carrier includes more or less than two locator holes/slots or locator pins that align with a corresponding number of locator pins or locator holes/slots, respectively, on the loading drawer.

In various embodiments, when loading drawer 288 is pulled to the open position (i.e., extended from the housing 102) so that MRUs 160 (or other consumables that a different carrier is configured to hold) can be loaded onto carrier 300, it is preferred that carrier 300 not be removed or removable from loading drawer 280. Conversely, when loading drawer 288 is in the closed position (i.e., inserted into module housing 102), it is necessary that carrier 300 is removable from loading drawer 280 so that carrier 300 can be removed from loading drawer 280 by transporter 120 and moved to one of the holding shelves 104 or to the input module 230. Accordingly, loading drawer 280 includes locking mechanisms that lock carrier 300 to loading drawer 280 when the drawer 280 is in the open position and release carrier 300 from loading drawer 280 when drawer 280 is in the closed position.

In an embodiment, the locking mechanisms are provided by pivoting latch 290 and slide latch 296. Pivoting latch 290 is configured to pivot with respect to first shelf 286 between a locking position disposed over a portion of first end 304 of carrier base 302 and a released position not extended over any portion of carrier base 302. Slide latch 296 is configured to slide into and out of a receptacle 295 between an extended, or locking, position disposed over a portion of second end 306 of carrier base 302 and a retracted, or released, position that is not extended over any portion of carrier base 302.

Pivoting latch 290 is spring biased, for example, by a torsional spring or the like, into the locking position, and slide latch 296 is biased, for example, by a linear spring, into the extended position. Thus, without any external agencies or forces to overcome the biases of pivoting latch 290 and slide latch 296, carrier 300 will be locked into loading drawer 280 by latches 290 and 296. This will be the state when loading drawer 280 is in the open or withdrawn position. When loading drawer 280 is in the closed position, as shown in FIG. 6, a lower end of pivoting latch 290 contacts a hard stop inside module 100, causing pivoting latch 290 to rotate (counter-clockwise in the illustrated embodiment) from the locking position to the released position, thereby releasing first end 304 of carrier base 302. Similarly, when loading drawer 280 is in the closed position, slide latch 296 will contact a hard stop that pushes slide latch 296 into the retracted position within receptacle 295, thereby releasing second end 306 of carrier base 302. Thus, when loading drawer 280 is fully inserted into module housing 102, carrier 300 will be released from loading drawer 280 and can be moved by transporter 120 to some other location within module 100 or input module 230.

A receptacle packer 350 is configured to push the MRUs 160 held on a carrier 300 (or 600) that is supported within input loading shelf 280 toward the second end of carrier 300 at which hard stops 316, 318, are located to pack the MRUs 160 into a relatively tight pack of MRUs (i.e., the MRUs 160 are pushed together so that adjacent MRUs 160 contact each other). Receptacle packer 350 includes a packer 360 (see also FIG. 7A) that is comprised of a packer carriage 362 coupled to a packer track 356 (e.g., a linear bearing attached to a top panel 103 of housing 102) and is configured to translate (e.g., slide or roll) bi-directionally along the track 356. The packer carriage 362 is attached to a packer drive belt 368 that is coupled to a packer motor 352, which may be a stepper motor, for effecting powered translation of packer 360 along packer track 356.

In other examples, the packer 360 may be automatically moved in a linear manner by other means, such as a rack and pinion, drive screw, hydraulic or pneumatic piston, etc.

As shown in FIG. 7A, in various embodiments, packer 360 further comprises a horizontal portion 364 connected to the packer carriage 362 and a contact portion 366 extending downwardly from horizontal portion 364. In an embodiment shown in FIG. 7, the contact portion 366 is aligned with a gap between the support rails 312, 314 of the carrier 300 that is disposed within the loading shelf 280. As the packer 360 moves along the packer track 356, the contact portion 366 moves between the support rails 312, 314 and contacts a middle receptacle 162 of the MRU 160 that is disposed between the support rails 312, 314 and packs the MRUs against the hard stops 316, 318. Contact portion 366 may also be arranged to pass between the pair of stops 283. Horizontal portion 364 of the packer 360 contacts the end most MRU 160 above the support rails 312, 314 and keeps the MRUs 160 square on the support rails 312, 314 (i.e., keeps the MRUs 160 generally perpendicular to the longitudinal direction of the sup-port rails 312, 314) while the MRUs 160 are being pushed to prevent the MRUs 160 from getting crooked and binding on the support rails 312, 314.

A position encoder, such as rotary encoder 354 operatively coupled to the packer motor 352, detects the longitudinal position of packer 360 relative to a home position detected by a home sensor 355, which may comprise an optical sensor as described below. For example, a longitudinal position of the packer 360 may be determined by the number of encoder counts executed in a motorized movement of the packer 360 from a detected home position. In an embodiment, the home position may be a position at which the packer 360 is fully retracted, for example, as shown in FIG. 7. Alternatively, if packer motor 352 is a stepper motor, the longitudinal position of packer 360 may be determined by counting motor steps. The packing mechanism 350 may be calibrated to determine the number of MRUs 160 held on the carrier 300, based on the longitudinal position of that packer 360 at which the MRUs are packed together and the width of the MRUs 160. A position at which the MRUs are packed together may be determined, for example, by a threshold resistance detected by the packer motor 352, Input Module In the illustrated example, the input module 230 comprises a receptacle dispenser station configured to receive a carrier holding one or more receptacles and to present the receptacles for input into the instrument.

Details of input module 230 are shown in FIGS. 22-25. Input module 230 is configured to hold a carrier (e.g., carrier 300 or carrier 600) loaded with one or more consumables (e.g., MRUs 160) within, or adjacent to, a processing instrument (e.g., processing instrument 400) and to present the consumables for retrieval into the instrument by a distributor mechanism (e.g., distributor 430) within the instrument.

Figure 22:
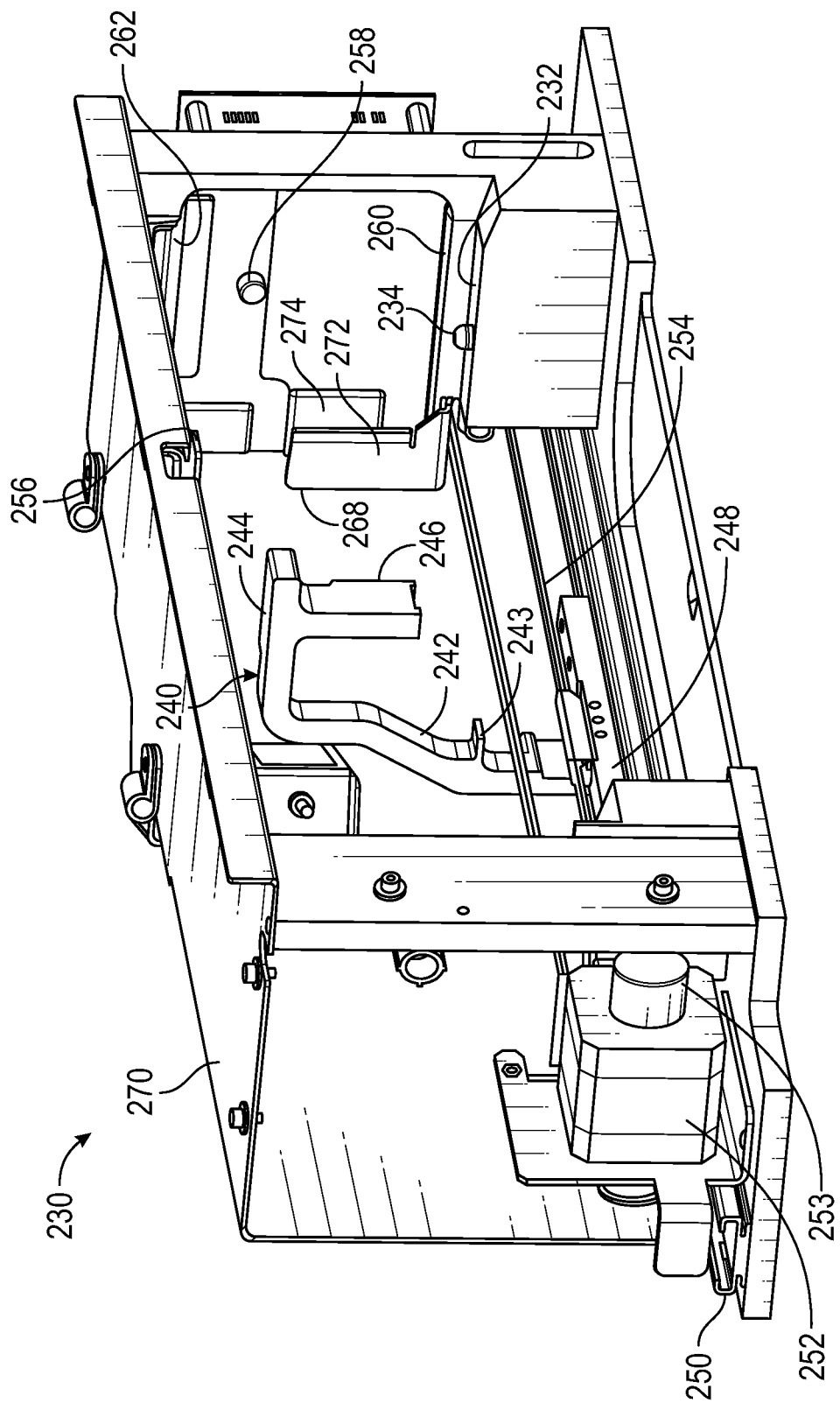
FIG. 22 is a front, right perspective view of an input module of the system for transferring consumables from the transporter/storage module to the processing instrument.
Figure 23:
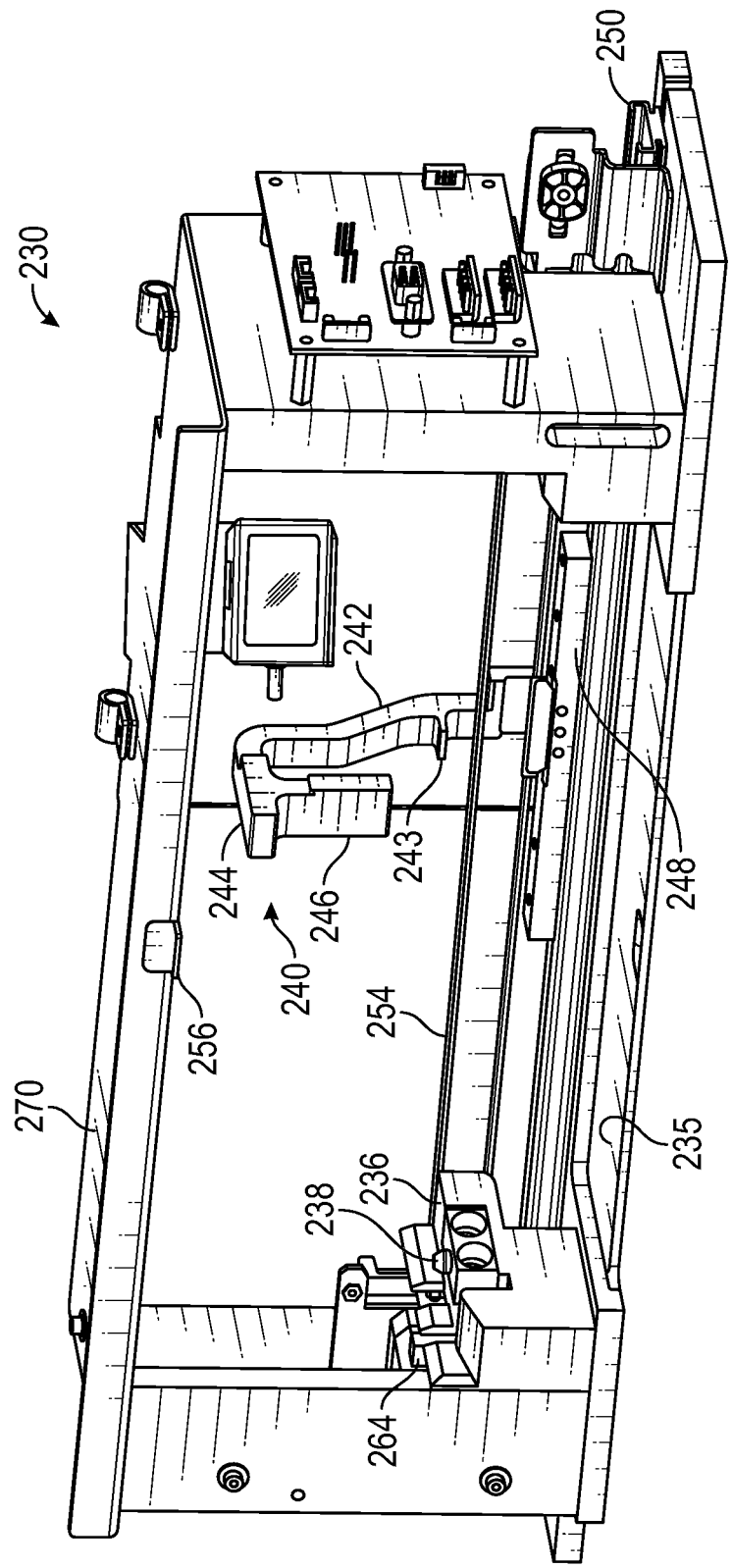
FIG. 23 is a back, right perspective view of the input module.
Figure 24:
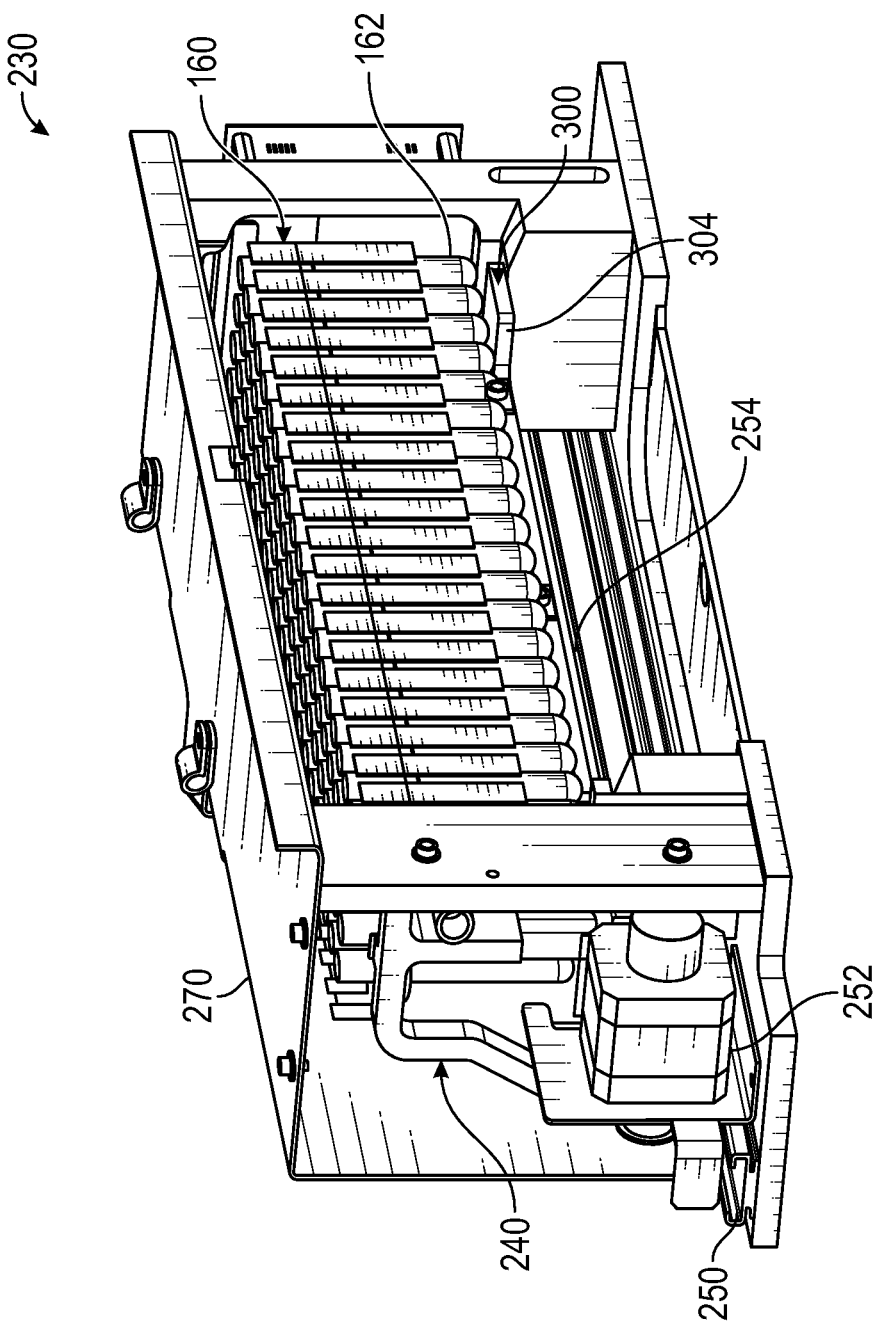
FIG. 24 is a front, right perspective view of the input module with a carrier supporting a plurality of multi-receptacle units positioned within the queue.
Figure 25:
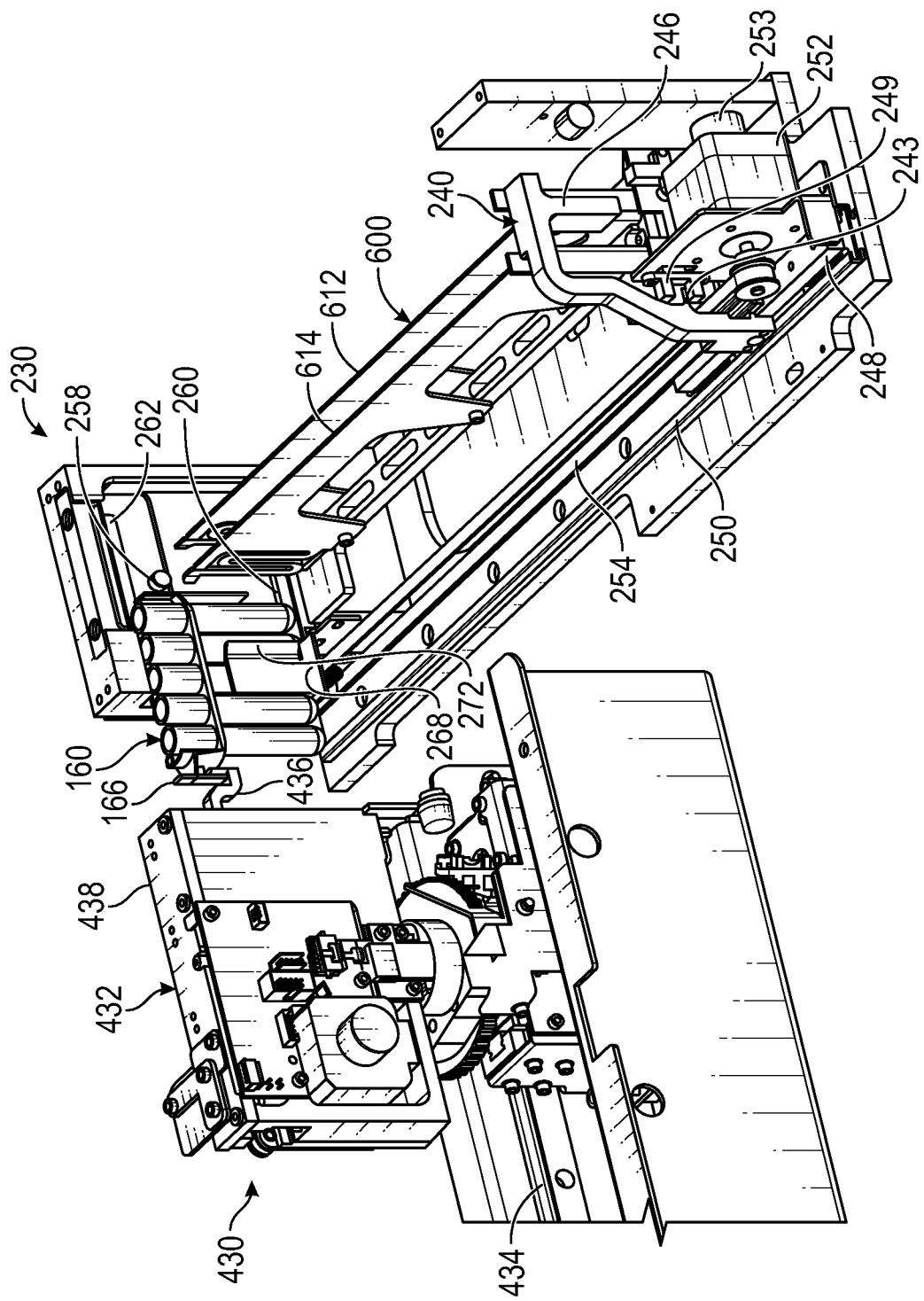
FIG. 25 is a front, left perspective view of the input module with a receptacle distribution head of a receptacle distributor of the processing instrument pulling a multi-receptacle unit from the input module (some components are omitted in this view to allow visibility of relevant mechanisms).

FIGS. 22 and 23 are front, right and back, right perspective views, respectively, of input module 230 without carrier 300 or 600 contained therein. FIG. 24 is a right, side perspective view of input module 230 with carrier holding a plurality of MRUs 160. FIG. 25 is a front, left perspective view of the input module 230 with the receptacle distribution head 432 of the receptacle distributor 430 of the processing instrument 400 pulling an MRU 160 from the input module 230.

As noted above, the input module 230 may be a component of the instrument to which the transporter/storage module 100 is coupled with transporter 120 disposed between the processing instrument (e.g., analyzer 400) and input module 230 on one side of transporter 120 and the holding shelves 104 and loading drawer 280 on an opposite side of transporter 120. See also FIG. 1.

Referring to FIGS. 22 and 23, input module 230 includes a first carrier shelf 232 for supporting first end 304 of carrier base 302 of a carrier 300 (or first end 604 of carrier 600). A carrier locator pin 234 protrudes above first carrier shelf 230 and is received within shelf locator hole 340 formed in the bottom of carrier base 302 of carrier 300. Referring to FIG. 23, input module 230 further includes a second carrier shelf 236 for supporting second end 306 of carrier base 302 of carrier 300. A carrier locator pin 238 protrudes above second carrier shelf 236 and is received within shelf locator slot 342 formed in the bottom of carrier base 302 of carrier 300. First carrier shelf 232 and second carrier shelf 236 are spaced apart so as to define an open gap 235 therebetween.

In an alternate embodiment, locator pins may be provided on the carrier and locator holes may be provided on the first and second carrier shelves. For example, carrier 300 may include downwardly-projecting locator pins at the positions of shelf locator hole 340 and shelf locator slot 342 that engage locator holes (e.g., one locator hole and one locator slot) formed in the first and second carrier shelves 232, 236 at the positions of carrier locator pins 234, 238. In another embodiment, the carrier includes more or less than two locator holes/slots or locator pins that align with a corresponding number of locator pins or locator holes/slots, respectively, on the first and second carrier shelves.

Input module 230 may include a sensor, such as carrier detection sensor 264 shown in FIG. 23, for detecting when a carrier 300 has been placed in the input module 230. Details of an exemplary optical sensor are described below.

In some examples, input module 230 includes a housing 270 with an input module positioning tab 256 extending therefrom.

A pusher 240 is configured to push the MRUs 160 held on a carrier 300 (or 600, all references to carrier 300 are likewise applicable to carrier 600, whether explicitly stated or not, and unless otherwise noted) deposited within input module 230 toward the first end of carrier 300 at which retainer tabs 320, 322 (or 620, 622) are located to pack the MRUs 160 into a relatively tight pack of MRUs (i.e., the MRUs 160 are pushed together so that adjacent MRUs 160 contact each other). In this regard, the pusher 240 functions as a packing mechanism. Pusher 240 includes a pusher carriage 248 coupled to a pusher track 250 and is configured to translate (e.g., slide or roll) bi-directionally along the track 250. The pusher carriage 248 is attached to a pusher drive belt 254 that is coupled to a pusher motor 252, which may be a stepper motor and/or may be operatively coupled to a rotary encoder 253, for effecting powered translation of pusher carriage 248 along pusher track 250. In various embodiments, pusher 240 further comprises a pusher arm extending from the pusher carriage 248 and may comprise an upright portion 242 extending upwardly from pusher carriage 248, a lateral portion 244 extending laterally from upright portion 242, and a contact portion 246 extending downwardly from lateral portion 244. In an embodiment shown in FIG. 25 the contact portion 246 is aligned with a gap between the support rails 612, 614 of the carrier 600 disposed within the input module 230 so that as the pusher 240 moves along the pusher track 250, the contact portion 246 moves between the support rails 612, 614 and contacts a middle receptacle 162 of the MRU 160 that is disposed between the support rails 612, 614.

To permit a carrier 300 with one or more MRUs 160 supported thereon to be placed in input module 230, pusher 240 is moved to a standby position (at the far left end of housing 270 in the embodiment shown in FIGS. 22-24) to permit carrier 300 to be placed in the input module 230. A pusher home sensor may be provided to detect when the pusher 240 is in the standby position and provide a confirmatory signal. In one example, the home sensor comprises a slotted optical sensor 249 (see FIG. 25) that detects a tab 243 extending from the pusher 240 when the pusher 240 is in the standby position. Other types of sensors may be used for the home sensor, including contact sensors or proximity sensors. After carrier 300 is placed into input module 230, as shown in FIG. 24, pusher 240 is activated to translate laterally against MRUs 160 supported on carrier 300. The force of pusher 240 on MRUs 160 slides the MRUs along support rails 312, 314 toward the retainer tabs 320, 322 and pushes the right-most MRU 160 past flexing retainer tabs 320, 322 of the support rails 312, 314 and into a retrieval dock 260, where the MRU can be retrieved by a distributor within the instrument. A contact sensor 258 (see FIG. 22) detects when one of the MRUs 160 has been pushed into the retrieval dock 260, thereby causing the pusher 240 to stop translating and thus stop applying a force to the MRUs. A pushdown mechanism 262, which may comprise a flexible metal tab attached at one end to the housing 270 and extending laterally therefrom above the retrieval dock 260, is contacted by the top of the MRU 160 as the MRU is pushed into the retrieval dock 260. When contacted by the MRU 160, the pushdown mechanism 262 bends upwardly, and the resilience of the mechanism creates a force pushing the MRU 160 down into the loading dock 260.

An upright guide plate 268 (see FIG. 22) is positioned adjacent to the retrieval dock 260 and is spaced apart from and generally parallel to a guide panel 274.

As shown in FIG. 25, when an MRU 160 is pushed off the carrier 600 and onto the retrieval dock 260, the MRU 160 can be pulled off the retrieval dock 260 and into the processing instrument (e.g. processing instrument 400) by the receptacle distribution head 432 of receptacle distributor 430. Specifically, in the illustrated example, the receptacle distributor head 432 is moved on the transport track 434 to a position adjacent the retrieval dock 260 and rotated into a position operatively aligned with respect to the MRU 160. Translation of the receptacle distributor head 432 to this "pick-up" position may be activated by the MRU 160 contacting the contact sensor 258. Once the receptacle distributor head 432 is at the pick-up position, a distribution head hook 436 is extended from a distribution head housing 438 and engaged with the MRU manipulating structure 166 of the MRU 160 positioned on the retrieval dock 260. The distribution head hook 436 then retracts into the distribution head housing 438 to pull the MRU 160 off the retrieval dock 260 and into the housing 430. As the MRU 160 is pulled from the retrieval dock 260, the MRU 160 passes between the guide plate 268 and guide panel 274 (see FIG. 22) to align the MRU 160 with an opening (not shown) into the distribution head housing 438. A leading edge 272 of the guide plate 268 may be outwardly flared to redirect an MRU 160 that is misaligned with the space between the guide plate 268 and the guide panel 274. In addition, by packing the MRUs with the pusher 240, the MRUs are less likely to tip or twist on the carrier 300 and are thereby properly positioned for depositing on and retrieval from the retrieval dock 260.

As shown in FIG. 25, no MRUs 160 remain on the carrier 600, and the pusher 240 has moved back to the standby position. Had there been one or more MRUs remaining on the carrier 600, the pusher 240 would have remained in a position in contact with (or closely adjacent to) the end-most MRU remaining on the carrier 600. After an MRU 160 is pulled off the retrieval dock 260, as indicated by the contact sensor 258 no longer being in contact with an MRU, the pusher 240 would be activated to push another MRU off the carrier 600 and onto the retrieval dock 260.

A position encoder, such as rotary encoder 253 operatively coupled to the pusher motor 252, detects the longitudinal position of pusher 240 when an MRU contacts the sensor 258 based on rotational output of the pusher motor 252 (alternatively, if pusher motor 252 is a stepper motor, the longitudinal position of pusher 240 may be determined by counting motor steps), and input module 230 may be calibrated to determine the number of MRUs 160 currently held on the carrier 300, based on the longitudinal position of pusher 240 and the width of the MRUs 160. After the instrument retrieves an MRU 160 from the retrieval dock 260, the sensor 258 detects the absence of the MRU 160, thereby activating the pusher 240 to push the next MRU off the carrier 300 and onto the retrieval dock 260. In an alternate example, the next MRU may not be pushed off the carrier and onto the retrieval dock 260 until the instrument signals that the next MRU is needed.

Transporter/Elevator

Figure 15:
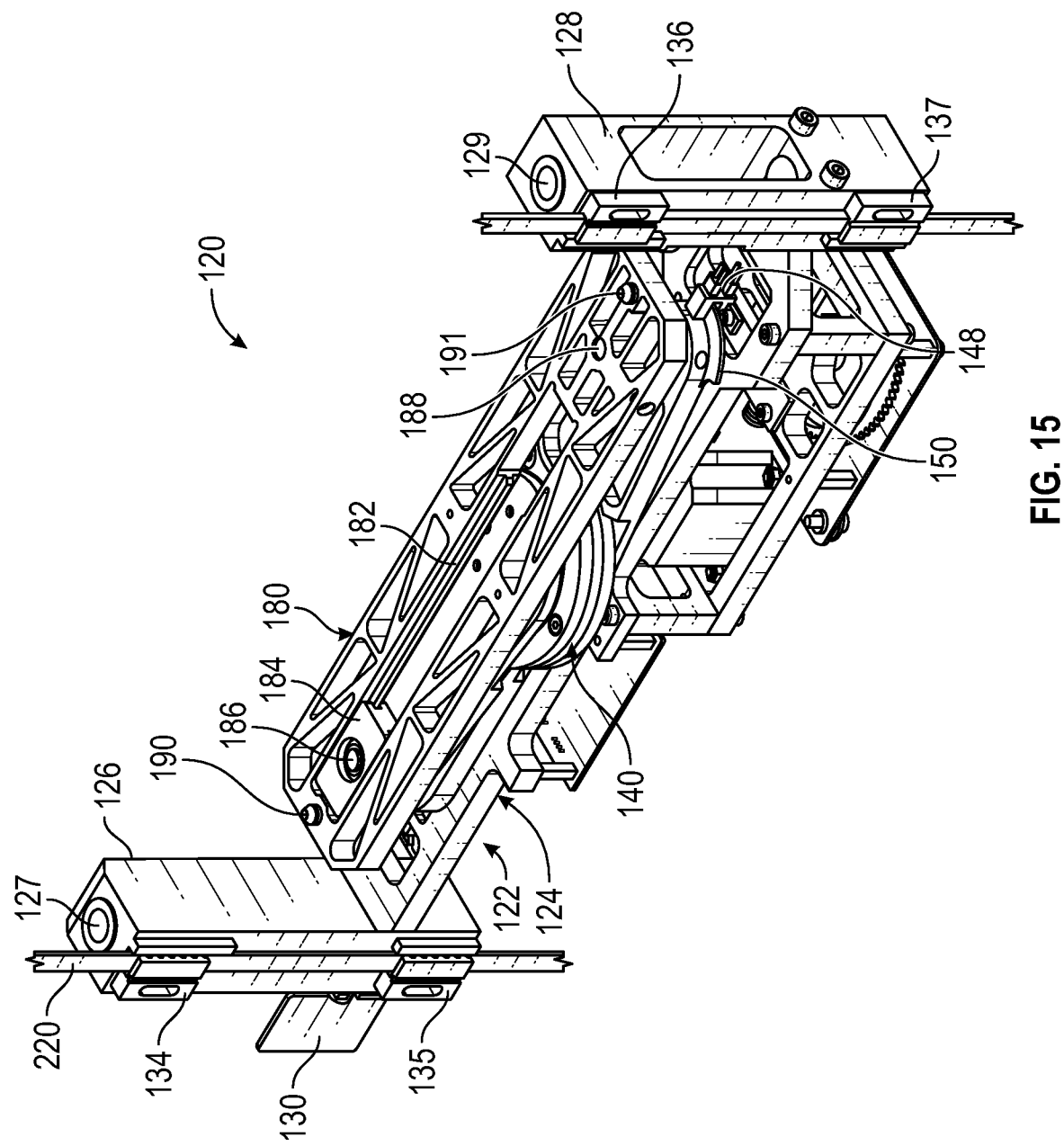
FIG. 15 is a top perspective view of a transporter of the transporter/storage module with a lift platform in a retracted position.
Figure 16:
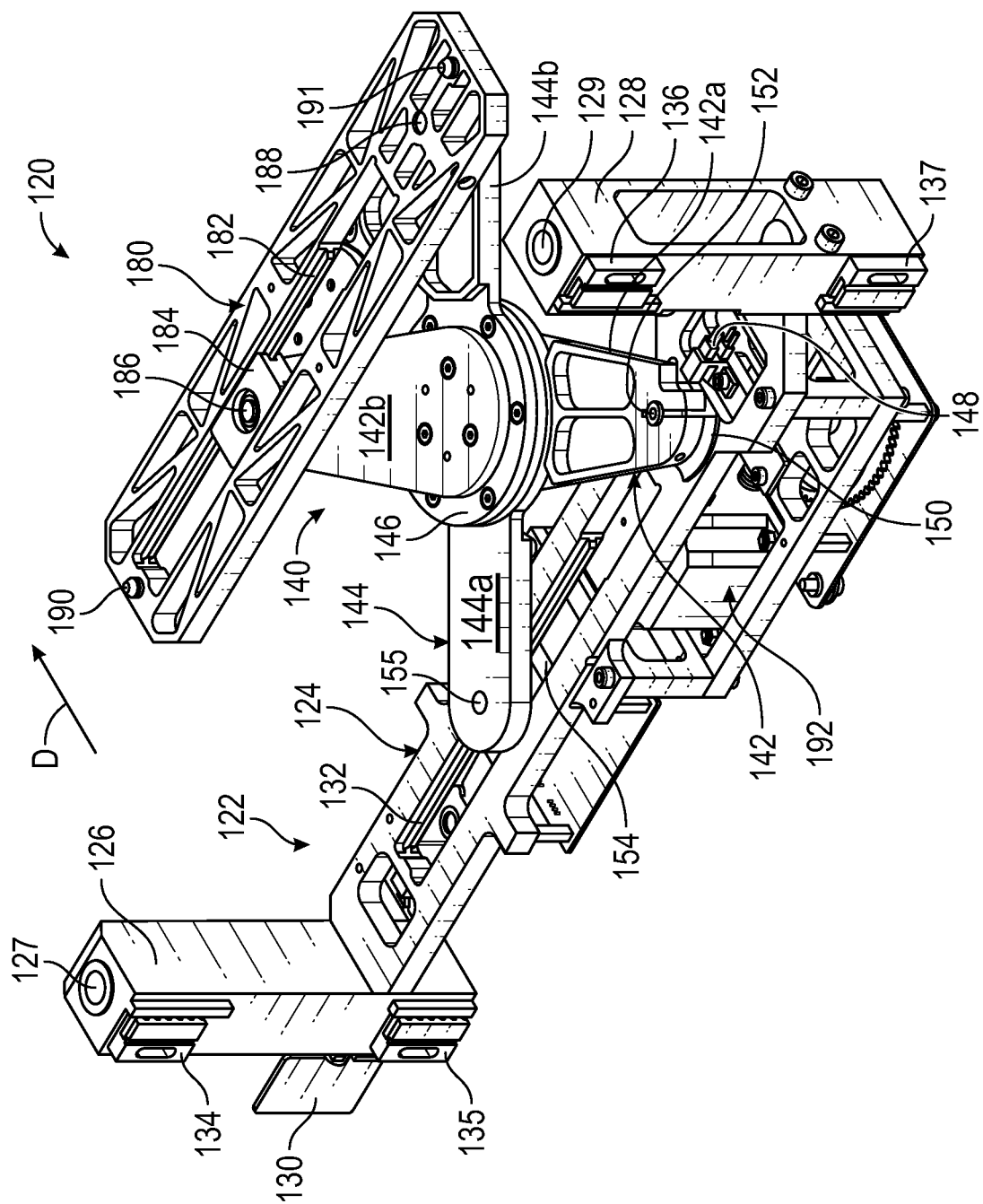
FIG. 16 is a top perspective view of the transporter with the lift platform extended to one side of the transporter.
Figure 17:
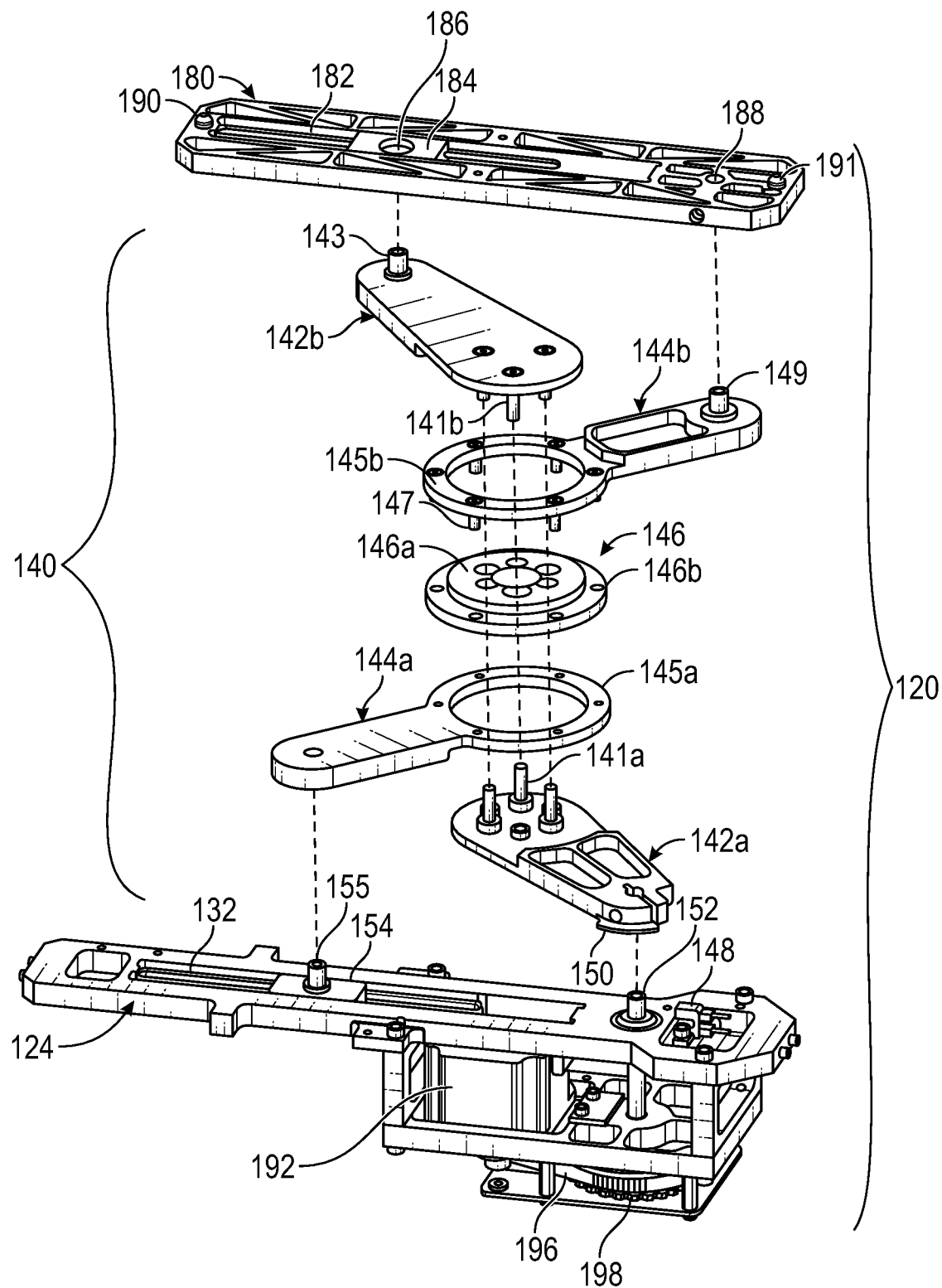
FIG. 17 is an exploded perspective view of the transporter with the lift platform extended to the one side of the transporter.
Figure 18:
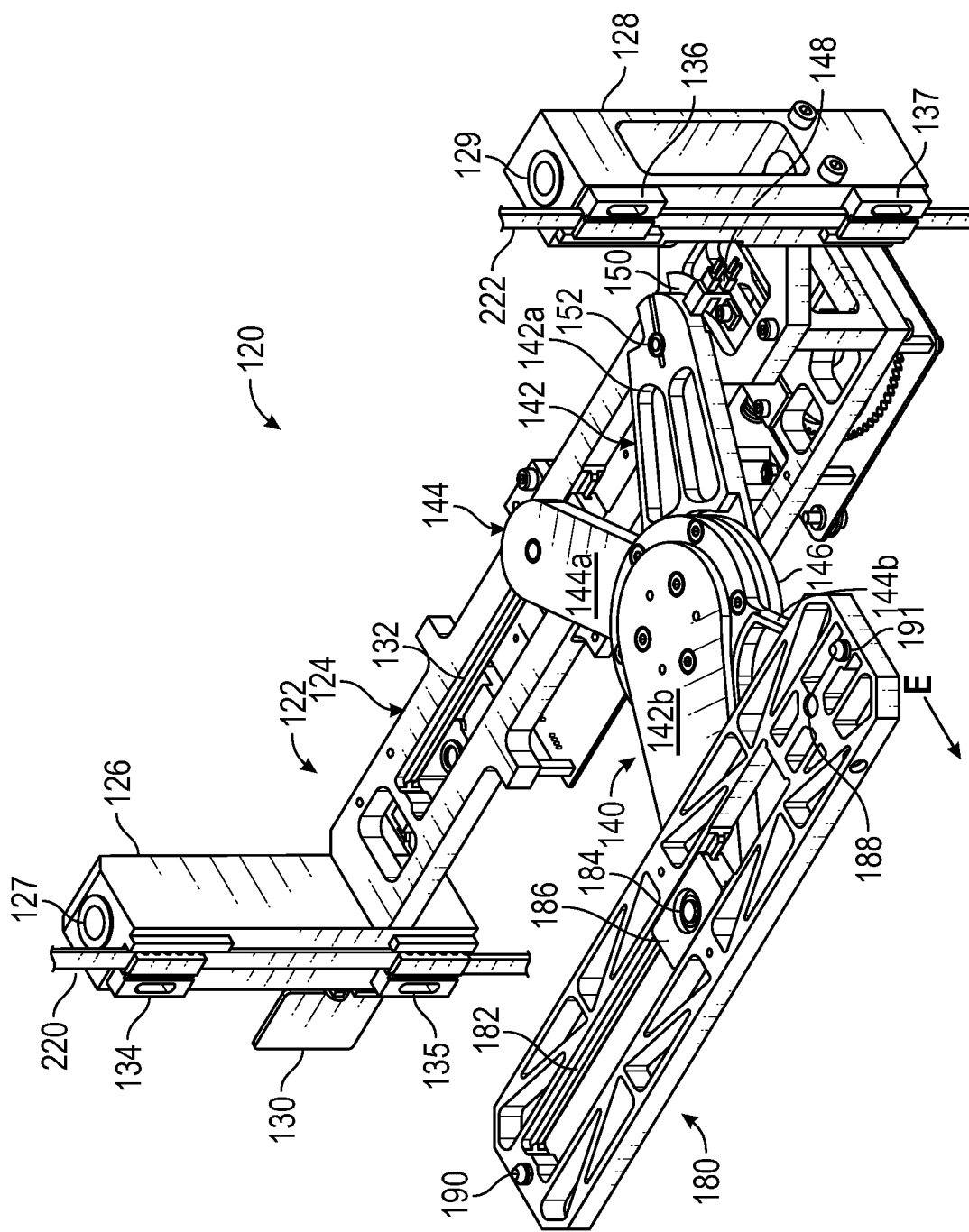
FIG. 18 is a top perspective view of the transporter with the lift platform extended to an opposite side of the transporter.

Features of transporter 120 are shown in FIGS. 15-20. In an embodiment, transporter 120 includes a transporter chassis 122 comprising a horizontally oriented base frame 124, a first upright 126 attached to a first end of the base frame 124, and a second upright 128 attached to a second end of the base frame 124. Note that the first and second uprights 126, 128 are not shown in FIG. 17, which is an exploded view of the transporter 120. A lift platform 180 (also referred to as a carrier support platform or a support platform) is carried by and coupled to support chassis 122 by a lateral actuator. In an example, the lateral actuator comprises a scissors actuator 140 configured to translate lift platform 180 laterally in with respect to the support chassis 122 in a first direction—direction "D"- to one side of support chassis 122, as shown in FIG. 16, or in a second direction—direction "B"- to an opposite side of support chassis 122, as shown in FIG. 18. Thus, the lateral actuator is configured to translate the lift platform 180 laterally from a position aligned with the support chassis 122 (as shown in FIG. 15) to a first laterally displaced position shown in FIG. 16, which is laterally aligned with one of the holding shelves 104 (the holding selves 104 are not shown in FIG. 16), or to a second laterally displaced position shown in FIG. 18, which is laterally aligned with first carrier shelf 232 and second carrier shelf 236 of input module 230 (the first and second carrier shelves 232, 236 are not shown in FIG. 18).

In an embodiment, a vertical guide rod extends through a bore 127 formed through first upright 126 of support chassis 122, and a vertical guide rod extends through a bore 129 formed through the second upright 128 of the support chassis 122. FIG. 2 (and FIG. 21) show a first guide rod 156 extending through first upright 126. A similar guide rod 158 (see FIG. 21) extends through second upright 128.

Figure 21:
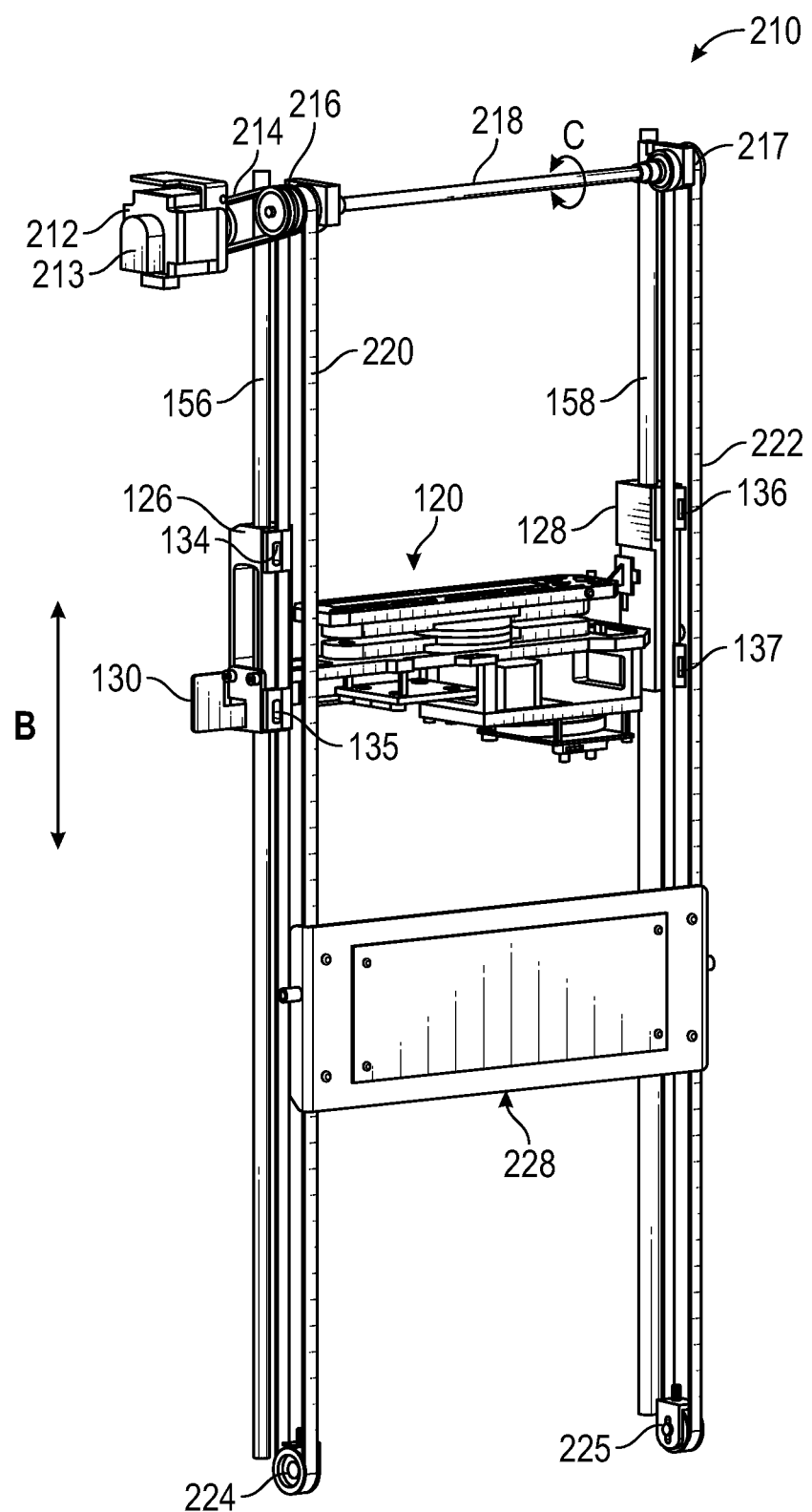
FIG. 21 is a perspective view of a transport elevator of the system.

As shown in FIG. 21, transporter 120 is coupled to transport elevator 210, which is configured to move transporter 120 in a vertical direction, up or down in direction "B", within housing 102 of transporter/storage module 100. Referring to FIG. 21, transport elevator 210 includes first and second drive pulleys 216, 217 connected to each other by a connecting shaft 218. An elevator drive motor 212, which may be a stepper motor and/or be operatively coupled to a rotary encoder 213, is coupled to drive pulleys 216, 217 and connecting shaft 218 by a drive belt 214. A first elevator belt 220 is trained around first drive pulley 216 and a first idler pulley 224. Similarly, a second elevator belt 222 is trained around second drive pulley 217 and a second idler pulley 225. First elevator belt 220 is connected to first upright 126 of support chassis 122, for example by clamps 134, 135. Similarly, second elevator belt 222 is connected to second upright 128 of support chassis 122, for example by clamps 136, 137. In various embodiments, a counterweight 228 may be attached to first and second elevator belts 220, 222.

It can be appreciated from FIG. 21 that powered rotation of connecting shaft 218 and drive pulley 216, 217 in direction "C" by elevator drive motor 212 and drive belt 214 will result in a vertical translation of transporter 120 up or down in accordance with the direction of rotation of pulleys 216, 217.

In other examples, motive means other than drive belts and drive pulleys are contemplated for effecting vertical translation of the transporter 120. For example, transporter 120 could be moved up or down by a lead screw mechanism comprising one or more vertically-oriented, power-driven lead screws operatively coupled to a screw follower that is attached or otherwise coupled to the support chassis 122 of the transporter 120.

In various embodiments, a locator flag 130 extends laterally from one of the uprights, such as upright 126. The locator flag 130 is used by one or more sensors (not shown) located within the housing 102 along the vertical path of the transporter 120 to detect a vertical position of the transporter 120—for example, by detecting when the locator flag 130 passes between an emitter and a receiver of an optical detector. Accordingly, the flag 130 and an associated optical sensor may be used as home sensor for detecting a specified location of the transporter based on the position of the sensor. In other embodiments, more than one sensor may be employed to detect multiple transporter positions, each corresponding to a different sensor location.

Figure 20:
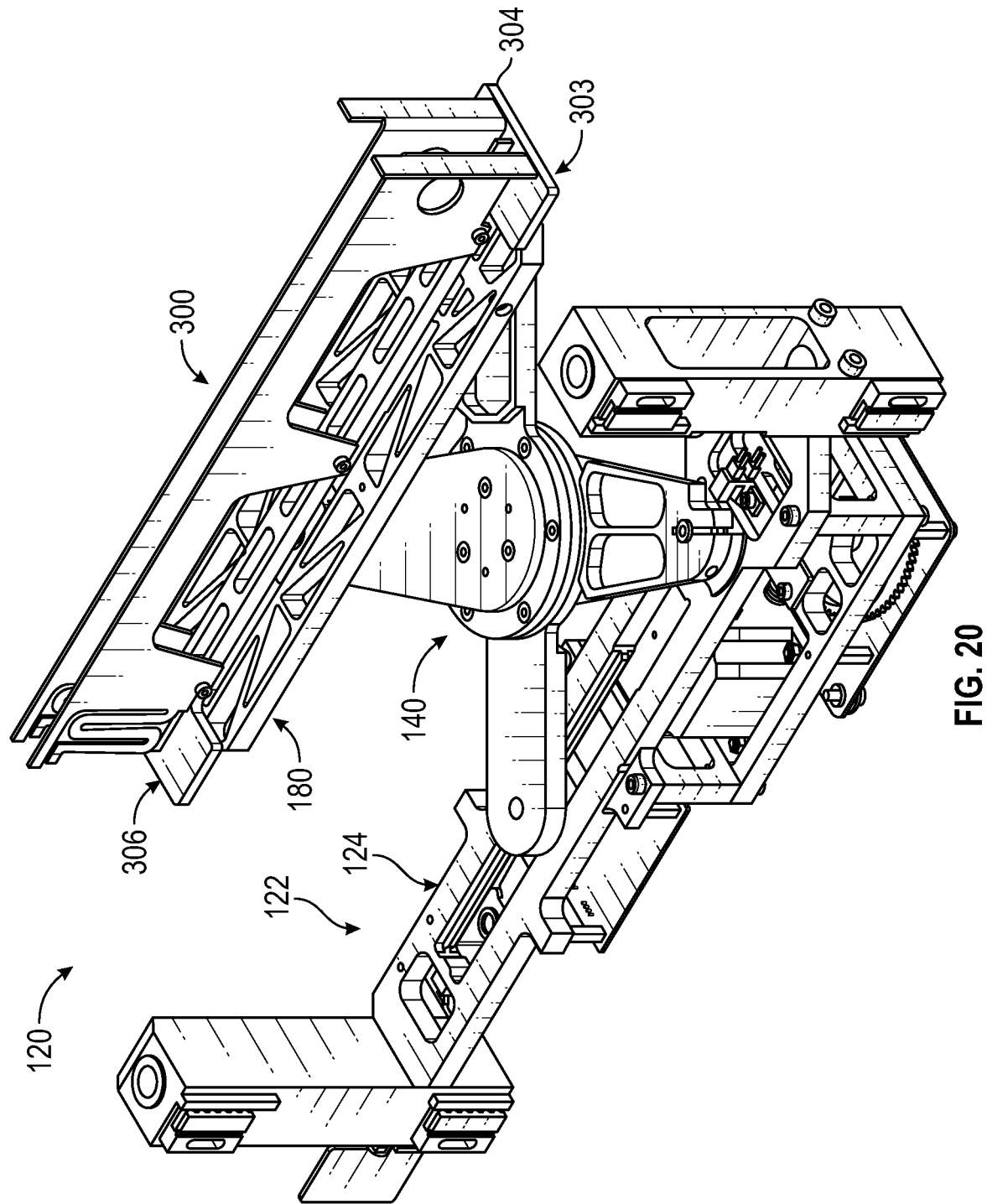
FIG. 20 is a top perspective view of the transporter with the lift platform extended to one side of the transporter and with a carrier supported on the lift platform.

Referring to FIGS. 15-18, lift platform 180 includes first and second carrier locator pins 190, 191, respectively, and is configured to support a carrier 300 (or 600), as shown in FIG. 20. When carrier 300 is supported on lift platform 180, first carrier locator pin 190 is received in lift platform locator hole 344 and second carrier locator pin 191 is received in lift platform locator slot 346. The locator pins 190, 191 and the lift platform locator hole 344 and lift platform locator slot 346 formed in carrier base 302 facilitate accurate positioning of carrier 300 with respect to lift platform 180 and prevent lateral sliding of carrier 300 on the lift platform 180.

In an alternate embodiment, locator pins may be provided on the carrier and locator holes may be provided on the lift platform. For example, carrier 300 may include downwardly-projecting locator pins at the positions of lift platform locator hole 344 and lift platform locator slot 346 that engage locator holes (e.g., one locator hole and one locator slot) formed in the lift platform 180 at the positions of first and second locator pins 190, 191. In another embodiment, the carrier includes more or less than two locator holes/slots or locator pins that align with a corresponding number of locator pins or locator holes/slots, respectively, on the lift platform.

Figure 26:
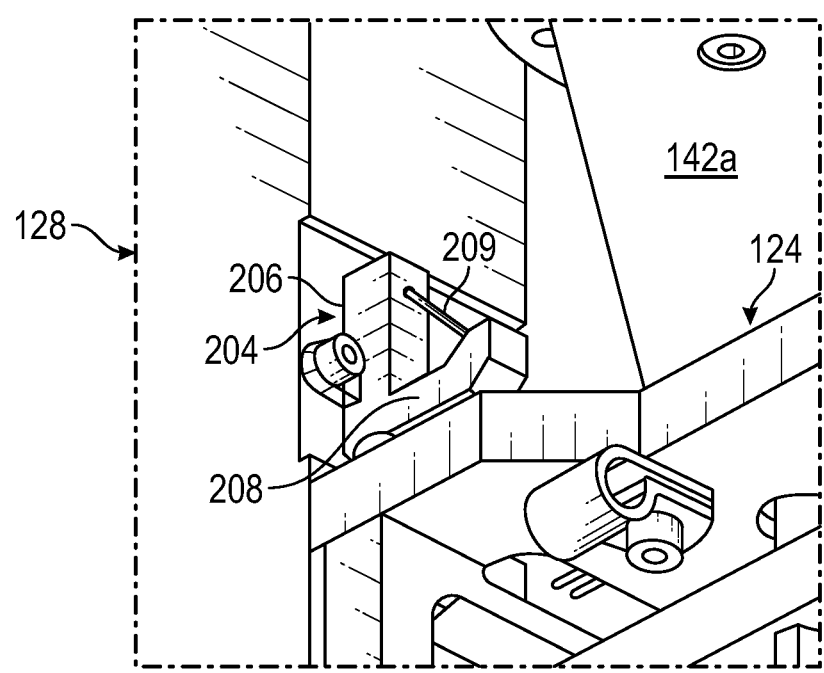
FIG. 26 is a partial, perspective view of the transporter illustrating a sensor for detecting the presence of a carrier on the transporter.

A carrier detection sensor 204 (see FIG. 19) may be provided to detect a carrier 300 supported on lift platform 180 when the lift platform is moved to the retracted position. Details of an exemplary carrier detection sensor, which may be an optical sensor, are shown in FIG. 26. In an embodiment, the carrier detection sensor 204 is attached to the second upright 128 of the support chassis 122 and comprises an L-shaped bracket comprising an upright portion 206 and a lateral portion 208. An optical emitter is disposed at a distal end of one of the upright and lateral portions 206 and 208 and an optical receiver is disposed at the distal end of the other of the upright and lateral portions 206 and 208. An optical beam, represented by line 209, is directed between the optical emitter and receiver at the distal ends of the upright and lateral portions 206 and 208. The ends of a carrier 300 (or 600) supported on the lift platform 180 extend over the ends of the lift platform 180. Thus, when the lift platform 180 is moved to the retracted position shown in FIG. 15, one of the over-extending ends of the carrier 300 passes over the lateral portion 208 of the L-shaped bracket and interrupts the beam 209 between the emitter and the receiver of the sensor to generate a signal indicating the presence of the carrier on the lift platform.

Figure 5:
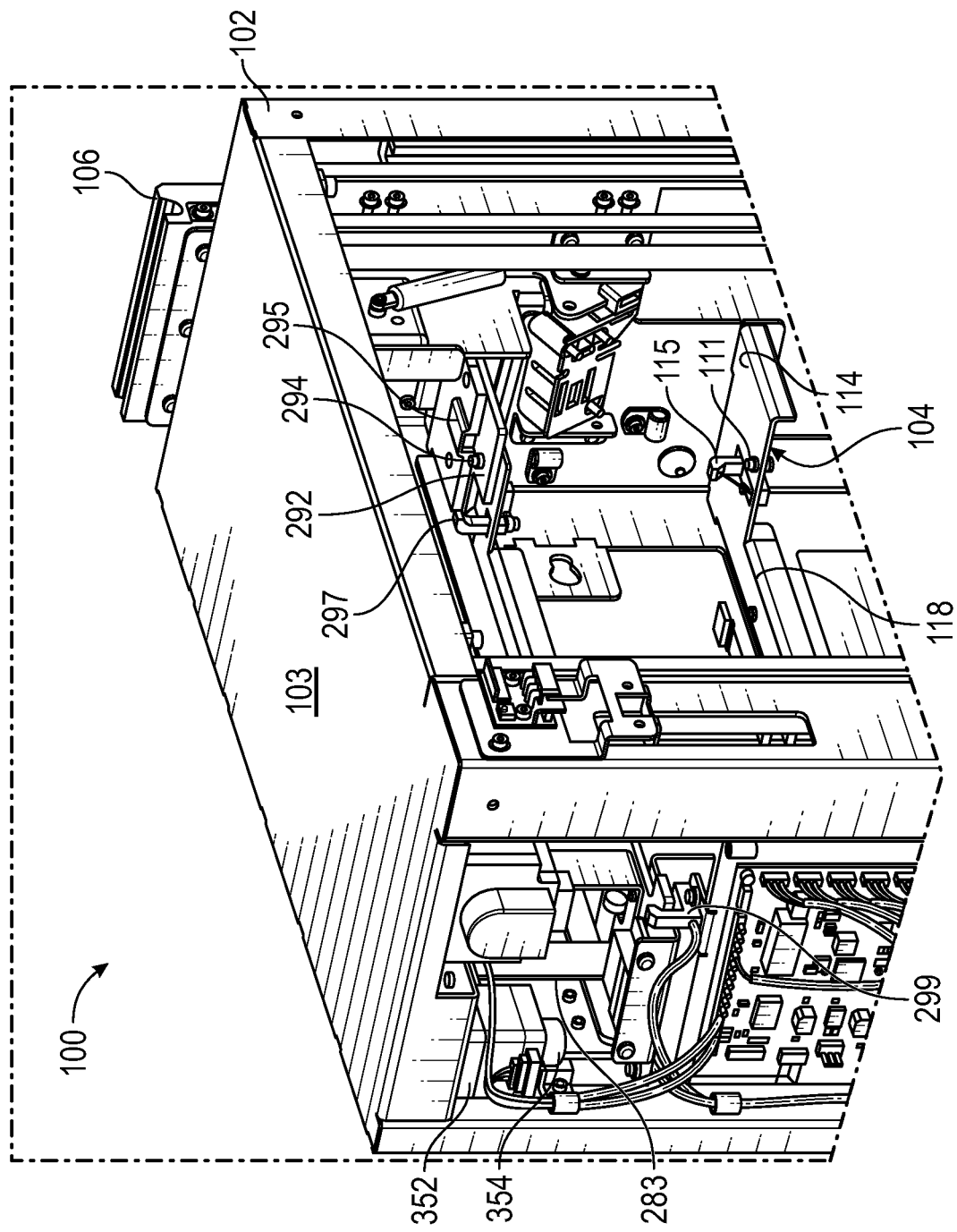
FIG. 5 is a partial perspective view of a top end of the transporter/storage module with the access door in a closed position and the loading drawer inserted into the housing.

Other optical detection sensors described herein, such as the carrier detection sensor 115 of the holding shelf 104 shown in FIG. 6, the packer home sensor 355 shown in FIG. 7, the carrier detection sensor 297 of the loading drawer 280 shown in FIG. 5, the drawer closed sensor 299 shown in FIGS. 5 and 7, and the carrier detection sensor 264 of the input module 230 shown in FIG. 23, may have the same configuration and functionality as the carrier detection sensor 204 shown in FIG. 26.

Scissors Actuator

Details of the scissors actuator 140 are shown in FIGS. 16-20.

The scissors actuator 140 comprises a powered arm 142 comprising first and second parts 142a, 142b. The powered arm 142 is pivotably attached to support chassis 122 (base frame 124) at a pivot shaft 152 and attached to the lift platform 180 and is translatably attached to the support chassis 122 at a slide 184 disposed in a platform slide track 182. The second part 142a of the powered arm 142 may be attached to the slide 184 by a pivot shaft 143 extending into a bearing 186 disposed within the slide 184 and protruding from one or both sides of the slide 184 so that the bearing 186 rolls against a side of the slide track 182 as the slide 184 translates along the track 182.

Scissors actuator 140 further comprises a follower arm 144 comprising first and second parts 144a, 144b and attached to the base frame 124 at a post 155 protruding from a follower arm slide 154 disposed in a base frame track 132 and attached to the lift platform 180 by a post 149 and a pivot connection 188. Post 155 may extend into a bearing disposed within the slide 154 and protruding from one or both sides of the slide 154 so that the bearing rolls against a side of the slide track 132 as the slide 154 translates along the track 132.

First part 142a and second part 142b of the powered arm 142 are fixedly couple to each other at a coupling 146, first part 144a and second part 144b of the follower arm 144 are fixedly coupled to each other at the coupling 146, and the powered arm 142 and the follower arm 144 are rotatably coupled to each other at the coupling 146. As shown in FIG. 17, in one example, coupling 146 comprises a slewing ring (sometimes referred to as a slewing bearing) having an inner ring 146a and an outer ring 146b that is rotatable with respect to the inner ring 146a. Exemplary slewing rings include Iglide® PRT slewing rings available from Igus®. First part 142a of powered arm 142 is attached to second part 142b by fasteners 141a, 141b (e.g., pins, screws, or bolts) extending through the inner ring 146a of the coupling 146. First part 144a of follower arm 144 is attached to second part 144b by fasteners 147 (e.g., pins, screws, or bolts) extending through a ring 145b of the second part 144b, the outer ring 146b of the coupling 146, and a ring 145a of the first part 144a.

Figure 19:
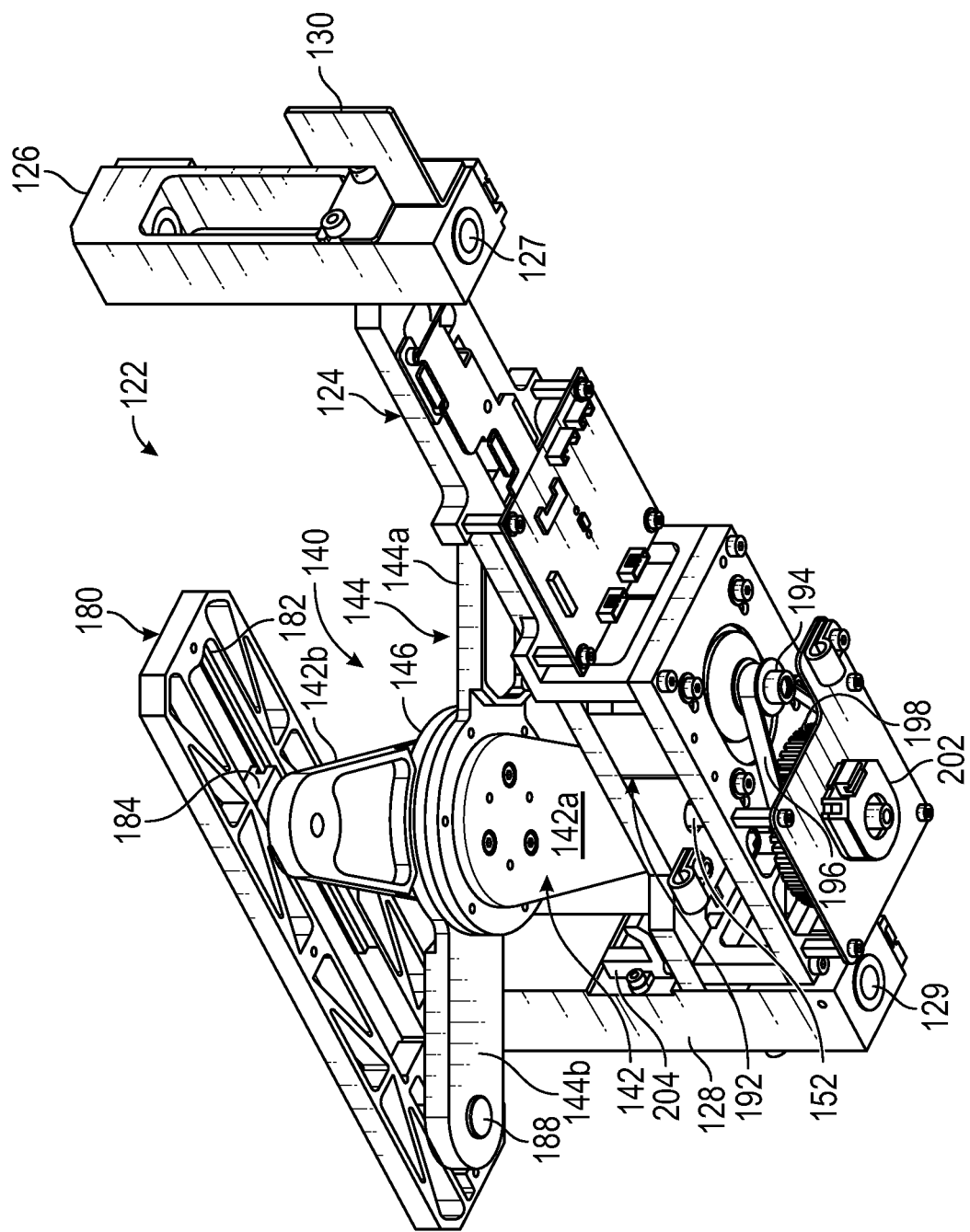
FIG. 19 is a bottom perspective view of the transporter with the lift platform extended to the opposite side of the transporter.

Referring to FIG. 19, a scissors drive motor 192, e.g., a stepper motor, attached to the base frame 124 includes a drive pulley 194 coupled, via a drive belt 196, to a drive pulley 198 couple to the pivot shaft 152. An encoder 202 maybe couple to the pivot shaft 152 for monitoring rotational position of the shaft.

Referring to FIG. 16, powered, clockwise rotation of the powered arm 142, via scissors drive motor 192, drive belt 196, and pivot shaft 152, will cause lateral translation of the lift platform 180 in a first direction, "D". Conversely, as shown in FIG. 18, counterclockwise rotation of the powered arm 142, via the scissors drive motor 192, drive belt 196, and pivot shaft 152, causes lateral translation of the lift platform 180 in an opposite direction, "E".

A sensor 148, which may be a slotted optical sensor, is disposed adjacent the first part 142a of the powered arm 142 and detects a sensor flag 150, comprising a lateral flange extending from the end of the powered arm 142 adjacent the pivot shaft 152. In one embodiment, sensor 148 detects the edge of the sensor flag 150 to determine a "home" position of the powered arm 142 (and thus, the home position of the scissors actuator 140). Other positions of the powered arm 142 relative to the home position are determined by encoder 202.

The transporter 120 is configured to transport carriers 300 (all references to carrier 300 are likewise applicable to carrier 600, whether explicitly stated or not, and unless otherwise noted) between different holding shelves 104, between the loading drawer 280 and one of the holding shelves 104, between one of the holding shelves 104 and input module 230 or between the loading drawer 280 and the input module 230. The transporter 120 performs this transport operation by lifting the carrier 300 from the loading drawer 280 or a holding shelf 104 with the lift platform 180, moving the transporter 120 with the transport elevator 210 to a different holding shelf 104, the loading drawer 280, or the input module 230, and then placing the carrier in the new location with the lift platform.

More specifically, to transport a carrier 300 from a first one of the holding shelves 104 to a second one of the holding shelves 104, the transport elevator 210 positions the transporter 120 and lift platform 180 adjacent to the first holding shelf 104 at which the carrier 300 to be moved is positioned. Sensors may be used to indicate the position of the transporter 120 relative to a desired holding shelf 104. In an embodiment, a sensor adjacent the desired holding shelf 104 detects the locator flag 130. Alternatively, or in addition, an encoder coupled to the elevator drive motor 212, such as rotary encoder 213, is used to control the vertical positioning of the transporter 120 relative to a home position detected by a sensor (not shown) detecting the locator flag 130.

The lift platform 180 is initially in the retracted position with respect to the support chassis 122 as shown in FIG. 15. Once the lift platform 180 is positioned adjacent to the first holding shelf 104, the lift platform 180 is extended by the scissors actuator 140 in a first direction with respect to the support chassis 122, as shown in FIG. 16, to a position beneath the carrier 300. In an embodiment, the encoder 202 coupled to the pivot shaft 152 detecting the rotation of the power arm 142 of the scissors actuator 140 is used to control the amount of lateral translation of the lift platform 180.

As shown schematically in FIG. 4A, the length of the lift platform 180 is less than the length of the open area 116 between the first shelf portion 112 and the second shelf portion 114 of the holding shelf 104. As shown in FIG. 11, the lift platform locator hole 344 and the lift platform locator slot 346 formed in the bottom of the carrier base 302 are located in-board of the shelf locator hole 340 and the shelf locator slot 342 formed in the bottom of the carrier base. And, as shown in FIG. 4A, the first and second carrier locator pins 190, 191 of the lift platform 180 are similarly located in-board of the first and second locator pins 110, 111 of the holding shelf 104.

Once the lift platform 180 is positioned beneath the carrier 300 held in the holding shelf 104 (i.e., the lift platform is laterally aligned with the carrier 300 and the holding shelf 104), the transporter 120 is raised by the transport elevator 210 until the lift platform 180 enters the open area 116 and contacts the bottom of the carrier 300. The transport elevator 210 continues to raise the transporter 120 and the lift platform 180, and the first carrier locator pin 190 and the second carrier locator pin 191 enter the lift platform locator hole 344 and the lift platform locator slot 346, respectively, formed in the bottom of the carrier base 302. The transport elevator 210 continues to raise the transporter 120 until the lift platform 180 lifts the carrier 300 off of the holding shelf 104 and the first and second locator pins 110, 111 are fully clear of the shelf locator hole 340 and the shelf locator slot 342 of the carrier 300. In one example, the vertical position at which lift platform 180 contacts carrier 300 in a particular holding shelf 104 is known—e.g., by a system self-teaching process described below—and thus, the additional elevation of the lift platform 180 required to lift the carrier 300 off the first and second locator pins 110, 111 is determinable from the height of the first and second locator pins 110, 111.

With the carrier 300 supported on the lift platform 180, as shown in FIG. 20, the lift platform is retracted by the scissors actuator 140 to the retracted position shown in FIG. 15 (the carrier 300 is not shown in FIG. 15). The carrier detection sensor 204 (see FIG. 19) may be provided to detect a carrier 300 supported on the lift platform 180 when the lift platform is moved to the retracted position. The transporter 120 is then raised or lowered by the transport elevator 210 to a different holding shelf 104. To place the carrier in a holding shelf 104, the lift platform 180 is extended by the scissors actuator 140 to a position above the holding shelf 104 (i.e., the lift platform 180 is laterally aligned with the holding shelf 104). Again, in an embodiment, the encoder 202 coupled to the pivot shaft 152 is used to control the amount of lateral translation of the lift platform 180. The transport elevator 210 then lowers the transporter 120 until the carrier 300 is supported on the first shelf portion 112 and the second shelf portion 114 of the holding shelf 104. As the lift platform 180 is lowered, the first and second locator pins 110, 111 of the first shelf portion 112 and second shelf portion 114, respectively, enter the shelf locator hole 340 and the shelf locator slot 342 formed in the bottom of the carrier base 302. When the lift platform has been lowered sufficiently so that the carrier pins 190, 191 of the lift platform 180 are clear from the lift platform locator hole 344 and the lift platform locator slot 346 formed in the bottom of the carrier base 302, the lift platform 180 is retracted by the scissors actuator 140 to the retracted position shown in FIG. 15, and the carrier 300 remains supported on the new holding shelf 104.

To transport a carrier 300 from the loading drawer 280 to one of the holding shelves 104, the transport elevator 210 positions the transporter 120 and lift platform 180 adjacent to the loading drawer 280. In an embodiment, a sensor adjacent the desired holding shelf 104 detects the locator flag 130. Alternatively, or in addition, an encoder coupled to the elevator drive motor 212 is used to control the vertical positioning of the transporter 120 relative to a home position detected by a sensor (not shown) detecting the locator flag 130.

Lift platform 180 is then extended laterally by scissors actuator 140 to a position beneath the carrier 300 held in the loading drawer 280. In an embodiment, the encoder 202 coupled to the pivot shaft 152 is used to control the amount of lateral translation of the lift platform 180. The transporter 120 is then raised by the transport elevator 210 until the lift platform 180 enters the open area 298 between first shelf 286 and second shelf 292 and contacts the bottom of the carrier 300. The transport elevator 210 continues to raise the transporter 120 and the lift platform 180, and the first carrier locator pin 190 and the second carrier locator pin 191 enter the lift platform locator hole 344 and the lift platform locator slot 346, respectively, formed in the bottom of the carrier base 302. The transport elevator 210 continues to raise the transporter 120 until the lift platform 180 lifts the carrier 300 off of the loading drawer 280 and the first and second locator pins 288, 294 are fully clear of the shelf locator hole 340 and the shelf locator slot 342 of the carrier 300. In one example, the vertical position at which lift platform 180 contacts carrier 300 at the loading drawer 280 is known—e.g., by a system self-teaching process described below—and thus, the additional elevation of the lift platform 180 required to lift the carrier 300 off the first and second locator pins 288, 294 is determinable from the height of the first and second locator pins 288, 294.

With the carrier 300 supported on the lift platform 180, as shown in FIG. 20, the lift platform is retracted by the scissors actuator 140 to the retracted position shown in FIG. 15 and then transported to one of the holding shelves 104, as described above or to the input module 230 as described below.

Similarly, to transport a carrier 300 to the holding drawer 280, the transport elevator 210 positions the transporter 120 and lift platform 180 with a carrier 300 supported thereon adjacent to the loading drawer 280. The lift platform 180 is then extended by the scissors actuator 140 to a position above the loading drawer 280, and the transporter 120 is then lowered by the transport elevator 210 until the lift platform 180 enters the open area 298 between the first shelf 286 and the second shelf 292. The transport elevator 210 continues to lower the transporter 120 until the carrier 300 is supported on the first shelf 286 and the second shelf 292 and the first and second locator pins 288, 294 of the loading drawer enter the shelf locator hole 340 and the shelf locator slot 342 of the carrier 300. The transport elevator 210 continues to lower the transporter 120 and the lift platform 180 until the first carrier locator pin 190 and the second carrier locator pin 191 are clear of the lift platform locator hole 344 and the lift platform locator slot 346, respectively, formed in the bottom of the carrier base 302. With the carrier 300 supported on the loading shelf 280, the lift platform 180 is retracted by the scissors actuator 140 to the retracted position shown in FIG. 15.

To transport a carrier from the loading drawer 280 or a holding shelf 104 to the input module 230, the carrier 300 is first removed from the loading drawer 280 or holding shelf 104, as the case may be, using the transporter 120 as described above. With the carrier 300 supported on the lift platform 180, as shown in FIG. 20, the lift platform is retracted by the scissors actuator 140 to the retracted position shown in FIG. 15. The transporter 120 is then raised or lowered, as necessary, by the transport elevator 210 to input module 230. To place the carrier 300 into the input module 230, the lift platform 180 is extended by the scissors actuator 140 into the input module 230 to a position above the first and second carrier shelves 232, 236, with the lift platform 180 disposed within the gap 235 between the first and second carrier shelves 232, 236. The transport elevator 210 then lowers the transporter 120 until the carrier 300 is supported on the first and second carrier shelves 232, 236 of the input module 230. As the lift platform 180 is lowered, the first and second carrier locator pins 234, 238 of the first and second carrier shelves 232, 236, respectively, enter the shelf locator hole 340 and the shelf locator slot 342 formed in the bottom of the carrier base 302. When the lift platform has been lowered sufficiently so that the carrier pins 190, 191 of the lift platform 180 are clear from the lift platform locator hole 344 and the lift platform locator slot 346 formed in the bottom of the carrier base 302, the lift platform 180 is retracted by the scissors actuator 140 to the retracted position shown in FIG. 15, and the carrier 300 remains supported within the input module 230.

To remove a carrier 300 from the input module 230, the lift platform 180 is positioned in the gap 235 between the first and second carrier shelves 232, 236 beneath the carrier 300. The lift platform is then raised by the transport elevator 210 until the lift platform 180 contacts the bottom of the carrier 300. The transport elevator 210 continues to raise the transporter 120 and the lift platform 180, and the first carrier locator pin 190 and the second carrier locator pin 191 enter the lift platform locator hole 344 and the lift platform locator slot 346, respectively, formed in the bottom of the carrier base 302. The transport elevator 210 continues to raise the transporter 120 until the lift platform 180 lifts the carrier 300 off of the first and second carrier shelves 232, 236 and the first and second carrier locator pins 234, 238 are fully clear of the shelf locator hole 340 and the shelf locator slot 342 of the carrier 300. The scissors actuator 140 then retracts the lift platform 180 and carrier 300 to the retracted position shown in FIG. 15.

Control System

Figure 28:
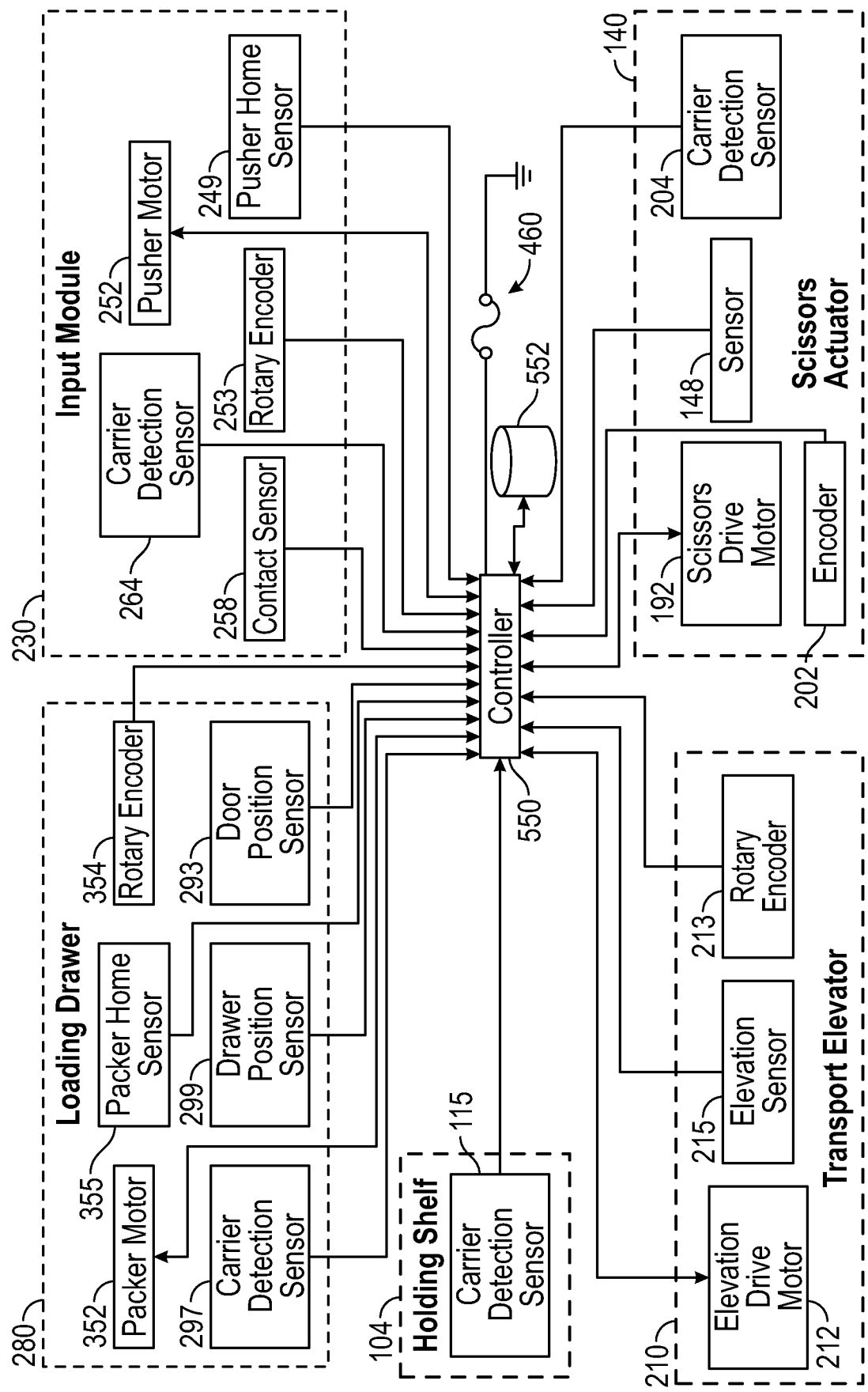
FIG. 28 is a block diagram that schematically illustrates a control architecture of the transporter/storage module.

FIG. 28 is a block diagram that schematically illustrates s control architecture for the transporter storage module 100. An exemplary control architecture may include a controller 550, which monitors, communicates with, and controls aspects of transporter storage module 100, including the holding shelves 104, the loading drawer 280, the input module 230, the transport elevator 210, and the scissors actuator 140. The pusher motor 252 of the input module 230, the elevator drive motor 212 of the transport elevator 210, and the scissors drive motor 192 of the scissors actuator 140 are coupled to and controlled by the controller 550, which is also connected to a power supply 460 that is controllable by the controller 550. Controller 550 provides power and operational control signals to the motors 252, 212, and 192. Controller 550 may also receive data from the motors 252, 212, and 192 in the form of rotary encoder counts from encoders 253, 213, and 202, respectively, as well as other feedback sensor signals.

Controller 550 may comprise a computer system for executing software (which may include firmware) that effects operation, control, and monitoring of the transporter storage module 100. Controller 550 may be implemented via one or more logic elements, e.g., a computer, embedded controller, programmable gate array, application specific integrated circuit, programmable logic device, etc., and may include or access data storage memory 552, which may include random access memory (RAM), read only memory (ROM), flash memory, and other types of memory now known or later developed. Controller 550 may also include additional memory, including, for example, a hard disk drive and/or a removable storage drive, representing a magnetic tape drive, an optical disk drive, USB slot, memory card interface, internet memory, cloud-based memory, or any storage medium or format now known or later developed. Memory devices and storage units used herein may comprise any storage medium for persistent and/or volatile storage of electronic data now known or later developed. Such data may be stored within the storage medium in a database, which may comprise any data structure and format now known or later developed, including, for example, a relational database, an object database, a flat file, list, and so on, or some combination thereof.

In alternative embodiments, some or all of the memory may include other similar means for allowing computer programs or other instructions to be loaded into a computer system. Such means can include, for example, a removable storage unit and an interface. Examples of such can include a memory stick and memory stick interface, a secure digital card and interface, and other portable media and interfaces which allow software and data to be transferred to controller 550.

Software comprises instructions stored on non-transitory computer-readable media which, when executed by the logic element(s) of the controller 550, cause the control and computing hardware to perform one or more automated or semi-automated processes.

The computer system of controller 550 may also include a communications interface, which allows information (e.g., power, control and feedback signals, software, data, etc.) to be transferred between controller 550 and external devices. Examples of communications interfaces can include a modem, a network interface (such as an Ethernet card), a communications port, a PCMCIA slot and card, a USB-port, a Firewire port, Bluetooth, or any interface now known or later developed. Information transferred via a communications interface is in the form of signals which can be electronic, electromagnetic, optical, or other signals capable of being received by the communications interface.

The computer system of controller 550 can also include one or more input devices, such as a touch screen, stylus, keyboard, mouse or other pointing device, microphone, data scanners (e.g., barcode, RFID, etc.), and so on. Various output devices may also be included in the computer system, including indicator lights, a display, printer, tactile (e.g., vibratory) indicators, and audio speakers.

In this document, terms such as "computer program medium," "computer-readable medium," "computer usable medium," and the like are used to generally refer to media, such as removable storage units, a hard disk installed in hard disk drive, and other means for providing software and data to controller 550.

Computer programs (also called computer control logic) are stored in one or more portions of the memory 552 that is part of or accessed by controller 550. Computer programs can also be received via a communications interface. Such computer programs may include algorithms, such as the algorithm illustrated in FIG. 27, that, when executed, enable the computer system of controller 550 to control the operation of the transporter storage module 100 in accordance with aspects disclosed herein.

In an embodiment in which aspects of the subject matter disclosed herein are implemented using software, the software may be stored in a computer program product and loaded into the computer system of controller 550 using a removable storage drive, a hard drive, an interface, and/or a communications interface. The control logic (software), when executed by the processor of the controller 550, causes the processor to perform functional aspects of the subject matter as described herein via the systems, devices, apparatuses, sensors, encoder, etc. described above. An operating system may perform basic tasks such as recognizing input from an input device, sending output to an output device, managing files and system resources, and managing the various processes embodying computer programs running on the computer system.

Controller 550 may comprise a stand-alone system dedicated to the transporter storage module 100, or one or more components of controller 550—e.g., processor, memory, interfaces, input/output devices, etc.—may be a shared part of a global controller that controls one or more components of an instrument or laboratory of which the transporter storage module 100 is a component, in addition to the transporter storage module 100.

As shown schematically in FIG. 28, with respect to each holding shelf 104, controller 550 receives signals from carrier detection sensor 115 to indicate whether or not a carrier 300, 600 is held one the shelf 104.

With respect to the loading drawer 280, controller 550 may receive signals from carrier detection sensor 297 to indicate whether or not a carrier 300, 600 is held within the loading drawer 280. Controller 550 may also receive signals from drawer position sensor 299 to indicate whether or not the loading drawer 280 is in the closed position. Controller 550 may also receive signals from a door position sensor 293 to indicate a position—opened or closed (or closed or not closed)—of the door 106.

Controller 550 may further receive signals from the packer motor 352 and/or encoder 354 to detect a position of the packer 360. Controller 550 may also send control (power) signals to the packer motor 352 to effect selective operation of the packer motor 352.

Controller 550 may further receive signals from the packer home sensor 355, e.g., an optical sensor, to detect if the packer 360 is in the home, or standby, position, and may generate control signals, such as signals effecting operation and control of the packer motor 352, based on signals received from the packer home sensor.

Controller 550 may receive signals from drawer position sensor 299 to detect when the drawer 280 has been closed, and then send a control signal to the packer motor 352 to cause the packer 360 to translate and pack the MRUs 160 on the carrier 300 after the drawer 280 has been detected in the closed position. In another embodiment, controller 550 may receive signals from the packer motor 352 and/or encoder 354 from which the controller 550 can determine the position of the packer 360 with respect to a home position to compute the number of MRUs 160 held on the carrier 300.

With respect to input module 230, controller 550 receives signals from carrier detection sensor 264 to indicate whether or not a carrier 300, 600 is held in the input module 230.

Controller 550 may further receive signals from the motor 252 and/or encoder 253 to detect a position of the pusher 240. Controller 550 may also send control (power) signals to the pusher motor 252 to effect selective operation of the motor 252.

Controller 550 may further receive signals from the pusher home sensor, e.g., optical sensor 249, to detect if the pusher 240 is in the home, or standby, position, and may generate control signals, such as signals effecting operation and control of the motor 252, based on signals received from the pusher home sensor.

Controller 550 may further receive signals from contact sensor 258 to detect when one of the MRUs 160 has been pushed into the retrieval dock 260, and then send a control signal to the pusher motor 252 to cause the pusher 240 to stop translating and thus stop applying a force to the MRUs. Alternatively, controller 550 may receive signals from contact sensor 258 to detect when one of the MRUs 160 has been removed from the retrieval dock 260, and then send a control signal to the pusher motor 252 to cause the pusher 240 to translate and push the next MRU from the carrier onto the retrieval dock 260. In another embodiment, when a signal from the contact sensor 258 indicates one of the MRUs 160 has been pushed into the retrieval dock 260, controller 550 may receive signals from the motor 252 and/or encoder 253 from which the controller can determine the position of the pusher 240 with respect to a home position to compute the number of MRUs 160 remaining on the carrier 300. If, as a result of that computation, it is determined that no MRUs remain on the carrier, a signal is provided by the controller 550 to the pusher motor 252 to move the pusher 240 to the standby position, and movement of the pusher 240 to the standby position will be confirmed by a signal to the controller 550 from the optical sensor 249.

With respect to transport elevator 210, controller 550 may receive signals from the elevator drive motor 212 and/or encoder 213 to detect a vertical position of the transporter 120 relative to a home position detected by an elevator home sensor 215 detecting the locator flag 130. Controller 550 may also send control (power) signals to the elevator drive motor 212 to effect selective operation of the motor 212.

With respect to scissors actuator 140, controller 550 may receive signals from carrier detection sensor 204 to indicate whether or not a carrier 300, 600 is held on the lift platform 180 when the lift platform is moved to the retracted position.

Controller 550 may receive signals from the scissors drive motor 192 and/or encoder 202 to detect a position of the lift platform 180. Controller 550 may also send control (power) signals to the scissors drive motor 192 to effect selective operation of the motor 192.

Controller 550 may further receive signals from sensor 148 to detect if the scissors actuator 140 (and thus the lift platform 180) is in the home, or retracted, position, and may generate control signals, such as signals effecting operation and control of the scissors drive motor 192, based on signals received from the platform home sensor.

Positional Self-Teaching

It should be evident that operation of transport/storage module 100 requires accurate and repeatable positioning of the transporter 120 and the lift platform 180 with respect to the loading drawer 280, the holding shelves 104, and the input module 230 to transfer consumables and carriers between the various locations within transport/storage module 100. Although the locations of the loading drawer 280, the holding shelves 104, and the input module 230 will be substantially the same from one transport/storage module 100 to the next, in some embodiments, manufacturing tolerances and/or installation variances may result in variations in the final positions of the loading drawer 280, the holding shelves 104, and the input module 230 after the transport/storage module 100 is attached to a processing instrument, such as processing instrument 400.

In an embodiment, the module 100 has a self-teaching capability whereby, after transport/storage module 100 is attached to a processing instrument, such as processing instrument 400, transport/storage module 100 automatically determines and stores the proper position of the transporter 120 and the lift platform 180 for each of the holding shelves 104, the loading drawer 280, and the input module 230.

Figure 27:
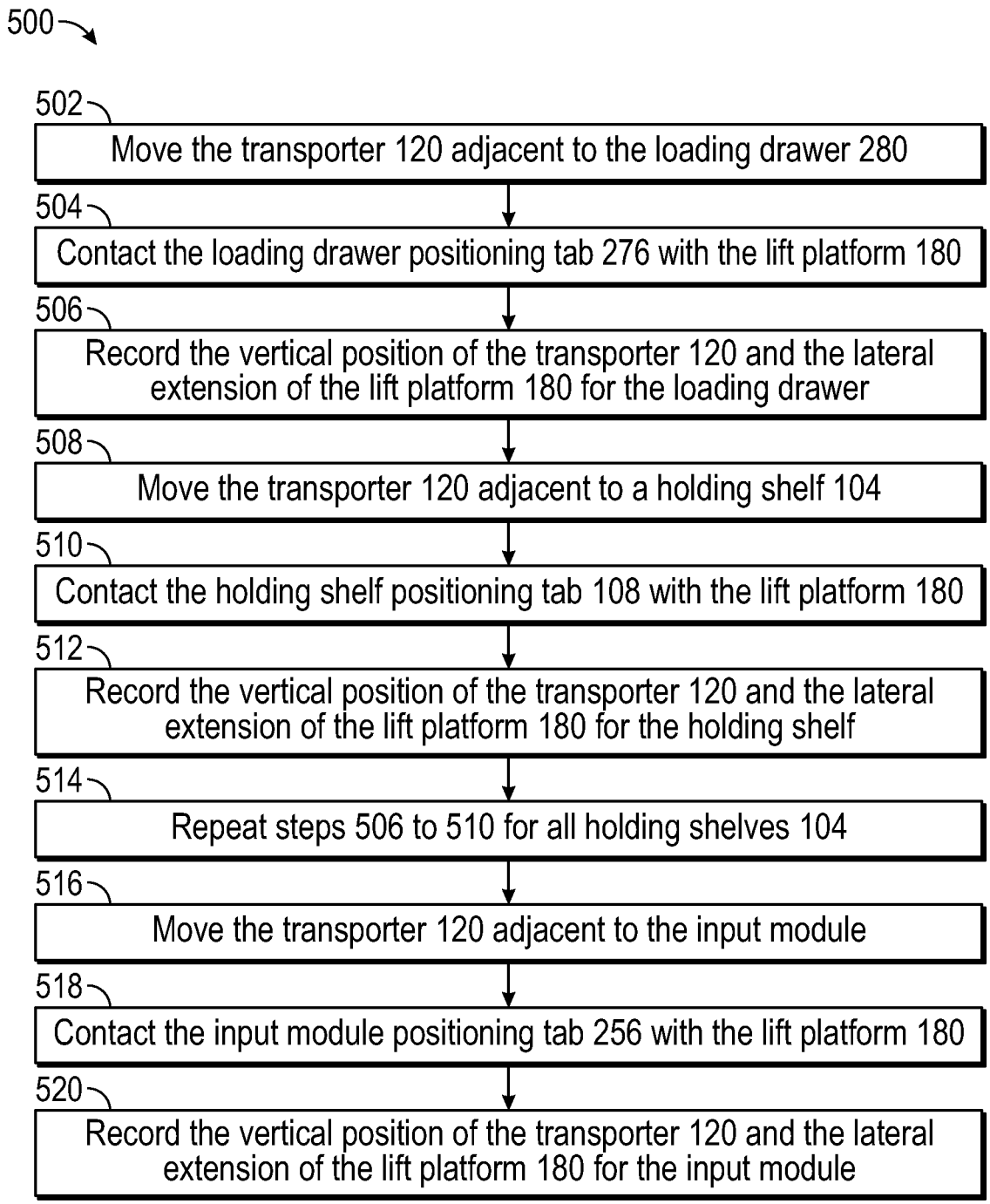
FIG. 27 is a flowchart illustrating a method (algorithm) for performing a self-teaching process for determining locations within the transporter/storage module and/or the input module.

FIG. 27 is a flowchart illustrating a method (algorithm) 500 by which a computer controller, such as controller 550, in communication with the various position sensors, encoders, and motors within the module 100 performs this self-teaching process.

In step 502, the transporter 120 is moved by the transport elevator 210 to a vertical position adjacent to the expected location of the loading drawer 280. The vertical position of the transporter may be determined and controlled by the controller 550 by signals sent to the elevator drive motor 212 and signals received from the rotary encoder 213 for detecting a vertical position of the transporter 120 relative to a home position detected by a sensor 215 (see FIG. 28) detecting the locator flag 130.

In step 504, the loading drawer positioning tab 276 is contacted with the lift platform 180. The processor 550 controls contact of the lift platform 180 with the positioning tab 276 in any of a number of ways.

In one embodiment, the transporter 120 is positioned by the transport elevator 210 at height that is known to be above the approximate, expected position of the loading drawer 280 (or above the approximate position of the loading drawer positioning tab 276), and the scissors actuator 140 extends the lift platform 182 to a position beyond the approximate, expected position of the end of the loading drawer positioning tab 276. The transporter 120 is then lowered in step increments until the lift platform 180 contacts the positioning tab 276. Contact by the lift platform 180 with the positioning tab 276 can be detected in a number of ways, such as by capacitance or by completing a circuit that generates a contact signal upon contact between the lift platform and the positioning tab 276. Alternatively, contact can be determined by an increase in the load experienced by elevator drive motor 212 beyond a specified threshold as the transport elevator 210 attempts to continue to lower the lift platform 180 after the lift platform contacts the positioning tab 276. Alternatively, contact by the lift platform 180 with the positioning tab 276 can be detected by detecting motor stall by comparing commanded motor steps to the encoder position.

In another embodiment, the transporter 120 is positioned by the transport elevator 210 at height that is known to be below the approximate, expected position of the loading drawer 280 (or below the approximate position of the loading drawer positioning tab 276), and the scissors actuator 140 then extends the lift platform 182 to a position beyond the approximate, expected position of the end of the loading drawer positioning tab 276. The transporter 120 is then raised in step increments until the lift platform 180 contacts the positioning tab 276. Contact by the lift platform 180 with the positioning tab 276 can be detected in a number of ways, such as by capacitance or by completing a circuit that generates a contact signal upon contact between the lift platform and the positioning tab 276. Alternatively, contact can be determined by an increase in the load experienced by elevator drive motor 212 beyond a specified threshold as the transport elevator 210 attempts to continue to raise the lift platform 180 after the lift platform contacts the positioning tab 276. Alternatively, contact by the lift platform 180 with the positioning tab 276 can be detected by detecting motor stall by comparing commanded motor steps to the encoder position.

In another embodiment, the transporter 120 is positioned by the transport elevator 210 at height that is known to be at the approximate position of the loading drawer 280. The scissors actuator 140 then extends the lift platform 182 until the lift platform 182 contacts the end of the loading drawer positioning tab 276 or until the lift platform has moved more than a predetermined lateral distance without contacting the loading drawer positioning tab 276. If the scissors actuator 140 extends the lift platform 182 for more than a predetermined lateral distance without contacting the loading drawer positioning tab 276, the scissors actuator retracts the lift platform 180, the transport elevator 210 adjusts the height of the transporter 120 up or down, and the scissors actuator 140 extends the lift platform 182 until the lift platform 182 contacts the end of the loading drawer positioning tab 276 or until the lift platform has moved more than a predetermined lateral distance without contacting the loading drawer positioning tab 276. The process is repeated in an iterative fashion until the lift platform 182 contacts the end of the loading drawer positioning tab 276. Contact by the lift platform 180 with the loading drawer positioning tab 276 can be detected in a number of ways, such as by capacitance or by completing a circuit that generates a contact signal upon contact between the lift platform and the positioning tab 276. Alternatively, contact can be determined by an increase in the load experienced by scissors drive motor 192 beyond a specified threshold as the scissors actuator 140 attempts to continue to move the lift platform 180 laterally after the lift platform contacts the positioning tab 276. Alternatively, contact by the lift platform 180 with the positioning tab 276 can be detected by detecting motor stall by comparing commanded motor steps to the encoder position.

After step 504, in step 506, the vertical position of the transporter 120 and the lateral extension of the lift platform 180 at which the loading drawer positioning tab 276 was contacted by the lift platform 180 are recorded and stored for future reference in positioning the lift platform 180 with respect to the loading drawer 280.

In an alternative embodiment, the self-teaching process with respect to the loading drawer 280 is performed by contacting a positioning structure other than positioning tab 276, such as, for example, a portion of the loading drawer 280 or some other protruding structure at a known position with respect to the holding shelf loading drawer 280.

In step 508, the transporter 120 is moved by the transport elevator 210 to a position adjacent to the expected location of a holding shelf 104. In step 510, the holding shelf positioning tab 108 is contacted with the lift platform 180. The processor controls contact of the lift platform 180 with the holding shelf positioning tab 108 in any of the number of ways described above for controlling contact with the loading drawer positioning tab 276.

After step 510, in step 512, the vertical position of the transporter 120 and the lateral extension of the lift platform 180 at which the holding shelf positioning tab 108 was contacted by the lift platform 180 are recorded and stored for future reference in positioning the lift platform 180 with respect to the holding shelf 104.

In step 514, steps 508 to 512 are repeated for all holding shelves 104.

In an alternative embodiment, the self-teaching process with respect to each of the holding shelves 104 is performed by contacting a positioning structure other than positioning tab 108, such as, for example, a portion of the holding shelf 104 or some other protruding structure at a known position with respect to the holding shelf 104.

In step 516, the transporter 120 is moved by the transport elevator 210 to a position adjacent to the expected location of the input module 230. In step 518, the input module positioning tab 256 is contacted with the lift platform 180. The processor controls contact of the lift platform 180 with the input module positioning tab 256 in any of the number of ways described above for controlling contact with the loading drawer positioning tab 276.

After step 518, in step 520, the vertical position of the transporter 120 and the lateral extension of the lift platform 180 at which the input module positioning tab 256 was contacted by the lift platform 180 are recorded and stored for future reference in positioning the lift platform 180 with respect to the input module 230.

In an alternative embodiment, the self-teaching process with respect to the input module 230 is performed by contacting a positioning structure other than positioning tab 256, such as, for example, a portion of the input module 230 or some other protruding structure at a known position with respect to the holding shelf input module 230.

EMBODIMENTS

Embodiment 1. An apparatus for transporting groups of consumables between a plurality of vertically spaced holding shelves, the apparatus comprising: a support chassis disposed at a laterally-spaced position with respect to the plurality of holding shelves; a transport elevator coupled to the support chassis for moving the support chassis in a vertical direction between the plurality of holding shelves; a lift platform; and a scissors actuator connecting the lift platform to the support chassis and configured to translate the lift platform laterally with respect to the support chassis between a first position laterally aligned with the support chassis at the laterally-spaced position with respect to the plurality of holding shelves and a second position laterally displaced from the support chassis and laterally aligned with one of the holding shelves.

Embodiment 2. The apparatus of embodiment 1, further comprising a carrier configured to be carried on the lift platform and to be placed on any of the plurality of holding shelves.

Embodiment 3. The apparatus of embodiment 2, wherein the carrier comprises a base, a pair of support rails for slidably supporting the consumables thereon, and a resilient tab located at an end of each support rail and configured to releasably retain the consumables on the support rails.

Embodiment 4. The apparatus of embodiment 3, wherein each resilient tab is disposed at the end of a serpentine spring that is attached to or contiguous with a portion of the respective support rail.

Embodiment 5. The apparatus of any one of embodiments 1 to 4, wherein the transport elevator comprises: two drive belts, each drive belt being attached to a portion of the support chassis; a drive gear for each drive belt; a motor coupled to the drive gears; and an idler gear for each drive belt.

Embodiment 6 The apparatus of any one of embodiments 1 to 5, further comprising an elevator home sensor configured to detect a locator flag extending from the support chassis.

Embodiment 7. The apparatus of any one of embodiments 1 to 6, wherein the scissors actuator comprises a first arm having first and second ends and a second arm having first and second ends, wherein the first and second arms are rotatably connected to each other at intermediate positions between their respective first and second ends, wherein the first arm is pivotably attached at its first end to the support chassis and is pivotably and translatably attached at its second end to the lift platform, and wherein the second arm is pivotably and translatably attached at its first end to the support chassis and is pivotably attached at its second end to the lift platform.

Embodiment 8. The apparatus of embodiment 7, wherein the first and second arms are rotatably connected to each other by a slewing ring having an inner ring and an outer ring, wherein the inner and outer rings are rotatable with respect to each other, and wherein the first arm is attached to the inner ring at its respective intermediate position, and the second arm is attached to the outer ring at its respective intermediate position.

Embodiment 9. The apparatus of embodiment 7 or embodiment 8, wherein the second end of the first arm is pivotably and translatably attached to the lift platform by a slide that is slidably disposed within a linear slot formed in the lift platform, and wherein the slide is rotatably attached to the second end of the first arm.

Embodiment 10. The apparatus of embodiment 9, further comprising a roller bearing disposed within the slide that rolls against a side of the slot during lateral translation of the lift platform.

Embodiment 11. The apparatus of any one of embodiments 8 to 10, wherein the scissors actuator further comprises a motor coupled to the first end of the first arm to effect powered pivoting movement of the first arm.

Embodiment 12. The apparatus of any one of embodiments 1 to 11, wherein the scissors actuator is configured to translate the lift platform in either of two opposed lateral directions with respect to the support chassis.

Embodiment 13. The apparatus of any one of embodiments 1 to 12, further comprising a carrier detection sensor associated with each holding shelf and configured to detect the presence of a carrier on the associated holding shelf.

Embodiment 14. An apparatus comprising: a plurality of vertically spaced holding shelves; a transporter for transporting groups of consumables between the plurality of holding shelves, the transporter comprising: a support chassis disposed at a laterally-spaced position with respect to the plurality of holding shelves; a lift platform; and a scissors actuator connecting the lift platform to the support chassis and configured to translate the lift platform laterally with respect to the support chassis between a first position laterally aligned with the support chassis at the laterally-spaced position with respect to the plurality of holding shelves and a second position laterally displaced from the support chassis and laterally aligned with one of the holding shelves; and a transport elevator coupled to the support chassis for moving the support chassis in a vertical direction between the plurality of holding shelves.

Embodiment 15. The apparatus of embodiment 14, further comprising a carrier configured to hold the consumables, to be carried on the lift platform, and to be placed in any of the plurality of holding shelves.

Embodiment 16. The apparatus of embodiment 15, wherein each holding shelf includes a carrier detection sensor configured to detect the presence of a carrier on the corresponding holding shelf.

Embodiment 17. The apparatus of embodiment 15 or 16, wherein the carrier comprises a base, a pair of support rails for slidably supporting the consumables thereon, and a resilient tab located at an end of each support rail and configured to releasably retain the consumables on the support rails.

Embodiment 18. The apparatus of embodiment 17, wherein each resilient tab is disposed at the end of a serpentine spring that is attached to or a part of the respective support rail.

Embodiment 19. The apparatus of any one of embodiments 15 to 18, wherein the carrier includes at least one opening formed in the bottom thereof, and each holding shelf includes at least one carrier locator pin protruding from the holding shelf for engaging the opening formed in the carrier.

Embodiment 20. The apparatus of any one of embodiments 14 to 17, wherein the transport elevator comprises: two drive belts, each drive belt being attached to a portion of the support chassis; a drive gear for each drive belt; a motor coupled to the drive gear; and an idler gear for each drive belt.

Embodiment 21. The apparatus of any one of embodiments 14 to 20, wherein one of the holding shelves comprises a carrier support configured to be moveable in a lateral direction between a first position accessible by the transporter and a second position accessible by a user to load a plurality of consumables into the carrier support.

Embodiment 22. The apparatus of embodiment 14, further comprising a carrier configured to be carried on the lift platform and to be placed in any of the plurality of holding shelves, wherein one of the holding shelves comprises a carrier support configured to be moveable in a lateral direction between a first position accessible by the transporter and a second position accessible by a user to load a plurality of consumables into the carrier support, and wherein the carrier support comprises a carrier locking mechanism configured to lock the carrier within the carrier support when the carrier support is moved to the second position and to release the carrier when the carrier support is moved to the first position to permit the transporter to remove the carrier from the carrier support.

Embodiment 23. The apparatus of embodiment 22, wherein the carrier locking mechanism comprises: a pivoting latch configured to pivot between a first position not engaged with a portion of the carrier and a second position engaged with a portion of the carrier; and a slide latch configured to translate linearly between a first position not engaged with a portion of the carrier and a second position engaged with a portion of the carrier.

Embodiment 24. The apparatus of embodiment 23, further comprising: a torsional spring coupled to the pivoting latch to bias the pivoting latch to its respective second position engaged with a portion of the carrier; and a linear spring coupled to the slide latch to bias the slide latch to its respective second position engaged with a portion of the carrier.

Embodiment 25. The apparatus of embodiment 23 or embodiment 24, wherein the pivoting latch includes an upper end that engages a portion of a carrier on the carrier support when the carrier support is in the second position and the pivoting latch is in the second position and a lower end that contacts a hard stop when the carrier support is moved from the second position thereof to the first position thereof, thus causing the pivoting latch to rotate from the second position to the first position, thereby releasing the carrier supported on the carrier support; and wherein the slide latch engages a portion of a carrier on the carrier support when the carrier support is in the second position and the slide latch is in the second position, and the slide latch contacts a hard stop that pushes slide latch into the first position when the carrier support is moved from the second position thereof to the first position thereof, thereby releasing the carrier supported on the carrier support.

Embodiment 26. The apparatus of any one of embodiments 15 to 19, wherein the carrier is longer than the lift platform so that first and second ends of the carrier extend beyond first and second ends of the lift platform, wherein each holding shelf comprises first and second shelf portions spaced apart by at least the length of the lift platform, and wherein the transporter is configured and controlled to transport a carrier supported on the lift platform from the lift platform to one of the plurality of holding shelves by: a) moving the support chassis with the transport elevator to a vertical position at which the lift platform is above the holding shelf; b) moving the lift platform laterally with the scissors actuator into a position at which the first and second ends of the carrier are aligned with the first and second shelf portions of the holding shelf; and c) lowering the support chassis with the transport elevator to move the lift platform between the first and second shelf portions until the first and second ends of the carrier are supported on the first and second shelf portions.

Embodiment 27. The apparatus of embodiment 14, wherein each of the consumables comprises a multi-receptacle unit including a plurality of receptacles connected to each other in a side-by-side arrangement, wherein the apparatus further comprises a carrier configured to be carried on the lift platform and to be placed in any of the plurality of holding shelves and comprising a base, a pair of parallel support rails for slidably supporting the multi-receptacle units thereon with at least one of the receptacles of each multi-receptacle unit disposed between the support rails, and a resilient tab located at an end of each support rail and configured to releasably retain the multi-receptacle units on the support rails, and wherein one of the holding shelves comprises an input module configured to hold the carrier therein, the input module comprising a pusher configured to push one or more multi-receptacle units supported on the carrier toward an end of the carrier.

Embodiment 28. The apparatus of embodiment 27, wherein the input module is disposed on one side of the support chassis, and one or more of the remaining holding shelves are disposed on an opposed side of the support chassis, and wherein the scissors actuator is configured to translate the lift platform in either of two opposed lateral directions with respect to the support chassis.

Embodiment 29. The apparatus of embodiment 14, wherein each of the consumables comprises a multi-receptacle unit including a plurality of receptacles connected to each other in a side-by-side arrangement, and wherein the apparatus further comprises a carrier configured to be carried on the lift platform and to be placed in any of the plurality of holding shelves and comprising: a base, a pair of parallel support rails for slidably supporting the multi-receptacle units thereon with at least one of the receptacles of each multi-receptacle unit disposed between the support rails, and a stop flange located at an end of each support rail.

Embodiment 30. The apparatus of embodiment 29, wherein at least one of the holding shelves comprises a packing mechanism configured to move with respect to the carrier held in the holding shelf and to push the multi-receptacle units carried on the carrier until an end-most one of the multi-receptacle units is pushed off the support rails.

Embodiment 31. The apparatus of embodiment 30, further comprising a packing mechanism position sensor configured to detect a stop position of the packing mechanism at which the end-most one of the multi-receptacle units is pushed off the support rails and to determine the number of multi-receptacle units carried on the carrier based on the detected stop position.

Embodiment 32. The apparatus of any one of embodiments 14 to 31, further comprising: position sensor mechanisms for detecting a vertical position of the support chassis and a lateral position of the lift platform; and a controller for controlling the transport elevator and the scissors actuator and in communication with the positon sensor mechanisms; wherein the controller is configured to record a position of each holding shelf by moving the lift platform with respect to each holding shelf until the lift platform contacts a positioning tab of the holding shelf and recording the vertical position of the support chassis and the lateral position of the lift platform detected by the position sensor mechanisms at which the lift platform contacts the positioning tab.

Embodiment 33. A carrier support for holding a carrier, wherein the carrier is configured to hold a plurality of receptacles, wherein the carrier support is configured to be moveable between a first position and a second position, and wherein the carrier support comprises a carrier locking mechanism configured to lock the carrier with respect to the carrier support when the carrier support is moved to the second position and to release the carrier when the carrier support is moved to the first position to permit the carrier to be moved with respect to the carrier support when the carrier support is in the first position, wherein the carrier locking mechanism comprises: a pivoting latch configured to pivot between a first position not engaged with a portion of the carrier and a second position engaged with a portion of the carrier; and a slide latch configured to translate linearly between a first position not engaged with a portion of the carrier and a second position engaged with a portion of the carrier.

Embodiment 34. The carrier support of embodiment 33, further comprising: a torsional spring coupled to the pivoting latch to bias the pivoting latch to its respective second position engaged with a portion of the carrier; and a linear spring coupled to the slide latch to bias the slide latch to its respective second position engaged with a portion of the carrier.

Embodiment 35. The carrier support of embodiment 33 or embodiment 34, wherein the pivoting latch includes an upper end that engages a portion of a carrier on the carrier support when the carrier support is in the second position and the pivoting latch is in the second position and a lower end that contacts a hard stop when the carrier support is moved from the second position thereof to the first position thereof, thus causing the pivoting latch to rotate from the second position to the first position, thereby releasing the carrier supported on the carrier support; and wherein the slide latch engages a portion of a carrier on the carrier support when the carrier support is in the second position and the slide latch is in the second position, and the slide latch contacts a hard stop that pushes the slide latch into the first position when the carrier support is moved from the second position thereof to the first position thereof, thereby releasing the carrier supported on the carrier support.

Embodiment 36. An input module comprising: a carrier shelf for receiving and supporting a carrier holding a plurality of receptacles; a retrieval dock adjacent the carrier shelf and configured to receive one receptacle from a carrier supported on the carrier shelf and present the receptacle for removal from the input module by a receptacle transport apparatus; and a pusher configured to push one or more receptacles held on the carrier supported on the carrier shelf to one end of the carrier and to push one receptacle at a time off the end of the carrier and onto the retrieval dock.

Embodiment 37. The input module of embodiment 36, wherein the pusher comprises: a pusher carriage coupled to a pusher track and configured to translate bi-directionally along the track; and a pusher arm projecting from the pusher carriage.

Embodiment 38. The input module of embodiment 37, wherein the pusher arm comprises: an upright portion extending upwardly from the pusher carriage; a lateral portion extending laterally from an end of the upright portion; and a contact portion extending downwardly from the lateral portion.

Embodiment 39. The input module of embodiment 38, wherein a carrier supported on the carrier shelf includes a pair of parallel support rails for slidably supporting a plurality of receptacles thereon with at least a portion of each receptacle disposed between the support rails, and wherein the contact portion is aligned with a gap between the support rails so that as the pusher translates along the pusher track, the contact portion moves between the support rails and contacts the portion of the receptacle that is disposed between the support rails.

Embodiment 40. The input module of embodiment 39, wherein the receptacle comprises a plurality of cylindrical tubes connected to one another by a connecting rib structure defining a downwardly facing shoulder, wherein at least one of the cylindrical tubes is disposed between the support rails and a portion of the downwardly-facing shoulder is supported on top of the support rails.

Embodiment 41. The input module of any one of embodiments 37 to 40, wherein the pusher further comprises: a pusher drive belt attached to the pusher carriage; and a pusher motor coupled to the pusher drive belt for effecting powered translation of pusher carriage along the pusher track.

Embodiment 42. The input module of any one of embodiments 36 to 41, further comprising a sensor configured to detect when one of the receptacles has been pushed onto the retrieval dock.

Embodiment 43. The input module of any one of embodiments 36 to 42, further comprising a guide plate adjacent the retrieval dock and configured to align the receptacle on the retrieval dock with a receptacle transport apparatus.

Embodiment 44. The input module of any one of embodiments 36 to 43, further comprising at least one carrier locator pin protruding from the carrier shelf for engaging an opening formed in a carrier supported by the carrier shelf and to restrict relative movement between the carrier shelf and the carrier supported thereby.

Embodiment 45. The input module of any one of embodiments 36 to 44, further comprising: a position encoder for detecting a longitudinal position of the pusher; and a controller configured to receive longitudinal position data from the position encoder and to determine the number of receptacles held on a carrier supported on the carrier shelf when the pusher is positioned in contact with an end-most receptacle of one or more receptacles held on the carrier.

Embodiment 46. The input module of any one of embodiments 36 to 45, further comprising a pusher home sensor configured to detect when the pusher has moved to a home position.

Embodiment 47. A processing instrument comprising: the input module of any one of embodiments 36 to 46; and a receptacle transport apparatus configured to remove a receptacle from the retrieval dock of the input module and transport the receptacle within the processing instrument.

Embodiment 48. A carrier for holding a plurality of multi-receptacle units, each multi-receptacle unit including a plurality of receptacles connected to each other in a side-by-side arrangement, wherein the carrier comprises: a pair of parallel support rails for slidably supporting the multi-receptacle units thereon with at least one of the receptacles of each multi-receptacle unit disposed between the support rails, and a resilient tab associated with each support rail and configured to releasably retain the multi-receptacle units on the support rails.

Embodiment 49. The carrier of embodiment 48, wherein each resilient tab is disposed at the end of a serpentine spring.

Embodiment 50. The carrier of embodiment 49, wherein each serpentine spring is an integral portion of each associated support rail.

Embodiment 51. The carrier of any one of embodiments 48 to 50, wherein the support rails are made from spring steel.

Embodiment 52. The carrier of any one of embodiments 48 to 51, further comprising a carrier base comprising a first end, a second end, and a connecting portion extending between the first end and the second end, wherein the connecting portion is generally narrower than the first and second ends.

Embodiment 53. The carrier of embodiment 52, wherein the support rails are attached to opposed edges of the connecting portion.

Embodiment 54. The carrier of any one of embodiments 48 to 51, further comprising a carrier base with one or more locator holes formed in the bottom of the carrier base.

Embodiment 55. The carrier of embodiment 54, comprising one locator hole at a first end of the carrier base and a locator slot at a second end of the carrier base.

Embodiment 56. The carrier of embodiment 54 or embodiment 55, comprising two locator holes at a first end of the carrier base and two locator slots at a second end of the carrier base.

Embodiment 57. A scissors actuator configured to translate a support platform in either of opposed lateral directions with respect to a base frame, the scissors actuator comprising: a first arm having first and second ends; a second arm having first and second ends, wherein the first and second arms are rotatably connected to each other at intermediate positions between their respective first and second ends, wherein the first arm is pivotably attached at its first end to the base frame and the second arm and is pivotably attached at its second end to the support platform; a first slide disposed within a first linear track formed in the support platform and including a bearing protruding from a side of the first slide for rolling contact with a side of the first linear track formed in the support platform, wherein the first arm is pivotably and translatably attached at its second end to the support platform by the first slide, and a second slide disposed within a second linear track formed in the base frame and including a bearing protruding from a side of the second slide for rolling contact with a side of the second linear track formed in the base frame, wherein the second arm is pivotably and translatably attached at its first end to the base frame by the second slide.

Embodiment 58. The scissors actuator of embodiment 57, wherein the first and second arms are rotatably connected to each other by a slewing ring having an inner ring and an outer ring, wherein the inner and outer rings are rotatable with respect to each other, and wherein the first arm is attached to the inner ring at its respective intermediate position, and the second arm is attached to the outer ring at its respective intermediate position.

Embodiment 59. The scissors actuator of embodiment 57 or embodiment 58, further comprising a motor coupled to the first end of the first arm to effect powered pivoting movement of the first arm.

Embodiment 60. The scissors actuator of embodiment 59, further comprising an encoder coupled to the motor or to the first arm.

Embodiment 61. The scissors actuator of any one of embodiments 57 to 60, wherein the scissors actuator is configured to translate the support platform in either of two opposed lateral directions with respect to the base frame.

Embodiment 62. A method for automatically transferring a receptacle carrier between a holding shelf and a lift platform of a transporter, the method comprising: a) with a transport elevator for effecting vertical movement of the transporter, positioning the transporter at an approximate vertical location of the holding shelf; b) after step a), effecting relative movement between the lift platform and a positioning structure associated with the holding self; c) during step b), detecting contact between the lift platform and the positioning structure; d) recording data relating to the position of the lift platform at which contact is detected in step c); and e) transferring a receptacle carrier between the holding shelf and the lift platform by controlling movement of the lift platform in accordance with the data recorded at step d).

Embodiment 63. The method of embodiment 62, wherein step b) comprises one or both of (1) effecting vertical movement of the lift platform with respect to the holding shelf with the transport elevator and (2) effecting lateral movement of the lift platform with a lateral actuator.

Embodiment 64. The method of embodiment 63, wherein step a) comprises positioning the transporter such that the vertical position of the lift platform is below an expected vertical location of the positioning structure, and step b) comprises: b-1) moving the lift platform laterally with the lateral actuator until the lift platform is positioned below an expected location of the positioning structure; and b-2) after step b-1), raising the transporter and lift platform with the transport elevator until contact is detected in step c).

Embodiment 65. The method of embodiment 63, wherein step a) comprises positioning the transporter such that the vertical position of the lift platform is above an expected vertical location of the positioning structure, and step b) comprises: b-1) moving the lift platform laterally with the lateral actuator until the lift platform is positioned above an expected location of the positioning structure; and b-2) after step b-1), lowering the transporter and lift platform with the transport elevator until contact is detected in step c).

Embodiment 66. The method of embodiment 63, wherein step a) comprises positioning the transporter such that the vertical position of the lift platform is the same as an expected vertical location of the positioning structure, and step b) comprises moving the lift platform laterally with the lateral actuator until contact is detected in step c).

Embodiment 67. The method of any one of embodiments 62 to 66, wherein step e) comprises transferring a receptacle carrier from the lift platform to the holding shelf by: supporting the receptacle carrier on the lift platform with opposed ends of the receptacle carrier extending beyond opposed ends of the lift platform; with the transport elevator, and using the data recorded at step d), positioning the transporter at a vertical position so that the lift platform is above the holding shelf; effecting lateral movement of the lift platform with a lateral actuator and using the data recorded at step d) so that the lift platform is disposed within an open area between a first shelf portion and a second shelf portion of the holding shelf and the opposed ends of the receptacle carrier are positioned above the first and second shelf portions; and with the transport elevator, lowering the lift platform until the opposed ends of the receptacle carrier are supported on the first and second shelf portions, and the receptacle carrier is not supported on the lift platform.

Embodiment 68. The method of any one of embodiments 62 to 66, wherein step e) comprises transferring a receptacle carrier from the holding shelf to the lift platform by: supporting opposed ends of the receptacle carrier on a first shelf portion and a second shelf portion of the holding shelf; with the transport elevator, and using the data recorded at step d), positioning the transporter at a vertical position so that the lift platform is below the holding shelf; effecting lateral movement of the lift platform with a lateral actuator and using the data recorded at step d) so that the lift platform is aligned with an open area between the first and second shelf portions; and with the transport elevator, raising the lift platform until the receptacle carrier is supported on the lift platform with the opposed ends of the receptacle carrier extending beyond opposed ends of the lift platform and the opposed ends of the receptacle carrier are lifted off the first and second shelf portions.

Embodiment 69. A method for determining the number of receptacles supported by a carrier, the method comprising: a) placing the carrier with one or more receptacles supported thereby on a carrier shelf; b) pushing the one or more receptacles to one end of the carrier with a packer positioned adjacent the carrier shelf; c) detecting a longitudinal position of the packer when the one or more receptacles have been pushed to the one end of the carrier; and d) determining the number of receptacles held on the carrier based on the longitudinal position of the packer.

Embodiment 70. The method of embodiment 69, wherein step a) comprises transferring the carrier from a lift platform to the carrier shelf by: supporting the carrier on the lift platform with opposed ends of the carrier extending beyond opposed ends of the lift platform; with a transport elevator, positioning the lift platform above the carrier shelf; effecting lateral movement of the lift platform with a lateral actuator so that the lift platform is disposed within an open area between a first shelf portion and a second shelf portion of the carrier shelf and the opposed ends of the carrier are positioned above the first and second shelf portions; and with the transport elevator, lowering the lift platform until the opposed ends of the carrier are supported on the first and second shelf portions, and the carrier is not supported on the lift platform.

Embodiment 71. The method of embodiment 69 or embodiment 70, wherein the packer comprises: a packer carriage coupled to a packer track and configured to translate bi-directionally along the track; a contact portion projecting from the packer carriage; a packer drive belt attached to the packer carriage; and a packer motor coupled to the packer drive belt for effecting powered translation of the packer carriage along the packer track.

Embodiment 72. The method of embodiment 71, wherein step c) comprises detecting output of the packer motor by a rotary encoder coupled to the packer motor or detecting output of the packer motor by motor steps.

Embodiment 73. A method for packing a plurality of receptacles supported by a carrier, the method comprising: a) placing the carrier with a plurality of receptacles supported thereby on a carrier shelf; b) contacting an end-most one of the receptacles with a packer positioned adjacent the carrier shelf, wherein the packer comprises a packer carriage coupled to a packer track and configured to translate bi-directionally along the track; and a contact portion projecting from the packer carriage; and c) pushing the plurality of receptacles to one end of the carrier with the packer to pack the receptacles in a stack.

Embodiment 74. The method of embodiment 73, wherein a carrier supported on the carrier shelf includes a pair of parallel support rails for slidably supporting a plurality of receptacles thereon with at least a portion of each receptacle disposed between the support rails, and wherein step c) comprises contacting an end-most one of the receptacles with the packer by aligning the contact portion with a gap between the support rails so that as the packer carriage translates along the packer track, the contact portion moves between the support rails and contacts the portion of the end-most receptacle that is disposed between the support rails.

Embodiment 75. The method of embodiment 74, wherein the carrier includes a hard stop at an end of each support rail, and wherein step c) comprises pushing the plurality of receptacles against the hard stops.

Embodiment 76. The method of embodiment 74 or embodiment 75, wherein the receptacle comprises a plurality of cylindrical tubes connected to one another by a connecting rib structure defining a downwardly facing shoulder, wherein at least one of the cylindrical tubes is disposed between the support rails and a portion of the downwardly-facing shoulder is supported on top of the support rails.

Embodiment 77. The method of embodiment 76, wherein the packer further comprises a horizontal portion that contacts a portion of the end-most receptacle extending above the support rails to keep the receptacles generally perpendicular to a longitudinal direction of the support rails.

Embodiment 78. The method of any one of embodiments 73 to 77, wherein the packer further comprises: a packer drive belt attached to the packer carriage; and a packer motor coupled to the packer drive belt for effecting powered translation of packer carriage along the packer track.

Embodiment 79. The method of any one of embodiments 73 to 77, further comprising detecting a longitudinal position of the packer during step c); and determining the number of receptacles held on the carrier based on the longitudinal position of the packer.

Embodiment 80. The method of embodiment 79, wherein the packer further comprises a packer drive belt attached to the packer carriage; and a packer motor coupled to the packer drive belt for effecting powered translation of packer carriage along the packer track, and wherein detecting the longitudinal position of the packer during step c) comprises using a home sensor to detect an initial position of the packer along the packer track and an encoder coupled to the packer motor to detect a number of encoder counts associated with a motorized packer movement from the initial position.

Embodiment 81. A method for presenting multi-receptacle units for retrieval by an automated receptacle distributor of a processing instrument, each multi-receptacle unit including a plurality of receptacles connected to each other in a side-by-side arrangement, the method comprising: a) placing a carrier with one or more multi-receptacle units held thereon on a carrier shelf, wherein the carrier comprises a pair of parallel support rails for slidably supporting the multi-receptacle units thereon with at least one of the receptacles of each multi-receptacle unit disposed between the support rails; b) contacting an end-most one of the receptacles with a pusher positioned adjacent the carrier shelf, the pusher comprising a contact portion configured to move between the support rails and contact the receptacle disposed between the support rails; and c) pushing the plurality of multi-receptacle units along the support rails toward one end of the carrier with the pusher until an end-most one of the multi-receptacle units is pushed off the support rails and onto a retrieval dock adjacent to the carrier shelf.

Embodiment 82. The method of embodiment 81, further comprising: detecting when the one of the plurality of multi-receptacle units is pushed off the support rails and onto the retrieval dock; and stopping the pusher from further pushing the one or more multi-receptacle units toward the one end of the carrier.

Embodiment 83. The method of embodiment 81 or embodiment 82, further comprising retrieving the one multi-receptacle unit from the retrieval dock with a receptacle transport mechanism of the processing instrument.

Embodiment 84. The method of embodiment 83, wherein the receptacle transport mechanism comprises an extendible and retractable hook and the multi-receptacle unit comprises a manipulating structure, and wherein retrieving the one receptacle from the retrieval dock with a receptacle transport mechanism comprises extending the hook, engaging the manipulating structure with the extended hook, and retracting the hook to pull the multi-receptacle unit from the retrieval dock into a housing of the receptacle transport mechanism.

Embodiment 85. The method of any one of embodiments 81 to 84, further comprising: during step c), detecting a longitudinal position of the pusher when the multi-receptacle unit is pushed off the support rails; and determining the number of multi-receptacle units held on the carrier based on the longitudinal position of the pusher.

Embodiment 86. The method of any one of embodiments 81 to 85, wherein step a) comprises transferring the carrier from a lift platform to the carrier shelf by: supporting the carrier on the lift platform with opposed ends of the carrier extending beyond opposed ends of the lift platform; with a transport elevator, positioning the lift platform above the carrier shelf; effecting lateral movement of the lift platform with a lateral actuator so that the lift platform is disposed within an open area between a first shelf portion and a second shelf portion of the carrier shelf and the opposed ends of the carrier are positioned above the first and second shelf portions; and with the transport elevator, lowering the lift platform until the opposed ends of the carrier are supported on the first and second shelf portions, and the carrier is not supported on the lift platform.

Embodiment 87. The method of any one of embodiments 81 to 86, wherein the pusher further comprises: a pusher carriage coupled to a pusher track and configured to translate bi-directionally along the track; a pusher arm comprising the contact portion and projecting from the pusher carriage; a pusher drive belt attached to the pusher carriage; and a pusher motor coupled to the pusher drive belt for effecting powered translation of pusher carriage along the pusher track.

Embodiment 88. The method of any one of embodiments 81 to 87, further comprising, prior to step c), retaining the one or more multi-receptacle units on the support rails with spring-biased retainer tabs that releasably engage the end-most one of the multi-receptacle units, wherein the spring-biased retainer tabs are configured to deflect laterally during step c) to permit the end-most one of the multi-receptacle units to be pushed off the support rails.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A scissors actuator configured to translate a support platform in either of opposed lateral directions with respect to a base frame, the scissors actuator comprising:
   a first arm having first and second ends;
   a second arm having first and second ends, wherein the first and second arms are rotatably connected to each other at intermediate positions between their respective first and second ends, wherein the first arm is pivotably attached at its first end to the base frame and the second arm is pivotably attached at its second end to the support platform;

a first slide disposed within a first linear track formed in the support platform and including a bearing protruding from a side of the first slide for rolling contact with a side of the first linear track formed in the support platform so that the first slide is able to translate with respect to the support platform within the first linear track, wherein the first arm is pivotably attached at its second end to the first slide so that the first arm is able to pivot and translate with respect to the support platform; and a second slide disposed within a second linear track formed in the base frame and including a bearing protruding from a side of the second slide for rolling contact with a side of the second linear track formed in the base frame so that the second slide is able to translate with respect to the base frame within the second linear track, wherein the second arm is pivotably attached at its first end to the second slide so that the second arm is able to pivot and translate with respect to the base frame.

2. The scissors actuator of claim 1, wherein the first and second arms are rotatably connected to each other by a slewing ring having an inner ring and an outer ring, wherein the inner and outer rings are rotatable with respect to each other, and wherein the first arm is attached to the inner ring at its respective intermediate position, and the second arm is attached to the outer ring at its respective intermediate position.

3. The scissors actuator of claim 1, further comprising a motor coupled to the first end of the first arm to effect powered pivoting movement of the first arm.

4. The scissors actuator of claim 3, further comprising an encoder coupled to the motor or to the first arm.

5. The scissors actuator of claim 1, wherein the scissors actuator is configured to translate the support platform in either of two opposed lateral directions with respect to the base frame.

* * * * *

UNITED STATES PATENT AND TRADEMARK OFFICE
CERTIFICATE OF CORRECTION

PATENT NO. : 12,330,163 B2
APPLICATION NO. : 18/401140
DATED : June 17, 2025
INVENTOR(S) : Julian Groeli et al.

It is certified that error appears in the above-identified patent and that said Letters Patent is hereby corrected as shown below:

In the Specification

In Column 5, Line 55, delete "positon" and insert -- position --, therefor.

In Column 13, Line 9, delete "there on." and insert -- thereon. --, therefor.

In Column 22, Line 61, delete "sup-port" and insert -- support --, therefor.

In Column 23, Line 15, delete "352," and insert -- 352. --, therefor.

In Column 26, Line 18, delete "in with" and insert -- with --, therefor.

In Column 26, Line 21, delete ""B"-" and insert -- "E"- --, therefor.

In Column 28, Line 2, delete "drawer closed sensor" and insert -- drawer position sensor --, therefor.

In Column 28, Line 45, delete "Iglide®" and insert -- iglide® --, therefor.

In Column 28, Line 45, delete "Igus®." and insert -- igus®. --, therefor.

In Column 28, Line 58, delete "maybe" and insert -- may be --, therefor.

In Column 32, Line 27, delete "s control" and insert -- a control architecture --, therefor.

In Column 34, Line 8, delete "one" and insert -- on --, therefor.

In Column 41, Line 57, delete "positon" and insert -- position --, therefor.

Signed and Sealed this
Twenty-third Day of September, 2025

John A. Squires
*Director of the United States Patent and Trademark Office*